US012139062B2

(12) United States Patent
Ota et al.

(10) Patent No.: US 12,139,062 B2
(45) Date of Patent: Nov. 12, 2024

(54) AUTOMOTIVE LAMP SYSTEM

(71) Applicant: KOITO MANUFACTURING CO., LTD., Tokyo (JP)

(72) Inventors: Yu Ota, Shizuoka (JP); Masashi Kato, Shizuoka (JP); Shohei Yanagizu, Shizuoka (JP); Satoshi Kikuchi, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 23 days.

(21) Appl. No.: 18/058,385

(22) Filed: Nov. 23, 2022

(65) Prior Publication Data

US 2023/0093633 A1 Mar. 23, 2023

Related U.S. Application Data

(63) Continuation of application No. PCT/JP2021/019412, filed on May 21, 2021.

(30) Foreign Application Priority Data

May 29, 2020 (JP) .................................. 2020-094517
May 29, 2020 (JP) .................................. 2020-094657

(Continued)

(51) Int. Cl.
*B60Q 1/08* (2006.01)
*B60Q 11/00* (2006.01)
(Continued)

(52) U.S. Cl.
CPC .............. *B60Q 1/08* (2013.01); *B60Q 11/005* (2013.01); *H05B 45/37* (2020.01); *H05B 45/50* (2020.01)

(58) Field of Classification Search
CPC ........ B60Q 1/02–08; B60Q 1/14–1476; H05B 45/50; H05B 45/37
See application file for complete search history.

(56) References Cited

U.S. PATENT DOCUMENTS 8,058,810 B2 11/2011 Chen et al.
9,578,701 B1 2/2017 Logiudice et al.
(Continued)

FOREIGN PATENT DOCUMENTS

JP 2007295641 A 11/2007
JP 2010272410 A 12/2010
(Continued)

OTHER PUBLICATIONS

International Preliminary Report on Patentability Chapter I (PCT/IB/373) with translation mailed on Nov. 17, 2022 by The International Bureau of WIPO in corresponding International Patent Application No. PCT/JP2021/019412. (11 pages).

(Continued)

*Primary Examiner* — Anh Q Tran
(74) *Attorney, Agent, or Firm* — BUCHANAN, INGERSOLL & ROONEY PC

(57) ABSTRACT

A variable light distribution light source includes an array-type light-emitting device. The array-type light-emitting device includes a power supply terminal and multiple pixel circuits electrically coupled and spatially arranged in a matrix. A power supply circuit includes a power supply unit that supplies electric power to the array-type light-emitting device. An output of a DC/DC converter is coupled to the power supply terminal VDD of the array-type light-emitting device via an output terminal. A voltage setting circuit generates a controllable correction voltage. A feedback circuit generates a feedback voltage based on the correction voltage and the control target voltage that corresponds to the (Continued)

output voltage of the DC/DC converter, and supplies the feedback voltage to a feedback pin of a converter controller.

22 Claims, 33 Drawing Sheets

(30) Foreign Application Priority Data

May 29, 2020 (JP) ................................ 2020-094918
May 29, 2020 (JP) ................................ 2020-094919

(51) Int. Cl.
*H05B 45/37* (2020.01)
*H05B 45/50* (2022.01)

(56) References Cited

U.S. PATENT DOCUMENTS

| | | | |
|---|---|---|---|
| 2009/0230874 A1 | 9/2009 | Zhao et al. | |
| 2012/0146531 A1 | 6/2012 | Uchimoto et al. | |
| 2012/0326632 A1* | 12/2012 | Kitagawa | H05B 45/38 315/307 |
| 2015/0245428 A1 | 8/2015 | Matsumoto et al. | |
| 2016/0144771 A1* | 5/2016 | Miyachi | B60Q 1/143 362/465 |

FOREIGN PATENT DOCUMENTS

| | | | | |
|---|---|---|---|---|
| JP | 2011515027 A | | 5/2011 | |
| JP | 2011139609 A | | 7/2011 | |
| JP | 2012125074 A | | 6/2012 | |
| JP | 2013008615 A | | 1/2013 | |
| JP | 2015116915 A | * | 6/2015 | |
| JP | 2015155280 A | * | 8/2015 | ............... B60Q 1/12 |
| JP | 2017117606 A | | 6/2017 | |
| JP | 2017212340 A | | 11/2017 | |
| JP | 2018172038 A | | 11/2018 | |
| WO | 2017086220 A1 | | 5/2017 | |

OTHER PUBLICATIONS

International Search Report (PCT/ISA/210) with translation mailed on Jul. 6, 2021 by the Japan Patent Office as the International Searching Authority for International Application No. PCT/JP2021/019412. (7 pages).

Extended European Search Report dated Mar. 14, 2024, issued in corresponding European Application No. 21812855.1. (9 pages).

* cited by examiner

AUTOMOTIVE LAMP SYSTEM

BACKGROUND

1. Technical Field

The present disclosure relates to an automotive lamp.

2. Description of the Related Art

Typical automotive lamps are capable of switching between a low-beam mode and a high-beam mode. The low-beam mode is used to illuminate a close range in the vicinity of the user's vehicle with a predetermined light intensity. In the low-beam mode, light distribution is determined so as to prevent glare being imparted to an oncoming vehicle or a leading vehicle. The low-beam mode is mainly used when the vehicle is traveling in an urban area. In contrast, the high-beam mode is used to illuminate a distant range over a wide area ahead of the vehicle with a relatively high light intensity. The high-beam mode is mainly used when the vehicle is traveling at high speed along a road where there are a small number of oncoming vehicles and leading vehicles. Accordingly, the high-beam mode provides the driver with high visibility, which is an advantage, as compared with the low-beam mode. However, the high-beam mode has a problem of imparting glare to a pedestrian or a driver of a vehicle ahead of the vehicle.

In recent years, the Adaptive Driving Beam (ADB) technique has been proposed in which a high-beam distribution pattern is dynamically and adaptively controlled based on the state of the surroundings of a vehicle. With the ADB technique, the presence or absence of a leading vehicle, an oncoming vehicle, or a pedestrian ahead of the vehicle is detected, and the illumination is reduced or turned off for a region that corresponds to such a vehicle or pedestrian thus detected, thereby reducing glare imparted to such a vehicle or pedestrian.

As an ADB lamp, an arrangement using a bypass method, which is a combination of an LED (light-emitting diode) string and a bypass circuit, has been put to practical use. FIG. 1 is a block diagram showing a lamp 1R using the bypass method.

The ADB lamp 1R includes an LED string (LED bar) 50, a constant current driver 70, and a bypass circuit 80. The LED string 50 includes multiple LEDs 52_1 through 52_n (n≥2) coupled in series. The ADB lamp 1R is configured such that the output beams of the multiple LEDs 52_1 through 52_n are irradiated to different regions on a virtual vertical screen 40 in front of the vehicle.

The constant current driver 70 includes a current source 72 configured to generate a driving current $I_{LED}$ stabilized to a predetermined amount of current, and to supply the driving current $I_{LED}$ to the LED string 50. The bypass circuit 80 includes multiple switches SW1 through SWn arranged in parallel with the multiple LEDs 52_1 through 52_n.

In the off state of a given switch SWi (1≤i≤n) of the bypass circuit 80, the current $I_{LED}$ generated by the current source 60 flows through the LED 52_i, thereby turning on the LED 52_i. In the on state of the switch SWi, the current $I_{LED}$ generated by the current source 60 is bypassed via the switch SWi, thereby turning off the LED 52_i.

A light distribution pattern 42 is formed on the virtual vertical screen 40 according to the on/off states of the multiple bypass switches SW1 through SWn.

FIG. 2 is a block diagram showing another example configuration of the lamp 1R using the bypass method. The ADB lamp 1R includes an LED string (LED bar) 50, a current source 60, a power supply circuit 70, and a bypass circuit 80. The current source 60 is provided in series with the LED string 50, and generates a driving current $I_{LED}$ stabilized to a predetermined amount of current. The power supply circuit 70 supplies the power supply voltage across both terminals of the LED string 50 and the current source 60. The bypass circuit 80 includes multiple switches SW1 through SWn provided in parallel with the multiple LEDs 52_1 through 52_n.

With the lamp using the bypass method shown in FIG. 1 or 2, the number n of the LEDs 52, i.e., the number of divisions of on/off controllable regions, is only on the order of several to several dozen at most. In order to support a larger number of divisions as much as possible, an ADB lamp using an LED (light-emitting diode) array method has been proposed. FIG. 3 is a block diagram showing an ADB lamp 1S using the LED array method. The ADB lamp 1S includes an LED array device 10, a light distribution controller 20, and a power supply circuit 30. The LED array device 10 includes multiple LEDs 12 arranged in an array, and an LED driver 14 that drives the multiple LEDs 12, and is packaged as a single device. Each pixel (which will also be referred to as a "pixel circuit") is configured including an LED 12 and an LED driver 14. The LED driver 14 includes a current source (switch) coupled to the LED 12 in series. For each pixel, the LED driver 14 controls the on/off state of the current source so as to switch between the on state (lighting-on state) and the off state (lighting-off state).

The power supply circuit 30 supplies a power supply voltage $V_{DD}$ to the LED array device 10. The power supply circuit 30 includes a DC/DC converter 32 and a controller 34 thereof. A feedback voltage $V_{FB}$ based on the output voltage $V_{OUT}$ of the DC/DC converter 32 is fed back to the controller 34. The controller 34 controls the DC/DC converter 32 such that the feedback voltage $V_{FB}$ approaches a target value $V_{REF}$.

The light distribution controller 20 generates a control signal for specifying the on/off states of the multiple pixels, and transmits the control signal to the LED array device 10. The output beam of the LED array device 10 is irradiated to the virtual vertical screen 40 via an unshown optical system. A light distribution pattern 42 is formed on the virtual vertical screen 40 according to the on/off states of the multiple light-emitting elements 12.

Problem 1. In the ADB lamp 1S shown in FIG. 3, the target voltage $V_{OUT(REF)}$ of the output voltage $V_{OUT}$ of the power supply circuit 30 is determined based on a reference voltage $V_{REF}$ generated by an internal circuit of the power supply circuit 30. Accordingly, this does not allow the target voltage $V_{OUT(REF)}$ to be changed during operation of the ADB lamp 1S.

Problem 2. As a result of investigating the ADB lamp 1S shown in FIG. 3, the present inventor has come to recognize the following problem.

With the circuit shown in FIG. 3, the (N) multiple pixel circuits are coupled in parallel. Accordingly, the maximum value of the output current $I_{OUT}$ of the power supply circuit 30 is represented by $I_{OUT(MAX)}=I_{LED} \times N$. At present, the LED array device 10 has been developed with a number of pixels N from several thousand to ten thousand or more.

For example, in a case in which $I_{LED}=10$ mA and the number N of the LEDs=3000, the maximum output current $I_{OUT(MAX)}$ reaches 30 A.

A power supply cable 16 and connectors each have a DC resistance component R. Accordingly, a voltage drop $V_{DROP}$ ($=R \times I_{OUT}$) occurs due to the flow of a large amount of current. With the voltage at the output terminal of the power supply circuit 30 as $V_{OUT}$, the power supply voltage (which will also be referred to as "load input terminal voltage") $V_{DD}$ supplied to the power supply terminal of the LED array device 10 is represented by $V_{DD}=V_{OUT}-R\times I_{OUT}$. In order to allow each pixel circuit to operate normally, the load input terminal voltage $V_{DD}$ must be larger than $V_{DD(MIN)}=Vf+V_{SAT}+\alpha$. Here, Vf represents the forward voltage, $V_{SAT}$ represents the terminal voltage (minimum operating voltage) across both terminals of the LED driver 14 configured as a constant current source, and $\alpha$ represents the voltage margin.

Accordingly, in the power supply circuit 30, it is necessary to design the controller 34 such that the target voltage $V_{OUT(REF)}$ of the output voltage $V_{OUT}$ satisfies $V_{OUT(REF)}>V_{DD(MIN)}+R\times I_{OUT}$.

FIG. 4 is an operation waveform diagram of the ADB lamp 1S shown in FIG. 3. The output current $I_{OUT}$ changes in a range between 0 and $I_{OUT(MAX)}$. Assuming the maximum output current $I_{OUT(MAX)}$, the target value $V_{OUT(REF)}$ of the output voltage $V_{OUT}$ is determined such that it satisfies the following condition.

$$V_{OUT(REF)}=V_{DD(MIN)}+R\times I_{OUT(MAX)}$$

In this case, in a situation in which $I_{OUT}\approx 0$, the load input terminal voltage $V_{DD}$ becomes larger than the minimum voltage $V_{DD(MIN)}$. Accordingly, this leads to unnecessary power consumption, as represented by $(V_{DD}-V_{DD(MIN)})\times I_{OUT}$.

Furthermore, if the output current $I_{OUT}$ exceeds the assumed maximum value $I_{OUT(MAX)}$, the load input terminal voltage $V_{DD}$ becomes lower than the minimum voltage $V_{DD(MIN)}$. In this case, the LED array device 10 may flicker or turn off.

Problem 3. As a result of investigating the ADB lamp 1S shown in FIG. 3, the present inventor has come to recognize the following problem.

With the circuit shown in FIG. 3, the (N) multiple pixel circuits are coupled in parallel. Accordingly, the maximum value of the output current $I_{OUT}$ of the power supply circuit 30 is represented by $I_{OUT(MAX)}=I_{LED}\times N$. At present, the LED array device 10 has been developed with a number of pixels N from several thousand to ten thousand or more.

For example, in a case in which $I_{LED}=10$ mA and the number N of the LEDs=3000, the maximum output current $I_{OUT(MAX)}$ reaches 30 A. A power supply circuit that is capable of outputting such a large amount of current is large in size with a high cost. In addition, in order to withstand such a high current of 30 A, the choice of components such as inductors, switching transistors, etc., is drastically limited.

Furthermore, the power supply circuit 30 and the LED array device 10 are coupled via a single power supply cable (power supply line or harness) 14. Accordingly, the harness is required to have a capacity of 30 A. Such a power supply line leads to a high cost. Furthermore, such a power supply line is required to have a very large thickness, leading to a difficulty in arranging the power supply line. In addition, as a connector (coupler) to be used to couple the harness 16, there is a need to select a component having a large capacity.

The power supply cable and connectors each have a DC resistance component R. Accordingly, when a large current flows through such a member, this leads to the occurrence of a voltage drop $R\times I_{OUT}$. With the voltage at the output terminal of the power supply circuit 30 as $V_{OUT}$, the voltage $V_{DD}$ supplied to the power supply pin of the LED array device 10 is represented by $V_{DD}=V_{OUT}-R\times I_{OUT}$. In order to allow each pixel circuit to operate normally, the required power supply voltage $V_{DD}$ must be larger than $V_{DD(MIN)}=Vf+V_{SAT}+\alpha$. Here, Vf represents the forward voltage of the LED, $V_{SAT}$ represents the terminal voltage (minimum operating voltage) across both terminals of the constant current source of the current driver, and $\alpha$ represents the voltage margin. Accordingly, the target voltage $V_{OUT(REF)}$ of the output voltage $V_{OUT}$ of the power supply circuit 30 must be determined such that $V_{OUT(REF)}>V_{DD(MIN)}+R\times I_{OUT}$ holds true.

The output current $I_{OUT}$ changes in a range of 0 to $I_{OUT(MAX)}$. If the target value $V_{OUT(REF)}$ of the output voltage $V_{OUT}$ is determined assuming the maximum output current $I_{OUT(MAX)}$, such an arrangement leads to the supply of an excessive voltage $V_{DD}$ to the pixel circuit in a situation in which $I_{OUT}\approx 0$, leading to unnecessary power consumption.

Problem 4. In the ADB lamp 1R shown in FIG. 1, the output of the constant current driver 70 and the LED string 50 are coupled via wiring (a harness) 54 and a connector. If the wiring 54 is disconnected, or if the connector becomes detached, the LED string 50 is not able to turn on. In order to solve such a problem, such an arrangement requires a disconnection detection function for the wiring 54.

With the ADB lamp 1R shown in FIG. 1, if the wiring 54 is disconnected, the output current $I_{LED}$ of the constant current driver 70 does not flow. Accordingly, such an arrangement allows the constant current driver 70 to detect disconnection of the wiring in a simple manner.

In contrast, with the lamp system 1S shown in FIG. 3, even if the wiring 16 is disconnected, there is no effect on the feedback loop of the power supply circuit 30. Accordingly, the power supply circuit 30 is not capable of detecting the disconnection of the wiring 16.

SUMMARY

Description will be made regarding an outline of several example embodiments of the present disclosure. In this outline, some concepts of one or more embodiments will be described in a simplified form as a prelude to the more detailed description that is presented later in order to provide a basic understanding of such embodiments. Accordingly, the outline is by no means intended to restrict the scope of the present invention or the present disclosure. Furthermore, this outline is not an extensive overview of all conceivable embodiments, and is by no means intended to restrict essential elements of the embodiments. For convenience, the term "one embodiment" may be used herein to refer to a single embodiment or multiple embodiments disclosed in the present specification.

1. A lamp system according to one embodiment is provided with a variable light distribution light source including an array-type light-emitting device that includes a power supply terminal and multiple pixel circuits electrically coupled in parallel and spatially arranged in a matrix, and a power supply circuit including a power supply unit structured to supply electric power to the array-type light-emitting device. The power supply unit includes: a DC/DC converter having an output coupled to the power supply terminal of the array-type light-emitting device via a power supply line; a voltage setting circuit structured to generate a controllable correction voltage; a feedback circuit structured to generate a feedback voltage based on the correction voltage and a control target voltage that corresponds to an output voltage of the DC/DC converter; and a converter controller having a feedback pin coupled to receive the feedback voltage and structured to control the DC/DC converter such that the feedback voltage approaches a predetermined target voltage.

With such an arrangement in which the feedback voltage at the feedback pin of the converter controller is changed according to the correction voltage, this is capable of adjusting the output voltage of the DC/DC converter or the target value of the voltage at the power supply terminal of the array-type light-emitting device.

With one embodiment, the power supply unit may further include a sense terminal coupled to the power supply terminal of the array-type light-emitting device via a sense line separated from the power supply line. The control target voltage may be proportional to a sense voltage that occurs at the sense terminal. With this arrangement, a feedback loop is formed such that an appropriate power supply voltage is supplied to the power supply terminal of the array-type light-emitting device. This allows unnecessary power consumption to be reduced.

With one embodiment, the control target voltage may be proportional to a voltage that occurs at an output of the DC/DC converter. With this arrangement, a feedback loop is formed such that the output voltage of the DC/DC converter approaches the target voltage. This allows the response speed required for the DC/DC converter to be reduced.

With one embodiment, the feedback circuit may include a subtraction circuit having an operational amplifier.

With one embodiment, the voltage setting circuit may include: a microcontroller structured to generate a digital signal; and a D/A converter structured to convert the digital signal into the correction voltage. This allows the output voltage of the DC/DC converter or the voltage at the power supply terminal of the array-type light-emitting device to be controlled by software.

With one embodiment, the variable light distribution light source may include multiple array-type light-emitting devices. Also, the power supply circuit may include multiple power supply units that correspond to the multiple array-type light-emitting devices.

2. A lamp system according to one embodiment is provided with a variable light distribution light source including an array-type light-emitting device and a power supply circuit. The array-type light-emitting device includes a power supply terminal and multiple pixel circuits electrically coupled in parallel and spatially arranged in a matrix. The power supply circuit includes a power supply unit structured to supply electric power to the array-type light-emitting device. The power supply unit includes: a DC/DC converter having an output coupled to the array-type light-emitting device via a power supply cable; a sense terminal coupled to the power supply terminal of the array-type light-emitting device via a sense line separated from the power supply cable; and a converter controller structured to control the DC/DC converter based on a first feedback voltage that corresponds to the sense voltage that occurs at the sense terminal.

With this arrangement, the sense line is added independent of the power supply cable. This allows the power supply voltage at the power supply terminal of the array-type light-emitting device to be directly sensed. This allows a stable power supply voltage to be supplied to the power supply terminal of the array-type light-emitting device. With this, the DC/DC converter is not required to generate a higher voltage than necessary, thereby allowing power consumption to be reduced.

With one embodiment, the feedback circuit may include a voltage dividing circuit structured to divide the sense voltage or a voltage that corresponds to the sense voltage. In this case, the target value of the voltage at the power supply terminal of the array-type light-emitting device can be set according to the voltage division ratio of the voltage dividing circuit.

With one embodiment, the feedback circuit may include an amplifier structured to amplify the sense voltage or a voltage that corresponds to the sense voltage. In this case, the target value of the voltage at the power supply terminal of the array-type light-emitting device can be set according to the gain of the amplifier.

With one embodiment, the feedback circuit may be structured to generate a second feedback voltage based on a voltage at the output terminal in addition to the first feedback voltage. Also, the feedback circuit may supply one from among the first feedback voltage and the second feedback voltage to the converter controller.

With one embodiment in which two feedback paths are provided, this allows the robustness of the system to be improved. Alternatively, by switching the feedback path according to the operation situation of the lamp system, this allows the performance of the power supply system to be improved.

With one embodiment, the feedback circuit may include an abnormality detection circuit structured to detect an abnormality in the sense line. When the sense line operates normally, the feedback circuit may supply the first feedback voltage to the converter controller. When an abnormality is detected in the sense line, the feedback circuit may supply the second feedback voltage to the converter controller. When an abnormality such as an open-circuit fault, a short-circuit fault, or the like, has occurred in the sense line, the feedback voltage is switched to the second feedback voltage, thereby maintaining the operation of the array-type light-emitting device.

With one embodiment, the abnormality detection circuit may detect an open-circuit fault in the sense line. When there is an open-circuit fault (i.e., a disconnection) in the sense line, the first feedback voltage does not change from 0 V. If the converter controller continues the feedback control in this situation, the output voltage of the DC/DC converter continues to rise, resulting in an overvoltage state. Accordingly, with such an arrangement in which an open fault is detected, this allows the overvoltage of the DC/DC converter to be suppressed.

In one embodiment, the abnormality detection circuit may include a voltage comparator configured to compare the sense voltage or a voltage that corresponds to the sense voltage with a predetermined threshold value. Also, when the sense voltage becomes lower than the threshold value, the abnormality detection circuit may judge that there is an abnormality.

With one embodiment, when detection of the abnormality continues for a predetermined period of time, the power supply circuit may stop the supply of electric power to the variable light distribution light source.

With one embodiment, the variable light distribution light source may include multiple array-type light-emitting devices. Also, the power supply circuit may include multiple power supply units that correspond to the multiple array-type light-emitting devices. With this arrangement, the variable light distribution light source has a configuration provided by division thereof into multiple array-type light-emitting devices each having an independent power supply terminal. Furthermore, a power supply unit is provided for each array-type light-emitting device. The array-type light-emitting devices and the power supply units are coupled in a one-to-one manner via power supply cables. With this, the current that flows through the variable light distribution light source can be distributed to the DC/DC converters of the multiple systems. This allows the effects of the voltage drop that occurs in each DC/DC converter to be reduced, thereby providing improved load responsiveness. In addition, this allows the number of options for the components of the DC/DC converter, power supply cables, connectors, to be increased, thereby providing an improved degree of design freedom.

3. A lamp system includes: a variable light distribution light source that includes multiple array-type light-emitting devices each including a power supply terminal and multiple pixel circuits electrically coupled in parallel and spatially arranged in a matrix; multiple power supply units that correspond to the multiple array-type light-emitting devices; multiple power supply cables that couple output terminals of the multiple power supply units and the power supply terminals of the multiple array-type light-emitting devices; and a controller structured to control on/off states of the multiple pixel circuits of the multiple array-type light-emitting devices according to a light distribution instruction.

With this arrangement, the variable light distribution light source has a configuration provided by division thereof into multiple array-type light-emitting devices each having an independent power supply terminal. Furthermore, a power supply unit is provided for each array-type light-emitting device. The array-type light-emitting devices and the power supply units are coupled in a one-to-one manner via power supply cables. This allows at least one of the problems described above to be solved.

With one embodiment, output beams of the multiple array-type light-emitting devices may be irradiated to different positions in a horizontal direction.

A lamp system according to one embodiment includes an array-type light-emitting device including multiple pixel circuits electrically coupled in parallel and spatially arranged in a matrix, wherein the multiple pixel circuits are divided into multiple segments each provided with a power supply terminal; multiple power supply units that correspond to the multiple segments; multiple power supply cables that couple output terminals of the multiple power supply units and the power supply terminals of the multiple segments; and a controller structured to control on/off states of the multiple pixel circuits of the array-type light-emitting device according to a light distribution instruction.

With this arrangement, the multiple pixels of the array-type light-emitting device are divided into multiple segments. Furthermore, an independent power supply terminal is provided for each segment, and a power supply unit is provided for each segment. This allows at least one of the problems described above to be solved.

With one embodiment, the multiple pixel circuits may be divided into the multiple segments such that output beams of the multiple segments are irradiated to different positions with respect to a horizontal direction. Also, the multiple pixel circuits may be divided into the multiple segments such that output beams of the multiple segments are irradiated to different positions with respect to a vertical direction.

With one embodiment, each of the multiple power supply units may include a phase-shift converter. With such an arrangement employing such phase-shift converters, this is capable of reducing ripple in the output voltage and the output current as compared with an arrangement employing single-phase converters. In addition, this provides improved efficiency. Furthermore, in a case in which the variable light distribution light source is PWM-controlled, the output current of each power supply unit fluctuates at high speed according to the lighting-on ratio of the multiple pixel circuits. With such an arrangement employing such phase-shift converters, such an arrangement provides improved tracking performance (responsiveness) with respect to load fluctuations.

4. A lamp system according to one embodiment is provided with a variable light distribution light source including an array-type light-emitting device and a power supply circuit. The array-type light-emitting device includes a power supply terminal and multiple pixel circuits electrically coupled in parallel and spatially arranged in a matrix. The power supply circuit includes a power supply unit structured to supply electric power to the array-type light-emitting device. The power supply unit includes: a DC/DC converter having an output coupled to the array-type light-emitting device via a power supply cable; a sense terminal coupled to the power supply terminal of the array-type light-emitting device via a sense line separated from the power supply cable; a converter controller structured to control the DC/DC converter; and a monitoring circuit structured to detect an electrical state of the power supply cable based on at least a sense voltage that occurs at the sense terminal.

Examples of the "electrical state of the power supply cable" includes disconnection of a power supply line, disconnection of a ground line, a connector becoming detached, a short-circuit fault in a ground line, a short-circuit fault in a power supply line, an impedance of a power supply line, etc.

With one embodiment, the monitoring circuit may convert a first voltage that corresponds to the output voltage into a first digital value. Also, the monitoring circuit may convert a second voltage that corresponds to the sense voltage into a second digital value. When the difference between the first digital value and the second digital value is larger than a predetermined value, the monitoring circuit may judge that the power supply cable is disconnected.

With one embodiment, the power supply circuit may include a built-in A/D converter, and a microcontroller structured to convert the first voltage and the second voltage into a first digital value and a second digital value. Also, the monitoring circuit may be implemented in the microcontroller.

In one embodiment, the microcontroller may calculate the impedance of the power supply cable based on the first digital value and the second digital value.

With one embodiment, the monitoring circuit may detect an impedance of the power supply cable based on the output voltage, the sense voltage, and an output current of the DC/DC converter.

With one embodiment, the converter controller may control the DC/DC converter such that the output voltage approaches a target voltage. With this arrangement, a feedback loop is formed such that the output voltage of the DC/DC converter approaches a target voltage. This allows the response speed required for the DC/DC converter to be reduced.

With one embodiment, the converter controller may control the DC/DC converter such that the sense voltage approaches a target voltage. With this arrangement, a feedback loop is formed such that an appropriate power supply voltage is supplied to the power supply terminal of the array-type light-emitting device. Accordingly, this allows unnecessary power consumption to be reduced.

With one embodiment, the variable light distribution light source may include multiple array-type light-emitting devices. Also, the power supply circuit may include multiple power supply units that correspond to the multiple array-type light-emitting devices.

It should be noted that any combination of the components, any component, or any manifestation described above may be mutually substituted between a method, apparatus, system, and so forth, which are also effective as an embodiment of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Figure 1:
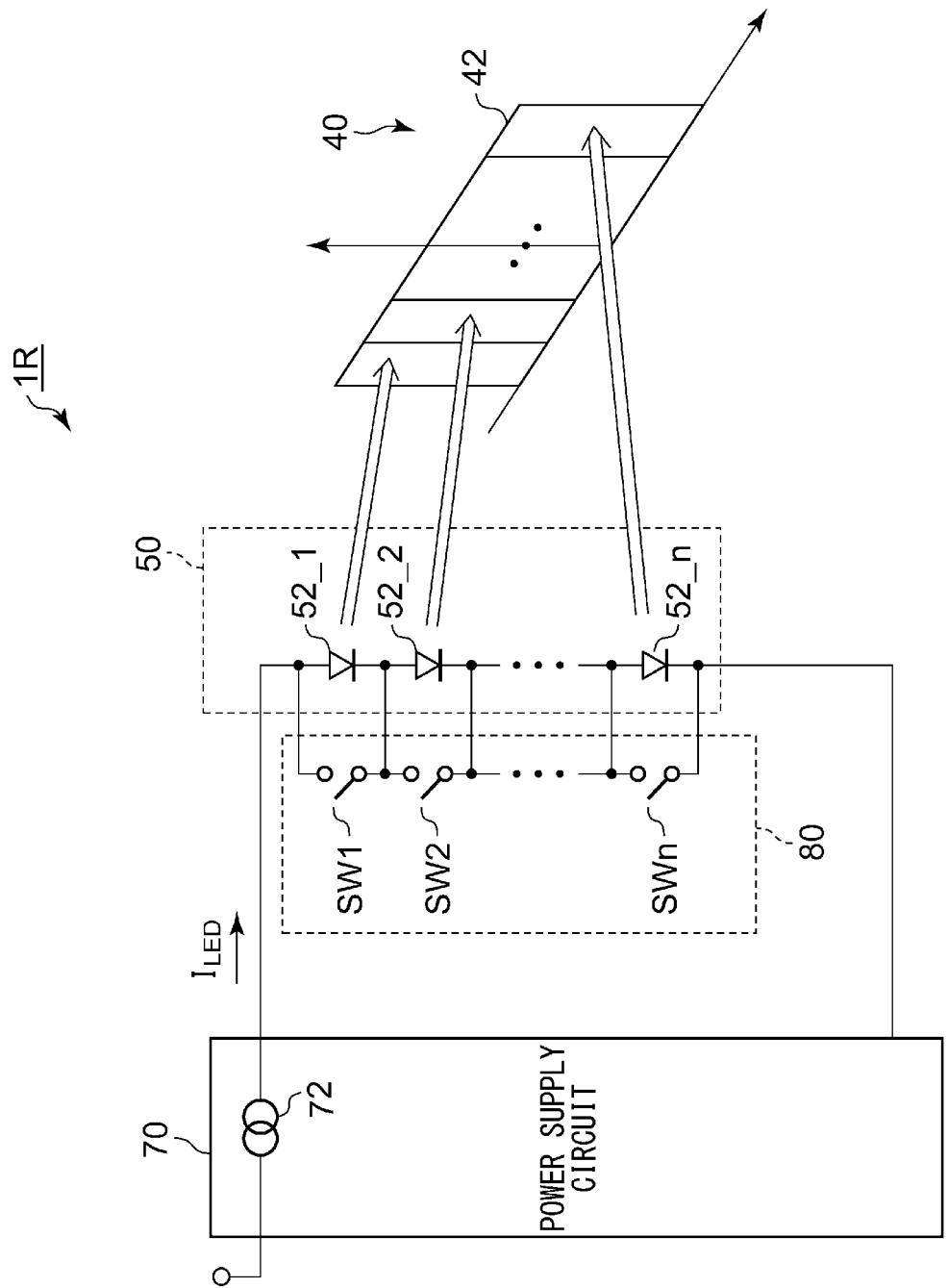
FIG. 1 is a block diagram showing a lamp employing a bypass method.

Description will be made below regarding the present invention based on preferred embodiments with reference to the drawings. The same or similar components, members, and processes are denoted by the same reference numerals, and redundant description thereof will be omitted as appropriate. The embodiments have been described for exemplary purposes only, and are by no means intended to restrict the present invention. Also, it is not necessarily essential for the present invention that all the features or a combination thereof be provided as described in the embodiments.

In the present specification, the state represented by the phrase "the member A is coupled to the member B" includes a state in which the member A is indirectly coupled to the member B via another member that does not substantially affect the electric connection between them, or that does not damage the functions or effects of the connection between them, in addition to a state in which they are physically and directly coupled.

Similarly, the state represented by the phrase "the member C is provided between the member A and the member B" includes a state in which the member A is indirectly coupled to the member C, or the member B is indirectly coupled to the member C via another member that does not substantially affect the electric connection between them, or that does not damage the functions or effects of the connection between them, in addition to a state in which they are directly coupled.

In the present specification, the reference symbols denoting electric signals such as a voltage signal, current signal, or the like, and the reference symbols denoting circuit elements such as a resistor, capacitor, or the like, also represent the corresponding voltage value, current value, resistance value, or capacitance value as necessary.

Embodiment 1

Description will be made in embodiments 1.1 and 1.2 regarding a technique relating to the problem 1 described above.

Embodiment 1.1

Figure 5:
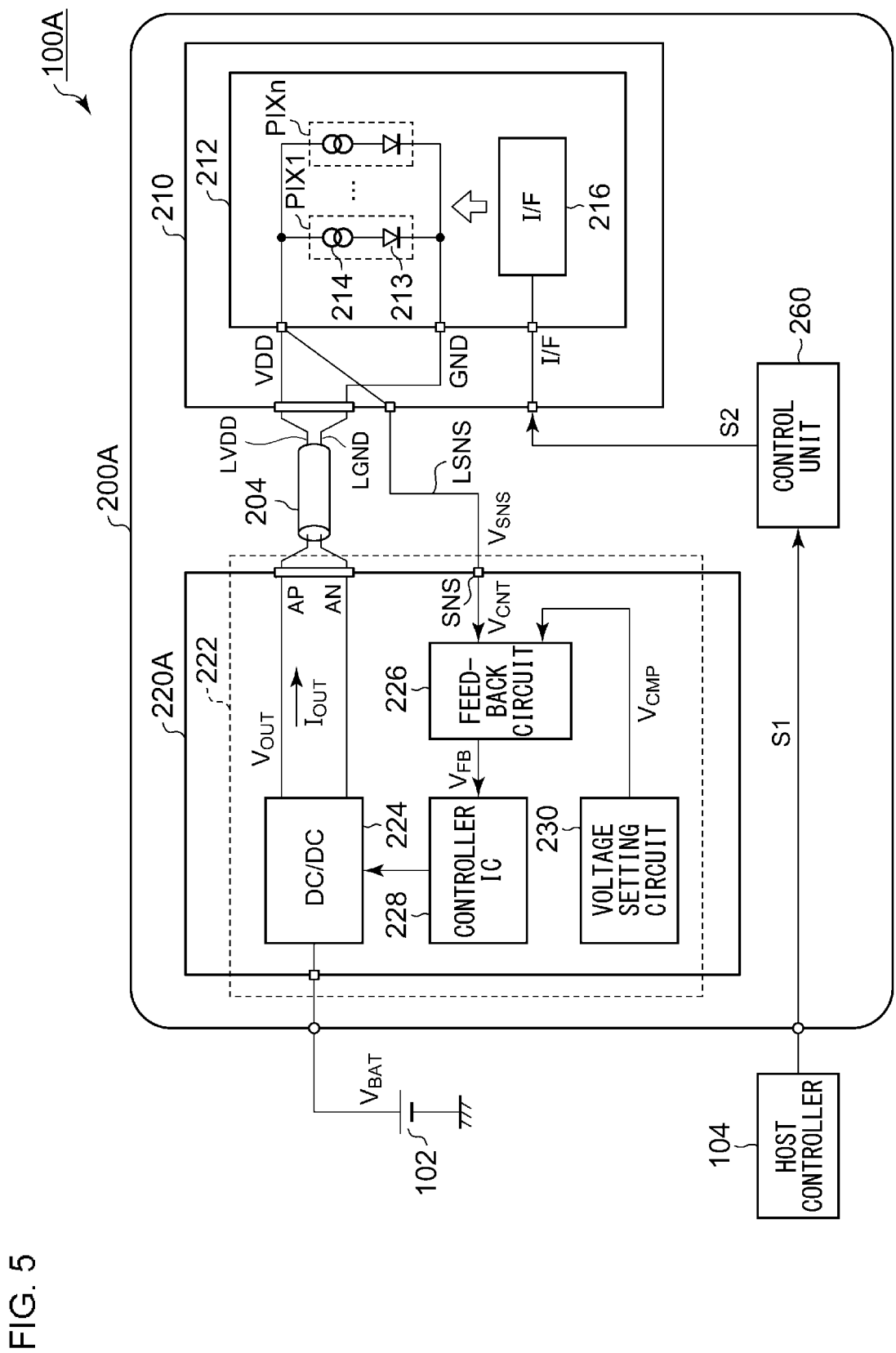
FIG. 5 is a block diagram showing a lamp system according to an embodiment 1.1.

FIG. 5 is a block diagram showing a lamp system 100A according to an embodiment 1.1. The lamp system 100A is configured as an ADB lamp system including a battery 102, a host controller 104, and a headlamp 200A.

The host controller 104 generates a light distribution instruction for the headlamp 200. The light distribution instruction may include a lighting instruction and additional information. The lighting instruction may include a signal for specifying the on/off of the high beam or low beam. A basic light distribution to be formed by the headlamp 200 is determined according to the lighting instruction. On the other hand, the additional information may include data with respect to a region (shielded region) that should not be irradiated with the high beam and information with respect to the vehicle speed, steering angle, etc. The basic light distribution is modified according to the additional information, thereby determining the final light distribution. The host controller 104 may be configured as a vehicle-side ECU. Also, the host controller 104 may be configured as a lamp-side ECU built into the headlamp 200.

The headlamp 200A is configured as an ADB lamp including a variable light distribution light source 210, a power supply circuit 220A, and a control unit 260.

The variable light distribution light source 210 is provided with multiple pixels arranged in an array, and is configured to be capable of independently controlling the on/off state of each pixel. In the headlamp 200, the on/off states of the multiple pixels are controlled so as to provide a desired light distribution.

More specifically, the variable light distribution light source 210 includes an array-type light-emitting device 212. The array-type light-emitting device 212 includes n pixel circuits PIX1 through PIXn and a power supply terminal VDD coupled to the multiple pixel circuits PIX1 through PIXn.

Each pixel circuit PIXj (1≤j≤n) includes a light-emitting element 213_j and a current source 214_j provided in series between the power supply terminal VDD and a ground terminal (ground line) GND. The multiple light-emitting elements 213_1 through 213_n are each configured as a semiconductor light-emitting element such as an LED, LD (semiconductor laser), organic EL element, or the like, and are spatially arranged in an array (in a matrix).

The multiple current sources 214_1 through 214_n are each configured to have independently controllable on/off states. When the j-th current source 214_j is turned on, the corresponding light-emitting element 213_j emits light. That is to say, the corresponding pixel circuit PIXj is set to the lighting-on state.

An interface circuit 216 controls the on/off states of the current sources 214_1 through 214_n according to a control signal S2 from the control unit 260. The interface circuit 216 is coupled to the control unit 260 via a high-speed serial interface, and receives the control signal S2 for specifying the on/off states of all the pixels.

The power supply circuit 220A supplies electric power to the variable light distribution light source 210. The power supply circuit 220A includes a converter for outputting a constant voltage. The power supply circuit 220A supplies the stabilized power supply voltage $V_{DD}$ to the power supply terminal VDD of the array-type light-emitting device 212. The power supply voltage $V_{DD}$ is determined based on $V_F + V_{SAT}$. Typically, the power supply voltage $V_{DD}$ is set to on the order of 4 to 5 V. Here, $V_F$ represents the forward voltage of the light-emitting element 213, and $V_{SAT}$ represents the minimum operating voltage of the current source 214. Accordingly, the power supply unit 222 may be configured as a step-down converter (Buck converter) that steps down a battery voltage $V_{BAT}$ on the order of 12 V (or 24 V).

The control unit 260 receives a light distribution instruction S1 from the host controller 104, generates a control signal S2 that corresponds to the light distribution instruction S1, and transmits the control signal S2 to the variable light distribution light source 210. For example, the control unit 260 PWM-controls the multiple pixel circuits PIX1 through PIXn of the array-type light-emitting device 212 so as to control the light distribution. A PWM frequency of several hundred Hz (e.g., 100 to 400 Hz) is employed. Accordingly, the PWM cycle is set to several milliseconds to several dozen milliseconds (ms).

Next, description will be made regarding the configuration of the power supply circuit 220A. The power supply circuit 220A is configured including a power supply unit 222. The power supply unit 222 includes output terminals AP/AN, a sense terminal SNS, a DC/DC converter 224, a feedback circuit 226, a converter controller 228, and a voltage setting circuit 230.

The output terminals AP/AN are coupled to the power supply terminal VDD and the ground terminal GND of the array-type light-emitting device 212 via a power supply cable 204. The power supply cable 204 includes a power supply line LVDD and a ground line LGND. The positive output of the DC/DC converter 224 is coupled to the power supply terminal VDD of the array-type light-emitting device 212 via the output terminal AP and the power supply line LVDD. The negative output of the DC/DC converter 224 is coupled to the ground terminal GND of the array-type light-emitting device 212 via the output terminal AN and the ground line LGND.

The sense terminal SNS is coupled to the power supply terminal VDD of the array-type light-emitting device 212 via a sense line (single-signal line) LSNS separated from the power supply line LVDD.

As the converter controller 228, a commercially available DC/DC converter control integrated circuit (IC) may be employed. The converter controller 228 generates a pulse signal where at least one from among the pulse width, frequency, and duty cycle is controllable, that is adjusted such that the feedback voltage $V_{FB}$ input to the feedback pin FB approaches the internally generated reference voltage $V_{REF}$. With this, the converter controller 228 feedback controls the DC/DC converter 224 according to the pulse signal.

The voltage setting circuit 230 generates a controllable correction voltage $V_{CMP}$. The feedback circuit 226 generates the feedback voltage $V_{FB}$ based on the correction voltage $V_{CMP}$ and a control target voltage $V_{CNT}$ that corresponds to the output voltage $V_{OUT}$ of the DC/DC converter 224, and supplies the feedback voltage $V_{FB}$ to the feedback pin FB of the converter controller 228. The feedback voltage $V_{FB}$ is a signal that changes according to both the control target voltage $V_{CNT}$ and the correction voltage $V_{CMP}$. The feedback voltage $V_{FB}$ is represented by the following Expression (1).

$$V_{FB} = K_1 \cdot V_{CNT} + K_2 \cdot V_{CMP} \quad (1)$$

Here, $K_1$ is a constant that is larger than 0, and $K_2$ is a non-zero constant. Description will be made assuming that $K_2 < 0$. The converter controller 228 controls the DC/DC converter 224 such that the feedback signal $V_{FB}$ approaches the target voltage $V_{REF}$.

In a steady state in which the system is stabilized, the relation $K_1 \cdot V_{CNT} + K_2 \cdot V_{CMP} = V_{REF}$ holds true. Accordingly, in the steady state, the control target voltage $V_{CNT}$ is stabilized to the target voltage $V_{CNT(REF)}$.

$$V_{CNT(REF)} = (V_{REF} - K_2 \cdot V_{CMP}) K_1 \quad (2)$$

In the embodiment 1.1, as the control target voltage $V_{CNT}$, the voltage $V_{DD}$ at the power supply terminal VDD of the array-type light-emitting device 212 is employed. The power supply unit 222 includes the sense terminal SNS coupled to the power supply terminal VDD of the array-type light-emitting device 212 via a sense line LSNS separated from the power supply line LVDD. The feedback circuit 226 has a sufficiently high input impedance. Accordingly, no current flows through the sense line LSNS. Accordingly, the sense voltage $V_{SNS}$ is equal to the voltage $V_{DD}$ at the power supply terminal VDD of the array-type light-emitting device 212. The sense voltage $V_{SNS}$ that occurs at the sense terminal SNS is input to the feedback circuit 226 as the control target voltage $V_{CNT}$. Accordingly, the target voltage $V_{DD(REF)}$ of the power supply voltage $V_{DD}$ is represented by the following Expression (3).

$$V_{DD(REF)} = (V_{REF} - K_2 \cdot V_{CMP})/K_1 \quad (3)$$

Figure 6:
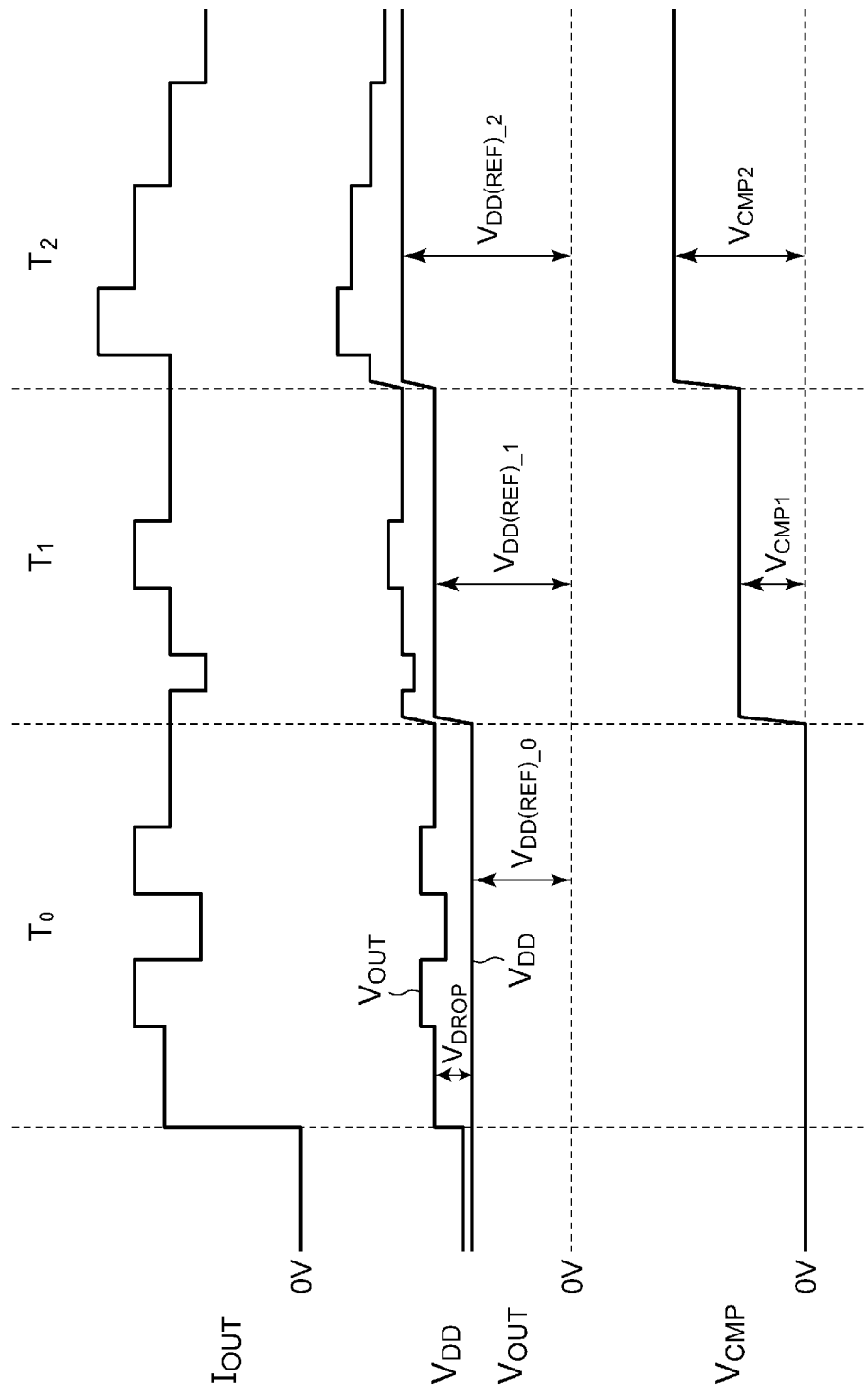
FIG. 6 is an operation waveform diagram of the lamp system shown in FIG. 5.

The above is the configuration of the lamp system 100A. Next, description will be made regarding the operation thereof. FIG. 6 is an operation waveform diagram of the lamp system 100A shown in FIG. 5. In the period $T_0$, the correction voltage $V_{CMP}$ is set to 0 V. In this period $T_0$, the power supply voltage $V_{DD}$ is stabilized to $V_{DD(REF)\_0} = V_{REF}/K_1$. The output voltage $V_{OUT}$ of the DC/DC converter 224 is higher than the power supply voltage $V_{DD}$ by a voltage drop $V_{DROP}$ that occurs in the power supply line LVDD, connectors, etc., as represented by the following Expression (4).

$$V_{OUT} = V_{DD} + V_{DROP} = V_{DD} + R \times I_{OUT} \quad (4)$$

Here, R represents the impedance of the power supply line LVDD and connectors. It should be noted that, for ease of understanding, description will be made ignoring the voltage drop that occurs in the ground line LGND. In the lighting-on period of the lamp system 100A, fluctuation occurs in the operating current $I_{OUT}$ of the array-type light-emitting device 212. From the viewpoint of a long time scale, the average value of the output current $I_{OUT}$ fluctuates according to the light distribution formed by the headlamp 200A. In contrast, from the viewpoint of a short time scale, the instantaneous value of the output current $I_{OUT}$ fluctuates with the PWM control cycle. FIG. 6 shows the fluctuation of the output current $I_{OUT}$ in long and short time scales. With the embodiment 1.1, the power supply voltage $V_{DD}$ is stabilized, and the output voltage $V_{OUT}$ fluctuates according to the output current $I_{OUT}$.

In the period $T_1$, the correction voltage $V_{CMP}$ is set to a positive value $V_{CMP1}$. In this period $T_1$, the target value $V_{DD(REF)\_1}$ of the power supply voltage $V_{DD}$ is represented by $V_{DD(REF)\_1} = (V_{REF} - K_2 \cdot V_{CMP})/K_1$. Here, $K_2$ is a negative constant. Accordingly, the target value $V_{DD(REF)}$ of the power supply voltage $V_{DD}$ is represented by $V_{DD(REF)\_1} = (V_{REF} - |K_2|V_{CMP1})/K_1$. That is to say, the target value $V_{DD(REF)\_1}$ is a voltage obtained by offsetting the target value $V_{DD(REF)\_0}$ in the period $T_0$ in the positive direction by $|K_2| \cdot V_{CMP1}/K_1$.

When the correction voltage $V_{CMP}$ is set to an even higher value $V_{CMP2}$ in the period $T_2$, the target value $V_{DD(REF)\_2}$ of the power supply voltage $V_{DD}$ in the period $T_2$ is represented by $V_{DD(REF)\_2} = (V_{REF} - K_2 \cdot V_{CMP2})/K_1$. That is to say, the target value $V_{DD(REF)\_2}$ is a voltage obtained by offsetting the target value $V_{DD(REF)\_0}$ in the period $T_0$ in the positive direction by $|K_2| \cdot V_{CMP2}/K_1$.

The above is the operation of the lamp system 100A. With the lamp system 100A, this allows the voltage $V_{DD}$ at the power supply terminal VDD of the array-type light-emitting device 212 to be flexibly set according to the correction voltage $V_{CMP}$.

From the viewpoint of reducing the power consumption, the power supply voltage $V_{DD}$ to be supplied to the array-type light-emitting device 212 is preferably set to as low a value as possible in a range that is higher than the minimum operating voltage $V_{DD(MIN)}$. With the embodiment 1.1, the target value $V_{DD(REF)}$ of the power supply voltage $V_{DD}$ can be flexibly set using the correction value $V_{CMP}$. This allows operation in a lower power-consumption state.

Next, description will be made regarding examples of control of the correction voltage $V_{CMP}$.

Control Example 1

The correction voltage $V_{CMP}$ may be set according to the model or kind of the array-type light-emitting device 212. Alternatively, the correction voltage $V_{CMP}$ may be independently set for each array-type light-emitting device 212.

Control Example 2

The correction voltage $V_{CMP}$ may be dynamically and adaptively changed in the operation of the lamp system 100A. For example, the correction voltage $V_{CMP}$ may be changed according to the operating environment of the headlamp 200A, e.g., according to the temperature. In a case in which the minimum operating voltage $V_{DD(MIN)}$ of the array-type light-emitting device 212 fluctuates according to the temperature, by changing the correction voltage $V_{CMP}$ according to the temperature, such an arrangement is capable of optimizing the power supply voltage V.

Control Example 3

The correction voltage $V_{CMP}$ may be set based on the information from the array-type light-emitting device 212. The array-type light-emitting device 212 knows the optimum power supply voltage $V_{DD}$ to be supplied as its own power supply voltage $V_{DD}$. Accordingly, a communication interface may be arranged as an additional component between the array-type light-emitting device 212 and the voltage setting circuit 230. With this, a control signal for directly or indirectly specifying the optimum power supply voltage $V_{DD}$ may be transmitted from the array-type light-emitting device 212 to the voltage setting circuit 230. Also, the correction voltage $V_{CMP}$ may be generated based on the control signal.

Control Example 4

The correction voltage $V_{CMP}$ may be set according to the light distribution pattern to be formed by the headlamp 200A.

Next, description will be made regarding example configurations of the voltage setting circuit 230 and the feedback circuit 226.

Figure 7:
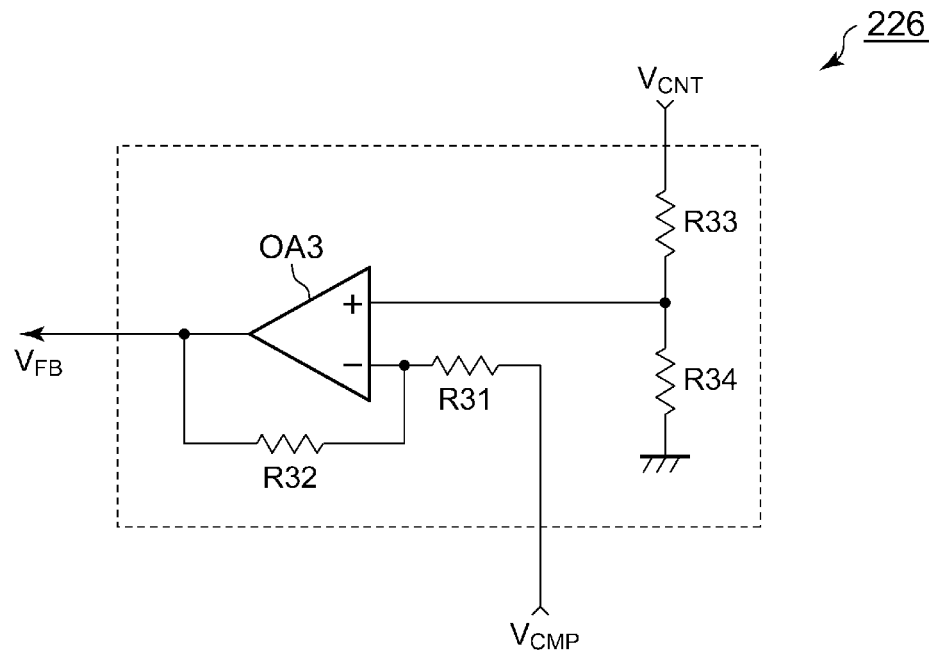
FIG. 7 is a circuit diagram showing an example configuration of a feedback circuit.

FIG. 7 is a circuit diagram showing an example configuration of the feedback circuit 226. The feedback circuit 226 is configured as a subtraction circuit including an operational amplifier. Specifically, the feedback circuit 226 includes resistors R31 through R34 and an operational amplifier OA3. The input/output characteristics of the feedback circuit 226 are represented by the following Expression (5).

$$V_{FB} = (R31+R32)/R31 \times \{R34/(R33+R34) \times V_{CNT} - R32/(R31+R32) \times V_{CMP}\} \quad (5)$$

In contrast to Expressions (1) and (5), the following expressions can be obtained.

$$K_1 = (R31+R32)/R31 \times R34/(R33+R34)$$

$$K_2 = -(R31+R32)/R31 \times R32/(R31+R32)$$

It should be noted that the feedback circuit 226 may be configured as an adder circuit employing an operational amplifier. In this case, $K_1 > 0$ and $K_2 > 0$ hold true. In a case in which the correction voltage $V_{CMP}$ is a positive value, the target voltage of the control target voltage $V_{CMP}$ can be shifted toward the low electric potential side according to the correction voltage $V_{CMP}$.

Figure 8:
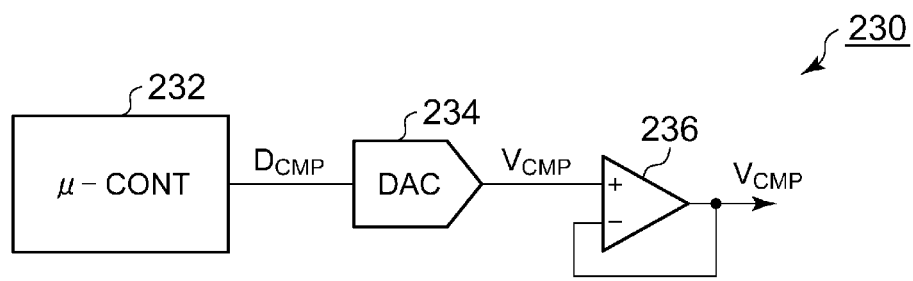
FIG. 8 is a circuit diagram showing an example configuration of a voltage setting circuit.

FIG. 8 is a circuit diagram showing an example configuration of the voltage setting circuit 230. The voltage setting circuit 230 includes a microcontroller 232, a D/A converter 234, and a buffer 236. The microcontroller 232 generates a digital setting value $D_{CMP}$ for specifying the correction voltage $V_{CMP}$. By employing the microcontroller 232, such an arrangement allows the correction voltage $V_{CMP}$ to be controlled by software. In particular, in a case in which the correction voltage $V_{CMP}$ is to be dynamically and adaptively changed as described in the example configurations 2 and 3, such software control is preferably employed.

The D/A converter 234 converts the setting value $D_{CMP}$ generated by the microcontroller 232 into an analog correction voltage $V_{CMP}$. The correction voltage $V_{CMP}$ is supplied to the feedback circuit 226 via the buffer 236. It should be noted that, in a case in which the D/A converter 234 has a sufficiently low output impedance, the buffer 236 may be omitted. Also, in a case of employing the microcontroller 232 including the D/A converter as a built-in component, the D/A converter 234 is provided as an internal component of the microcontroller 232.

Embodiment 1.2

Figure 9:
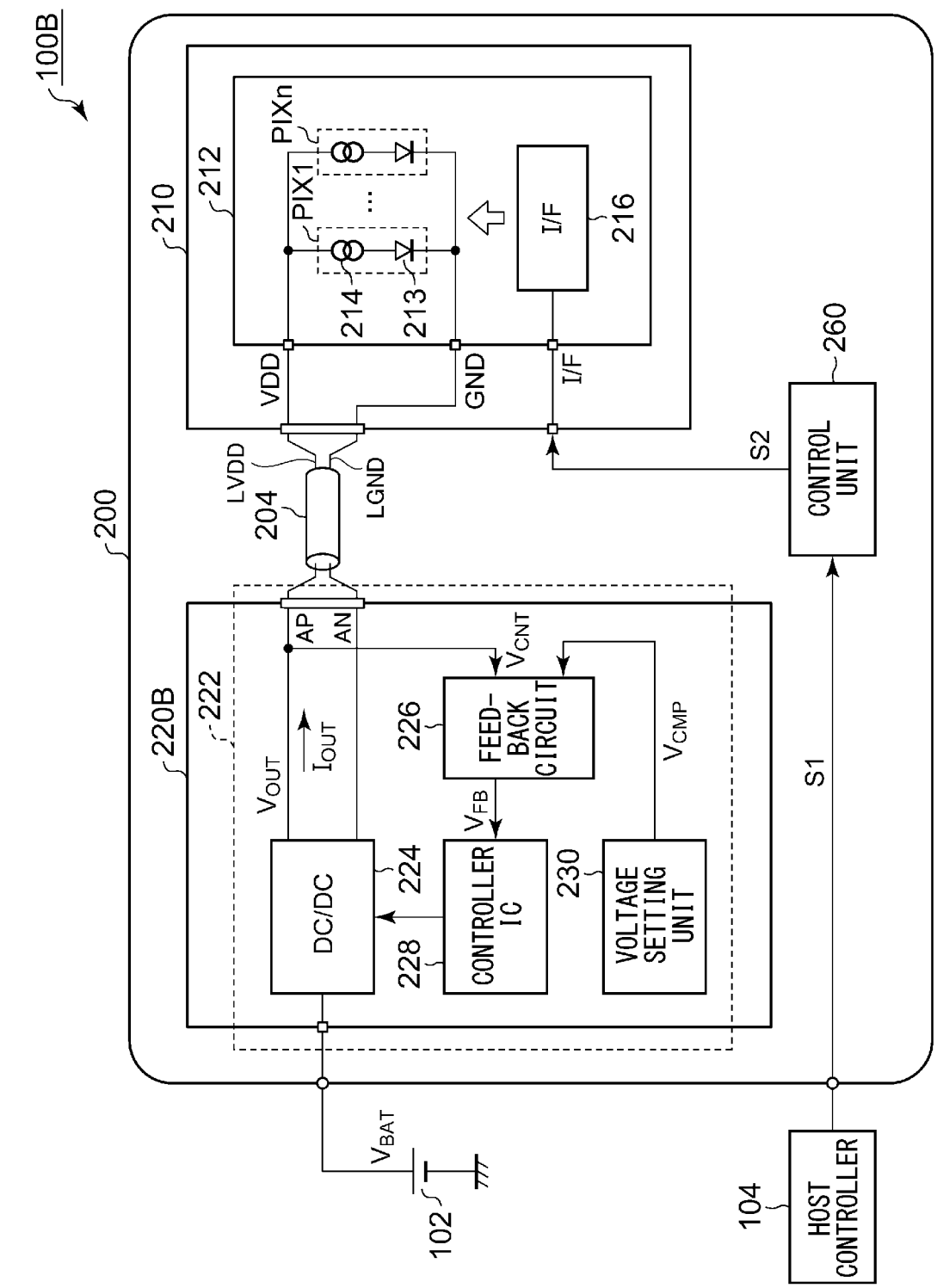
FIG. 9 is a block diagram showing a lamp system according to an embodiment 1.2.

FIG. 9 is a block diagram showing a lamp system 100B according to an embodiment 1.2. Description will be made regarding the configuration of the lamp system 100B directing attention to the points of difference from the embodiment 1.1.

A headlamp 200B includes a variable light distribution light source 210, a power supply circuit 220B, and a control unit 260. In the embodiment 1.2, the power supply circuit 220B has a configuration that differs from that of the power supply circuit 220A according to the embodiment 1.1.

Description will be made regarding the configuration of the power supply circuit 220B. The power supply unit 222 of the power supply circuit 220B includes output terminals AP/AN, a DC/DC converter 224, a feedback circuit 226, a converter controller 228, and a voltage setting circuit 230.

The voltage setting circuit 230 generates a controllable correction voltage $V_{CMP}$. The feedback circuit 226 generates the feedback voltage $V_{FB}$ based on the correction voltage $V_{CMP}$ and the control target voltage $V_{CNT}$ that corresponds to the output voltage $V_{OUT}$ of the DC/DC converter 224, and supplies the feedback voltage $V_{FB}$ to the feedback pin FB of the converter controller 228.

In the embodiment 1.2, the output voltage $V_{OUT}$ of the DC/DC converter 224 is employed as the control target voltage $V_{CNT}$. The output voltage $V_{OUT}$ that occurs at the positive output (output terminal AP) of the DC/DC converter 224 is input as the control target voltage $V_{CNT}$ to the feedback circuit 226. Accordingly, the target voltage $V_{OUT(REF)}$ of the output voltage $V_{OUT}$ is represented by the following Expression (6).

$$V_{OUT(REF)} = (V_{REF} - K_2 \cdot V_{CMP})/K_1 \qquad (6)$$

Figure 10:
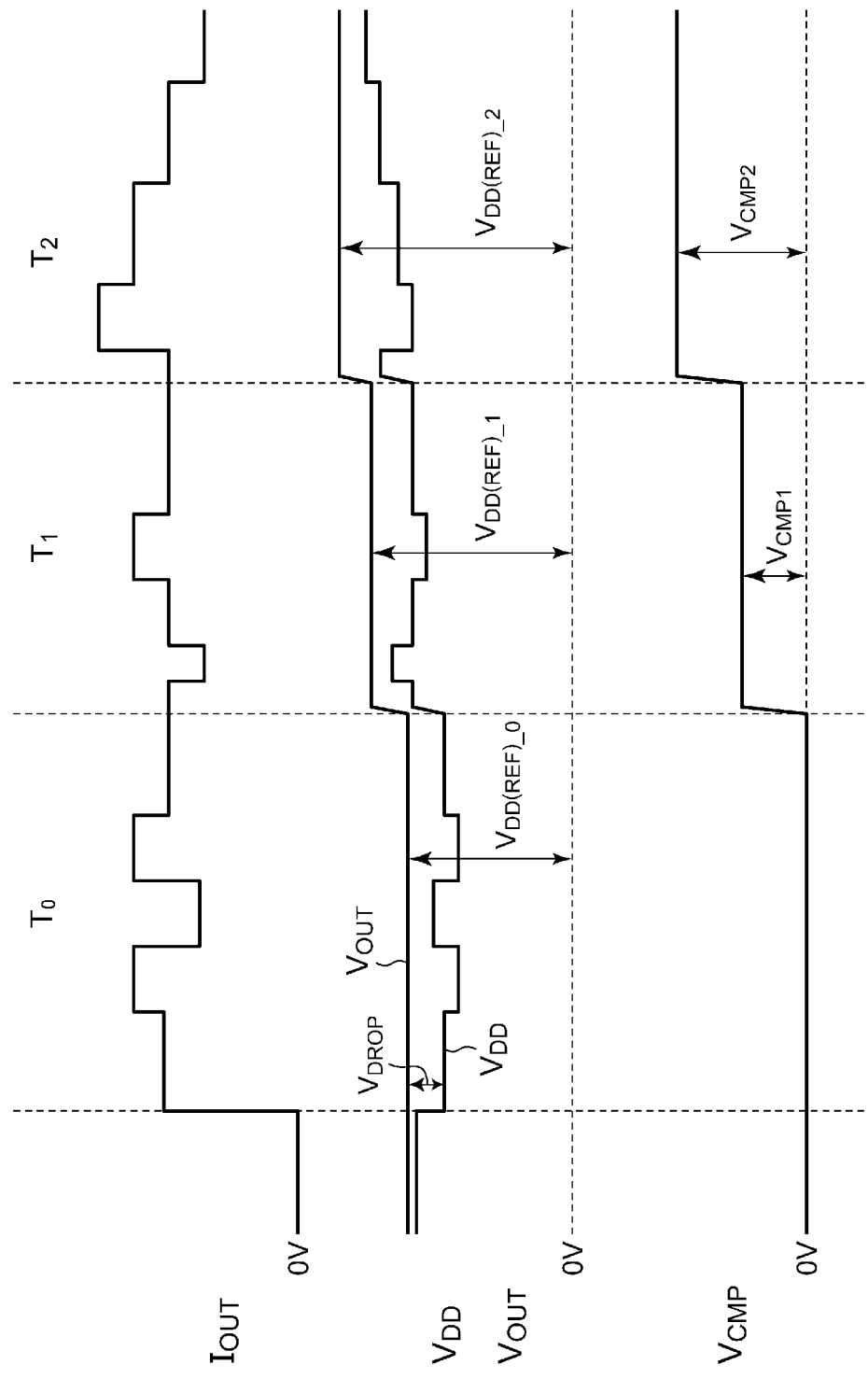
FIG. 10 is an operation waveform diagram of the lamp system shown in FIG. 9.

The above is the configuration of the lamp system 100B. Next, description will be made regarding the operation thereof. FIG. 10 is an operation waveform diagram of the lamp system 100B shown in FIG. 9. In the period $T_0$, the correction voltage $V_{CMP}$ is set to 0 V. In the period $T_0$, the output voltage $V_{OUT}$ is stabilized to $V_{OUT(REF)\_0} = V_{REF}/K_1$.

The power supply voltage $V_{DD}$ supplied to the array-type light-emitting device 212 is lower than the output voltage $V_{OUT}$ by a voltage drop $V_{DROP}$ that occurs in the power supply line LVDD, connectors, etc., and which is represented by the following Expression (7).

$$V_{DD} = V_{OUT} - V_{DROP} = V_{OUT} - R \times I_{OUT} \qquad (7)$$

Here, R represents the impedance of the power supply line LVDD and the connectors. In the lighting-on state of the lamp system 100B, the operating current $I_{OUT}$ of the array-type light-emitting device 212 fluctuates. Accordingly, with the embodiment 1.2, the output voltage $V_{OUT}$ is stabilized, and the power supply voltage $V_{DD}$ fluctuates according to the output current $I_{OUT}$.

In the period $T_1$, the correction voltage $V_{CMP}$ is set to a positive value $V_{CMP1}$. In the period $T_1$, the target value $V_{OUT(REF)\_1}$ of the output voltage $V_{OUT}$ is set to $V_{OUT(REF)\_1} = (V_{REF} - K_2 \cdot V_{CMP1})/K_1$. Here, $K_2$ is a negative constant. Accordingly, the target value $V_{OUT(REF)}$ of the output voltage $V_{OUT}$ is represented by $V_{OUT(REF)\_1} = (V_{REF} |K_2| \cdot V_{CMP1})/K_1$. That is to say, the target value $V_{OUT(REF)\_1}$ is a voltage obtained by offsetting the target value $V_{OUT(REF)\_0}$ in the period $T_0$ in the positive direction by $|K_2| \cdot V_{CMP1}/K_1$.

When the correction voltage $V_{CMP}$ is set to an even higher value $V_{CMP2}$ in the period $T_2$, the target value $V_{OUT(REF)\_2}$ of the output voltage $V_{OUT}$ in the period $T_2$ is set to $V_{OUT(REF)\_2} = (V_{REF} - K_2 \cdot V_{CMP2})/K_1$. That is to say, the target value $V_{OUT(REF)\_2}$ is a voltage obtained by offsetting the target value $V_{DD(REF)\_0}$ in the period $T_0$ in the positive direction by $|K_2| \cdot V_{CMP2}/K_1$.

The above is the operation of the lamp system 100B. With the lamp system 100B, the output voltage $V_{OUT}$ of the DC/DC converter 224 can be flexibly set according to the correction voltage $V_{CMP}$. This allows the voltage $V_{DD}$ at the power supply terminal VDD of the array-type light-emitting device 212 to be flexibly set.

In the embodiment 1.2, the correction voltage $V_{CMP}$ may be generated based on the control examples 1 through 4 described in the embodiment 1.1. Also, the correction voltage $V_{CMP}$ may be generated based on a control example 5. It should be noted that the control example 5 may be employed in the embodiment 1.1.

Control Example 5

In the embodiment 1.2, the correction voltage $V_{CMP}$ may be changed according to the output current $I_{OUT}$. In the embodiment 1.2, when the power supply voltage $V_{DD}$ becomes the lowest value, i.e., when the output current $I_{OUT}$ becomes the maximum value, the target voltage $V_{OUT(REF)}$ of the output voltage $V_{OUT}$ must be determined such that it does not become lower than the lowest operating voltage $V_{DD(MIN)}$. In this case, in a state in which the output current $I_{OUT}$ is low, an excessive power supply voltage $V_{DD}$ is supplied to the array-type light-emitting device 212. Accordingly, as a basic technique, the embodiment 1.2 has a disadvantage from the viewpoint of power consumption as compared with the embodiment 1.1. In order to solve such a problem, the correction voltage $V_{CMP}$ may be adaptively controlled according to the output current $I_{OUT}$. Specifically, the correction voltage $V_{CMP}$ may be controlled so as to lower the output voltage $V_{OUT}$ in a state in which the output current $I_{OUT}$ becomes low. Such an arrangement provides improved efficiency. For example, the voltage setting circuit 230 may monitor the output current $I_{OUT}$, and may generate the correction voltage $V_{CMP}$ based on the average value of the output current $I_{OUT}$.

Also, it can be said that the average value of the output current $I_{OUT}$ corresponds to the light distribution pattern formed by the headlamp 200B. Accordingly, the voltage setting circuit 230 may generate the correction voltage $V_{CMP}$ according to the light distribution pattern.

Description will be made regarding modifications relating to the embodiments 1.1 and 1.2.

Modification 1.1

Figure 11:
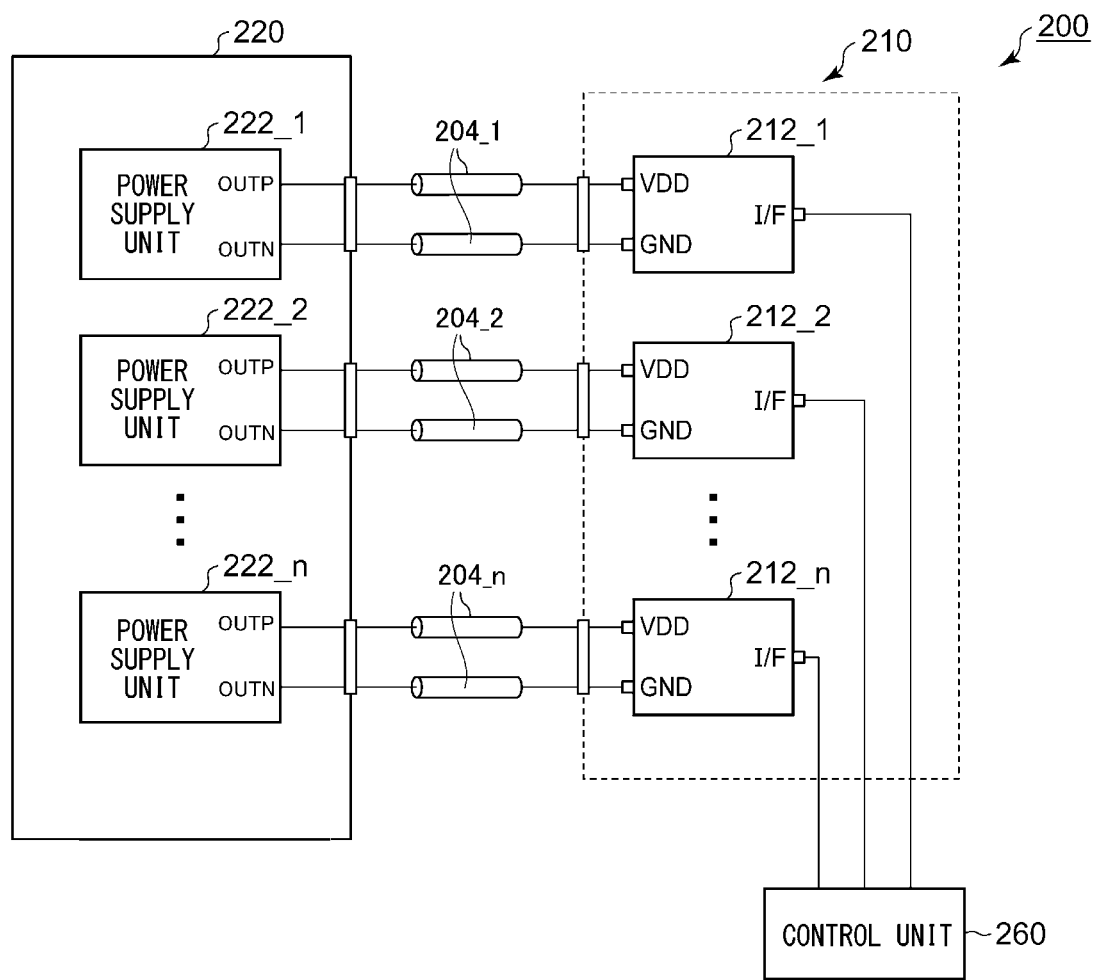
FIG. 11 is a block diagram showing a headlamp according to a modification 1.1.

FIG. 11 is a diagram showing the headlamp 200 according to a modification 1.1. Description has been made above regarding the variable light distribution light source 210 including a single array-type light-emitting device 212. Also, the variable light distribution light source 210 may include multiple array-type light-emitting devices 212. In this case, the power supply circuit 220A or 220B (which will be collectively referred to as the "power supply circuit 220") is provided with multiple power supply units 222 corresponding to the multiple array-type light-emitting devices 212. The output terminal of each power supply unit 222 is coupled to the power supply terminal of the corresponding array-type light-emitting device 212 via an independent power supply cable. Also, a sense line may preferably be provided for each pair of a power supply unit 222 and an array-type light-emitting device 212.

In the modification 1.1, the variable light distribution light source 210 has a configuration provided by division thereof into multiple array-type light-emitting devices 212 each having an independent power supply terminal. Furthermore, a power supply unit 222 is provided for each array-type light-emitting device 212. Moreover, each array-type light-emitting device 212 is coupled to a corresponding power supply unit 222 via a power supply cable in a one-to-one manner. This allows the current that flows through the variable light distribution light source 210 to be distributed to multiple DC/DC converters included in the multiple systems. This allows the effects of voltage drop that occurs in each DC/DC converter to be reduced, thereby providing improved load responsiveness. In addition, this allows the number of options for the components of the DC/DC converters, power supply cables, and connectors to be increased, thereby providing an improved degree of design freedom.

Modification 1.2

Figure 12:
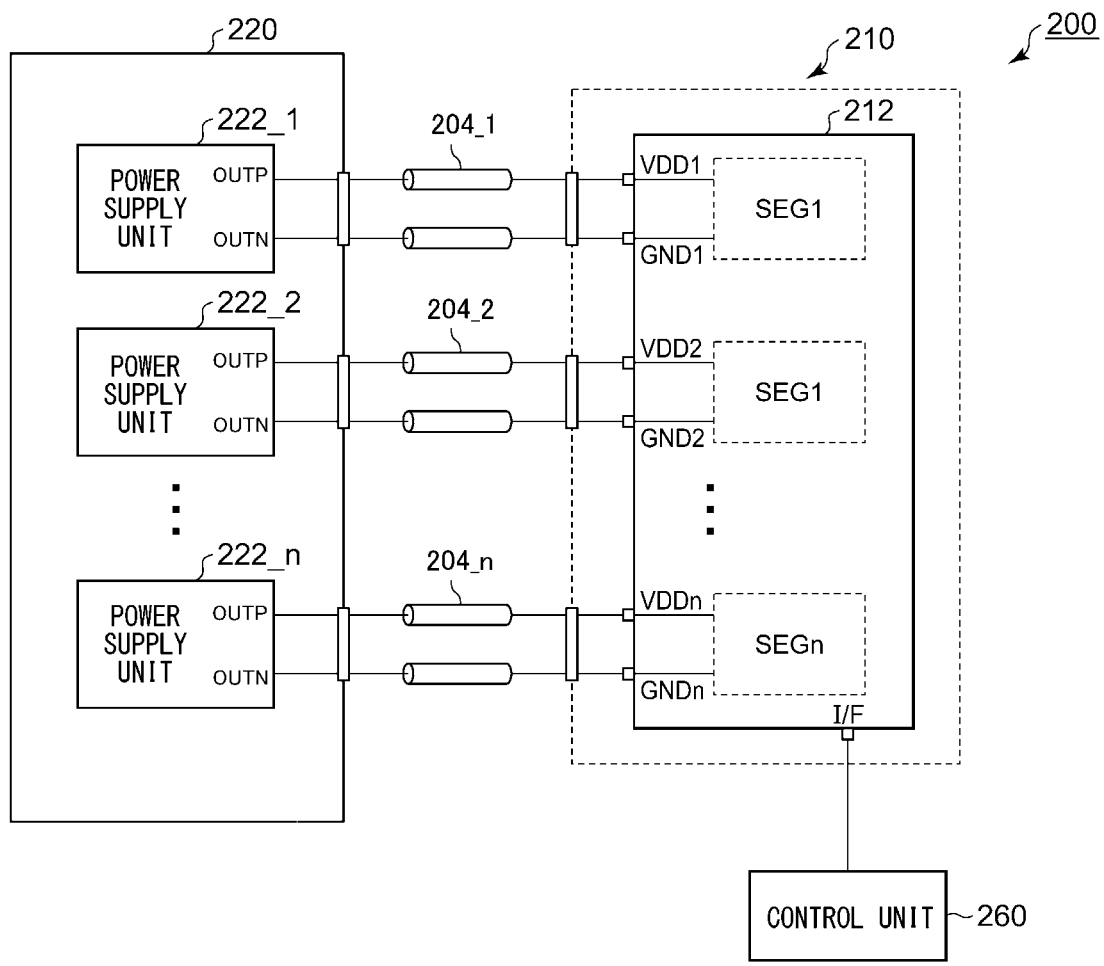
FIG. 12 is a block diagram showing a headlamp according to a modification 1.2.

FIG. 12 is a diagram showing the headlamp 200 according to a modification 1.2. The array-type light-emitting device 212 may be configured such that the multiple internal light-emitting pixels are divided into multiple segments SEG1 through SEGn. Also, the multiple segments SEG1 through SEGn may be provided with corresponding multiple power supply terminals VDD. The power supply circuit 220 is provided with multiple power supply units 222_1 through 222_n corresponding to the multiple power supply terminals VDD. The output terminal of each power supply unit 222 is coupled to the corresponding power supply terminal VDD of the array-type light-emitting device 212 via an independent power supply cable 204. Also, a sense line may preferably be provided for each power supply unit 222.

With the modification 1.2, this allows the current that flows through the variable light distribution light source 210 to be distributed to the DC/DC converters included in the multiple systems. Such an arrangement provides the same effects as in the modification 1.1.

Modification 1.3

The power supply unit 222 may be configured as a phase-shift converter. By employing such a phase-shift converter, this allows the ripples that occur in the output voltage $V_{OUTi}$ and the output current $I_{OUTi}$ to be reduced. Furthermore, such an arrangement provides improved efficiency. Furthermore, in a case in which PWM control is employed for each pixel circuit of the array-type light-emitting device 212, the output current $I_{OUTi}$ of the power supply unit 222 fluctuates at high speed according to the lighting-on ratio of the multiple pixel circuits. With this, by employing such a phase-shift converter, such an arrangement provides improved tracking performance (responsiveness) with respect to load fluctuations.

Modification 1.4

Description has been made regarding an arrangement in which the power supply circuit 220 and the control unit 260 are built into the headlamp 200. Also, either one or both of the power supply circuit 220 and the control unit 260 may be arranged outside the body of the headlamp 200. The variable light distribution light source 210 serves as a heat generator. Accordingly, an arrangement in which the control unit 260, which has a weak point with respect to heat, is arranged in the vehicle interior away from the variable light distribution light source 210 is advantageous from a thermal design viewpoint.

Embodiment 2

Description will be made in an embodiment 2 regarding a technique relating to the problem 2 described above.

Figure 13:
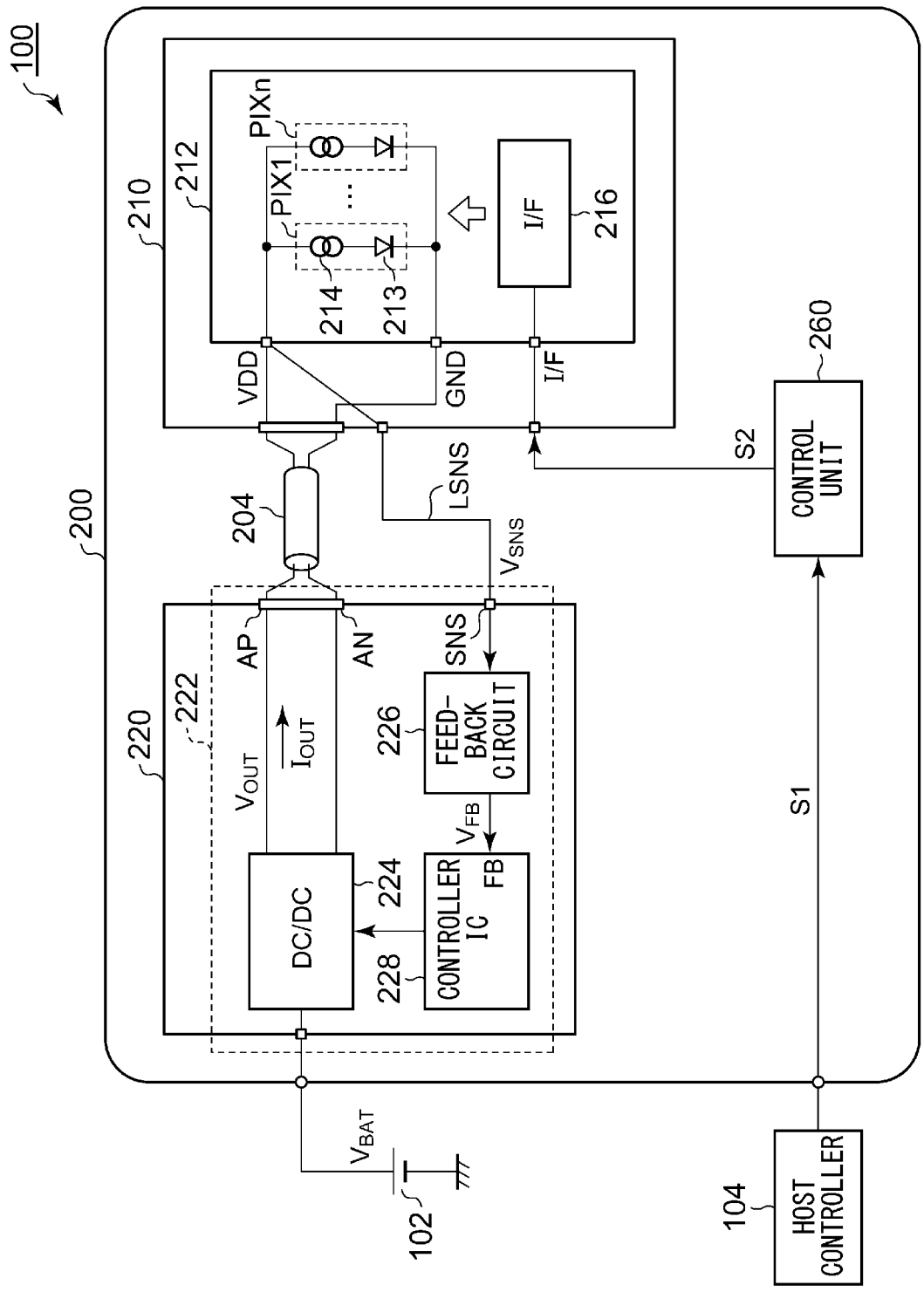
FIG. 13 is a block diagram showing a lamp system according to an embodiment 2.

FIG. 13 is a block diagram showing a lamp system 100 according to the embodiment 2. The lamp system 100 is configured as an ADB lamp system including a battery 102, a host controller 104, and a headlamp 200.

The host controller 104 generates a light distribution instruction for the headlamp 200. The light distribution instruction may include a lighting instruction and additional information. The lighting instruction may include a signal for specifying the on/off of the high beam or low beam. A basic light distribution to be formed by the headlamp 200 is determined according to the lighting instruction. On the other hand, the additional information may include data with respect to a region (shielded region) that should not be irradiated with the high beam and information with respect to the vehicle speed, steering angle, etc. The basic light distribution is modified according to the additional information, thereby determining the final light distribution. The host controller 104 may be configured as a vehicle-side ECU. Also, the host controller 104 may be configured as a lamp-side ECU built into the headlamp 200.

The headlamp 200 is configured as an ADB lamp including a variable light distribution light source 210, a power supply circuit 220, and a control unit 260.

The variable light distribution light source 210 is provided with multiple pixels arranged in an array, and is configured to be capable of independently controlling the on/off state of each pixel. The on/off states of the multiple pixels are controlled so as to provide a desired light distribution.

More specifically, the variable light distribution light source 210 includes an array-type light-emitting device 212. The array-type light-emitting device 212 includes n pixel circuits PIX1 through PIXn and a power supply terminal VDD coupled to the multiple pixel circuits PIX1 through PIXn.

Each pixel circuit PIXj (1≤j≤n) includes a light-emitting element 213_j and a current source 214_j provided in series between the power supply terminal VDD and a ground terminal (ground line) GND. The multiple light-emitting elements 213_1 through 213_n are each configured as a semiconductor light-emitting element such as an LED, LD (semiconductor laser), organic EL element, or the like, and are spatially arranged in an array (in a matrix).

The multiple current sources 214_1 through 214_n are each configured to have independently controllable on/off states. When the j-th current source 214_j is turned on, the corresponding light-emitting element 213_j emits light. That is to say, the corresponding pixel circuit PIXj is set to the lighting-on state.

An interface circuit 216 controls the on/off states of the current sources 214_1 through 214_n according to a control signal S2 from the control unit 260. The interface circuit 216 is coupled to the control unit 260 via a high-speed serial interface, and receives the control signal S2 for specifying the on/off states of all the pixels.

The power supply circuit 220 supplies electric power to the variable light distribution light source 210. The power supply circuit 220 includes a converter for outputting a constant voltage. The power supply circuit 220 supplies the stabilized power supply voltage $V_{DD}$ to the power supply terminal VDD of the array-type light-emitting device 212. The power supply voltage $V_{DD}$ is determined based on $V_F + V_{SAT}$. Typically, the power supply voltage $V_{DD}$ is set to on the order of 4 to 5 V. Here, $V_F$ represents the forward voltage of the light-emitting element 213, and $V_{SAT}$ represents the minimum operating voltage of the current source 214. Accordingly, the power supply unit 222 may be configured as a step-down converter (Buck converter) that steps down a battery voltage $V_{BAT}$ on the order of 12 V (or 24 V).

The control unit 260 receives a light distribution instruction S1 from the host controller 104, generates a control signal S2 that corresponds to the light distribution instruction S1, and transmits the control signal S2 to the variable light distribution light source 210. For example, the control unit 260 PWM-controls the multiple pixel circuits PIX1 through PIXn of the array-type light-emitting device 212 so as to control the light distribution. A PWM frequency of several hundred Hz (e.g., 100 to 400 Hz) is employed. Accordingly, the PWM cycle is set to several milliseconds to several dozen milliseconds (ms).

Next, description will be made regarding the configuration of the power supply circuit 220. The power supply circuit 220 is provided with a power supply unit 222. The power supply unit 222 includes output terminals AP/AN, a sense terminal SNS, a DC/DC converter 224, a feedback circuit 226, and a converter controller 228.

The output terminals AP/AN are coupled to the power supply terminal VDD of the array-type light-emitting device 212 via a power supply cable 204. The output of the DC/DC converter 224 is coupled to the output terminals AP/AN.

The sense terminal SNS is coupled to the power supply terminal VDD of the array-type light-emitting device 212 via a sense line LSNS separated from the power supply cable 204.

The feedback circuit 226 generates a feedback voltage $V_{FB}$ that corresponds to a sense voltage $V_{SNS}$ that occurs at the sense terminal SNS.

The feedback controller 228 controls the DC/DC converter 224 based on the feedback voltage $V_{FB}$. As the converter controller 228, a commercially available control integrated circuit (IC) for a DC/DC converter may be employed. The converter controller 228 generates a pulse signal where at least one from among the pulse width, frequency, and duty cycle is controllable, and that is adjusted such that the feedback voltage $V_{FB}$ input to the feedback pin FB approaches the reference voltage $V_{REF}$. With this, the converter controller 228 feedback controls the DC/DC converter 224 according to the pulse signal.

The above is the configuration of the lamp system 100. Next, description will be made regarding the operation thereof.

The feedback circuit 226 has a sufficiently high input impedance. Accordingly, no current flows through the sense line LSNS. Accordingly, the sense voltage $V_{SNS}$ is equal to the voltage $V_{DD}$ at the power supply terminal VDD of the array-type light-emitting device 212.

With the gain of the feedback circuit 226 as K, the following relation holds true between the feedback voltage $V_{FB}$ and the sense voltage $V_{SNS}$.

$$V_{FB} = K \times V_{SNS} = K \times V_{DD}$$

In a case in which the converter controller 228 performs feedback control such that the feedback voltage $V_{FB}$ input to the feedback pin approaches the reference voltage $V_{REF}$, the relation $V_{REF} = K \times V_{DD}$ holds true. Accordingly, the power supply voltage $V_{DD}$ is stabilized to the target voltage represented by $V_{DD(REF)} = V_{REF}/K$. It should be noted that $V_{DD(REF)}$ is determined based on $V_{DD(MIN)} = V_F + V_{SAT} + \alpha$. That is to say, the power supply voltage $V_{DD}$ is stabilized to the target voltage $V_{DD(REF)}$ such that it is not affected by the output current $I_{OUT}$, i.e., voltage drop that occurs in the power supply cable 204 and connectors.

Figure 14:
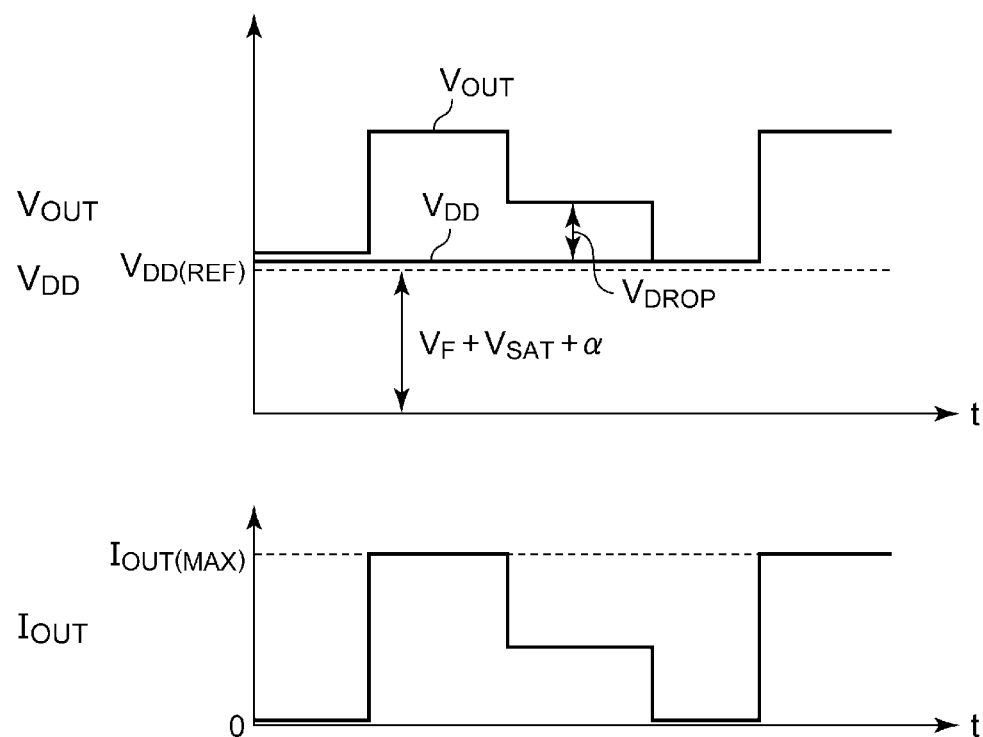
FIG. 14 is an operation waveform diagram of the lamp system shown in FIG. 13.

FIG. 14 is an operation waveform diagram of the lamp system 100 shown in FIG. 13. From the viewpoint of a long time scale, the average value of the output current $I_{OUT}$ fluctuates according to the light distribution formed by the headlamp 200. In contrast, from the viewpoint of a short time scale, the instantaneous value of the output current $I_{OUT}$ fluctuates with the PWM control cycle. FIG. 14 shows the fluctuation of the output current $I_{OUT}$ in long and short time scales.

As a result of the feedback control in the power supply circuit 220, the power supply voltage $V_{DD}$ is stabilized to the target voltage $V_{DD(REF)}$. On the other hand, the output voltage $V_{OUT}$ of the DC/DC converter 224 is represented by $V_{OUT} = V_{DD} + V_{DROP} = V_{DD} + R \times I_{OUT}$. That is to say, the output voltage $V_{OUT}$ fluctuates according to the output current $I_{OUT}$.

The above is the operation of the lamp system 100. With the lamp system 100 including the sense line LSNS provided as an additional component independent of the power supply cable 204, such an arrangement is capable of directly sensing the power supply voltage $V_{DD}$ at the power supply terminal VDD of the array-type light-emitting device 212 from the power supply circuit 220 via the sense line LSNS.

With this, the stabilized power supply voltage $V_{DD}$ can be supplied to the power supply terminal VDD of the array-type light-emitting device 212. The DC/DC converter 224 is not required to generate a higher voltage $V_{OUT}$ than necessary, thereby allowing power consumption to be reduced.

Next, description will be made regarding a specific configuration of the power supply circuit 220 based on several examples.

Figure 15:
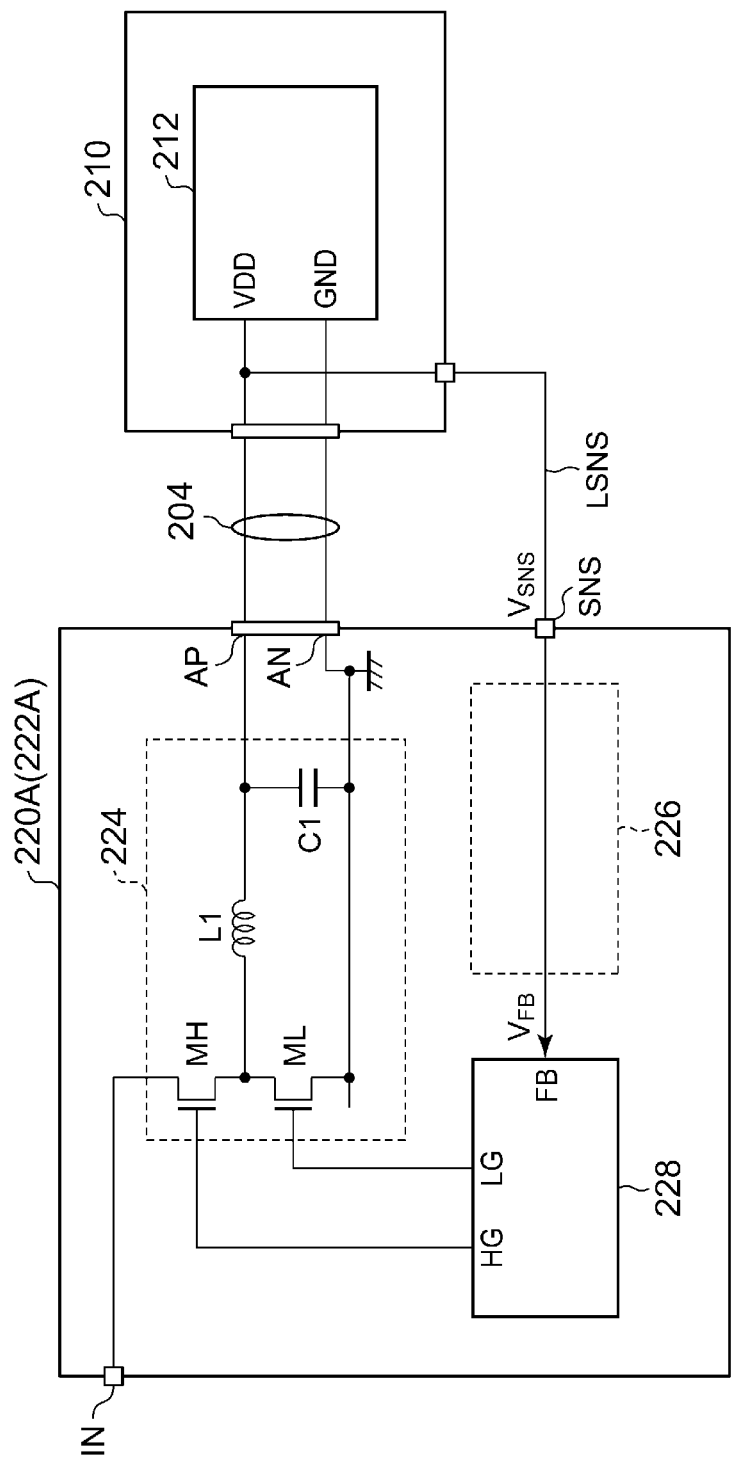
FIG. 15 is a circuit diagram of a power supply unit according to an example 2.1.

FIG. 15 is a circuit diagram of the power supply unit 222A according to an example 2.1. The DC/DC converter 224 is configured as a step-down converter, and includes a high-side transistor MH, a low-side transistor ML, an inductor L1, and a smoothing capacitor C1. It should be noted that, instead of the low-side transistor ML, a diode may be provided. In the example 2.1, the feedback circuit 226 has a gain K of 1. Accordingly, the relation $V_{FB}=V_{SNS}$ holds true. Accordingly, the feedback circuit 226 is simply wiring.

Figure 16:
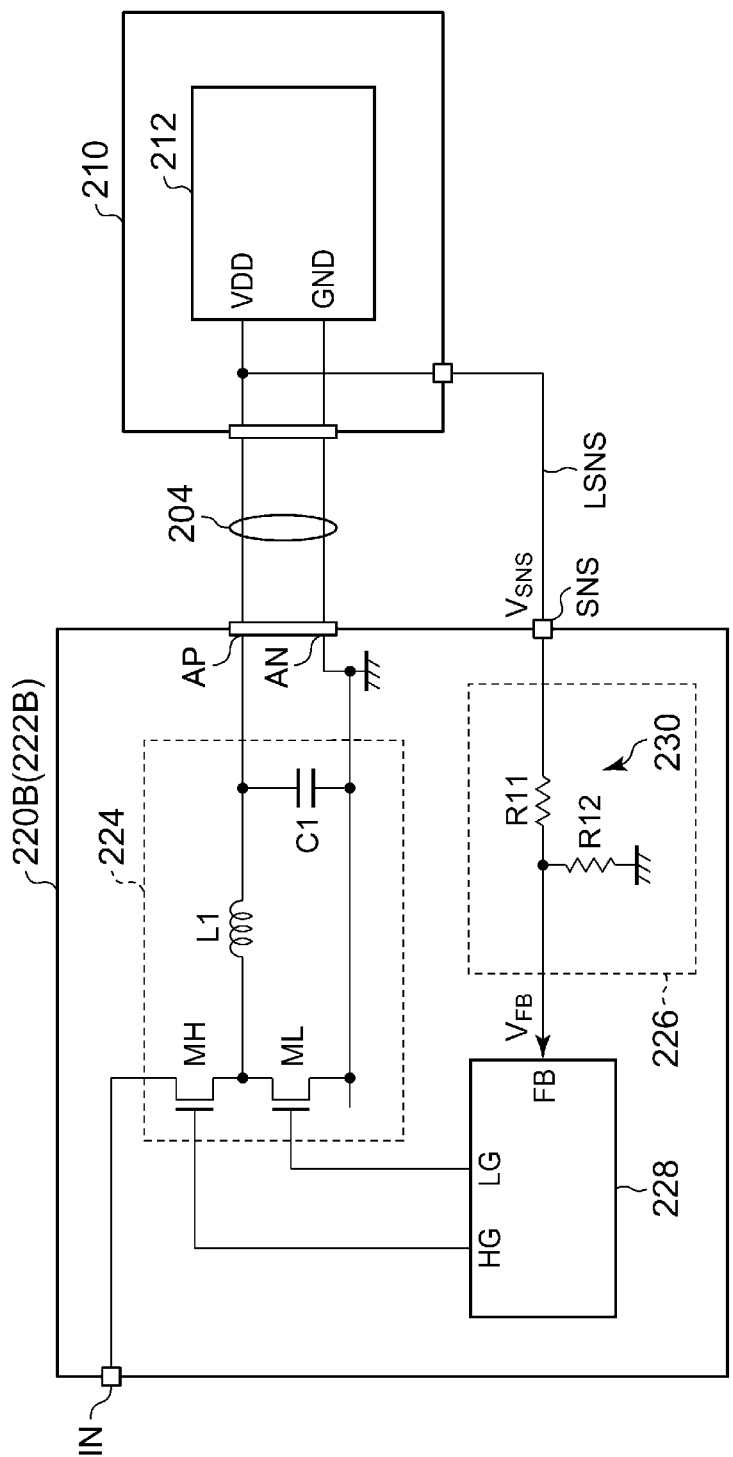
FIG. 16 is a circuit diagram of a power supply unit according to an example 2.2.

FIG. 16 is a circuit diagram of a power supply unit 222B according to an example 2.2. In the example 2.2, the feedback circuit 226 includes a resistor voltage dividing circuit 230. The gain K of the feedback circuit 226 is equal to the voltage dividing ratio of the resistor voltage dividing circuit 230, which is represented by the following Expression.

$$K=R12/(R11+R12)$$

With this configuration, the target value $V_{DD(REF)}$ of the power supply voltage $V_{DD}$ can be set according to the voltage dividing ratio of the resistor voltage dividing circuit 230.

Figure 17A:
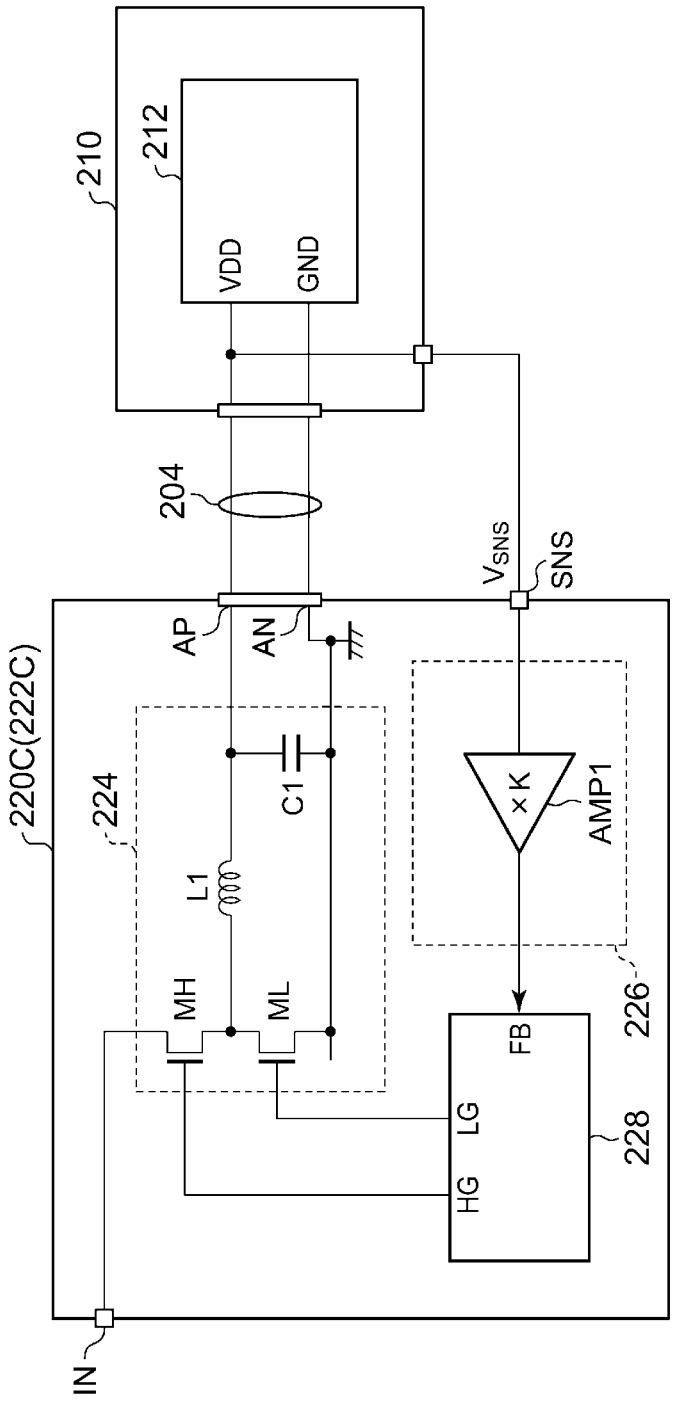
FIGS. 17A and 17B are circuit diagrams showing a power supply unit according to an example 2.3.
Figure 17B:
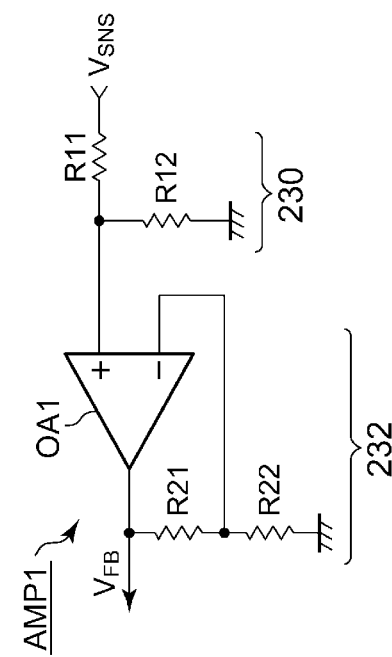

FIGS. 17A and 17B are circuit diagrams of a power supply unit 222C according to an example 2.3. In the example 2.3, the feedback circuit 226 includes an amplifier AMP1. FIG. 17B is a circuit diagram of the amplifier AMP1. The amplifier AMP1 includes a resistor voltage dividing circuit 230 configured as an upstream stage and a non-inverting amplifier 232 configured as a downstream stage.

The gain $K_1$ of the resistor voltage dividing circuit 230 configured as an upstream stage is represented by $K_1=R12/(R11+R12)$.

The non-inverting amplifier 232 includes an operational amplifier OA2 and resistors R21 and R22. The gain $K_2$ of the non-inverting amplifier 232 is represented by $K_2=(R21+R22)/R22$.

The overall gain K of the feedback circuit 226 is represented by $K=K_1 \times K_2=R12/(R11+R12) \times (R21+R22)/R22$.

With this configuration, by employing such a combination of two gains $K_1$ and $K_2$, the target voltage $V_{DD(REF)}$ can be set.

It should be noted that, in FIG. 17B, the resistor voltage dividing circuit 230 configured as an upstream stage may be omitted. In this case, the gain K of the feedback circuit 226 is equal to the gain $K_2$ of the non-inverting amplifier 232 configured as a downstream stage.

Figure 18A:
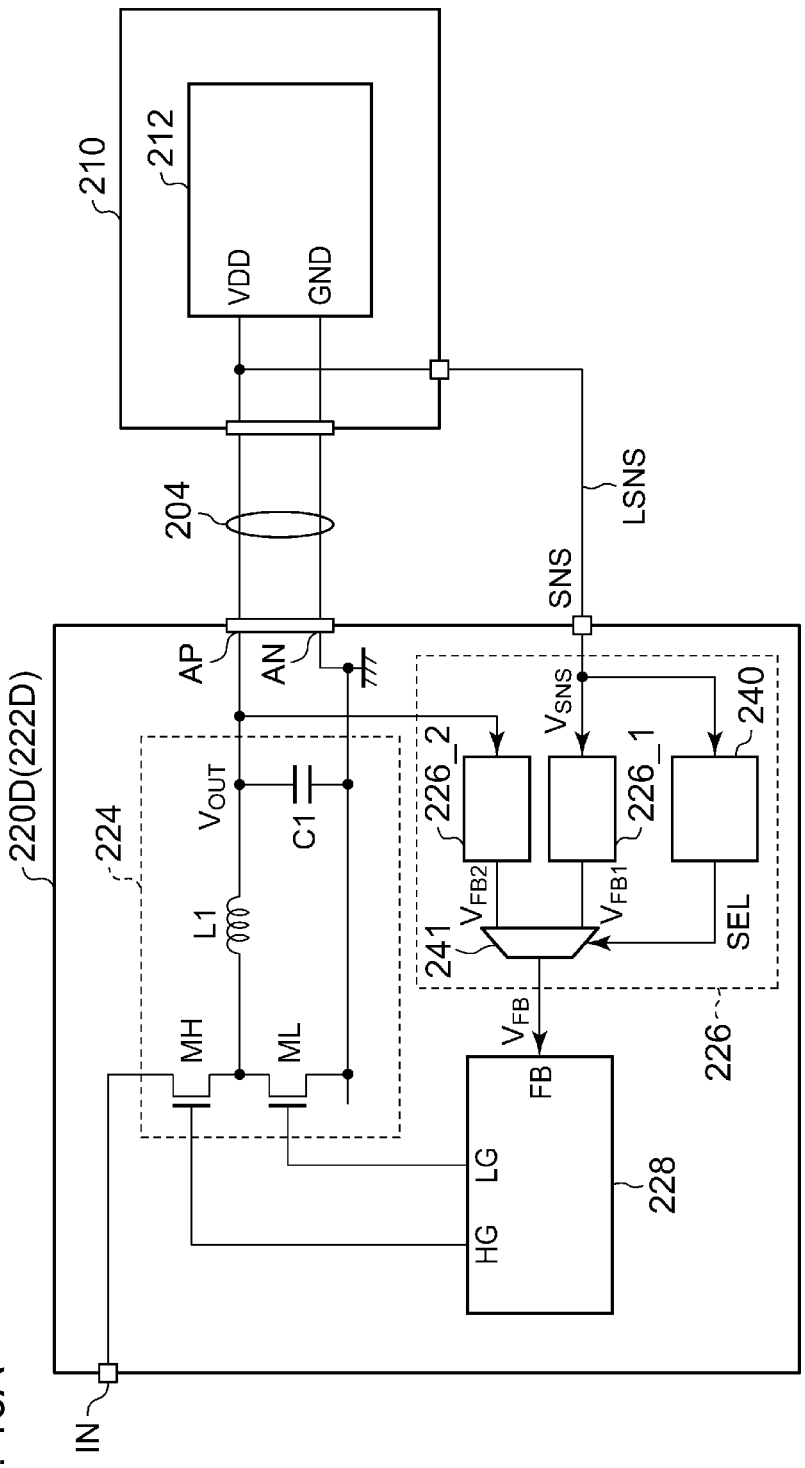
FIGS. 18A and 18B are circuit diagrams showing a power supply unit according to an example 2.4.
Figure 18B:
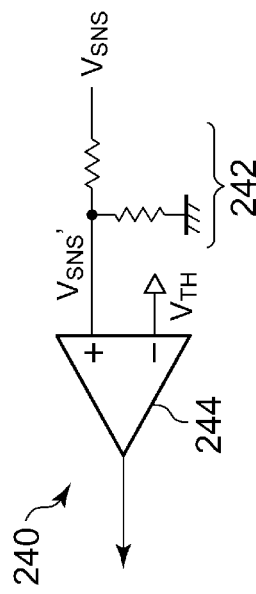

FIGS. 18A and 18B are circuit diagrams of a power supply unit 222D according to an example 2.4. The feedback circuit 226 includes two feedback blocks 226_1 and 226_2. The feedback block 226_1 generates a first feedback voltage $V_{FB1}$ based on the sense voltage $V_{SNS}$. The feedback block 226_2 generates a second feedback voltage $V_{FB2}$ based on the output voltage $V_{OUT}$ of the DC/DC converter 224. The feedback circuit 226 supplies a feedback voltage $V_{FB}$ that corresponds to one from among the feedback voltages $V_{FB1}$ and $V_{FB2}$ to the converter controller 228.

For example, the feedback circuit 226 includes a selector 241 and a selection circuit 240. The selector 241 outputs one from among the feedback voltages $V_{FB1}$ and $V_{FB2}$ according to a selection signal SEL generated by the selection circuit 240.

The selection circuit 240 may include an abnormality detection circuit for detecting an abnormality of the sense line LSNS. When the sense line LSNS operates normally, the feedback circuit 226 may select the first feedback signal $V_{FB1}$. On the other hand, when there is an abnormality of the sense line LSNS, the feedback circuit 226 may select the second feedback signal $V_{FB2}$. When an abnormality such as an open-circuit fault or short-circuit fault occurs in the sense line LSNS, the feedback signal is switched to the second feedback voltage $V_{FB2}$, thereby allowing the operation of the array-type light-emitting device 212 to be maintained.

FIG. 18B is a circuit diagram of an example configuration of the selection circuit 240 configured as an abnormality detection circuit. The selection circuit 240 includes a voltage dividing circuit 242 and a voltage comparator 244. The voltage dividing circuit 242 divides the sense voltage $V_{SNS}$. The voltage comparator 244 compares the sense voltage $V_{SNS}'$ thus divided with a threshold voltage $V_{TH}$. When $V_{SNS}'>V_{TH}$, judgment is made that the sense line LSNS operates normally. Conversely, when $V_{SNS}'<V_{TH}$, judgment is made that an open-circuit fault (or a ground fault) has occurred.

After the power supply circuit 220 has detected an abnormality, the power supply circuit 220 may continue its operation using the second feedback voltage $V_{FB2}$. Alternatively, when the detection of the abnormality continues over a predetermined period of time (e.g., 1 second), the power supply circuit 220 may stop the supply of electric power to the variable light distribution light source 210. In this case, such an arrangement is capable of preventing the circuit from operating in a low-efficiency state.

With such an arrangement provided with the two feedback paths as described above, this allows the robustness of the lamp system to be improved.

Alternatively, the selection circuit 240 may switch the feedback path according to the operating situation of the lamp system 100. For example, in a situation in which the output current $I_{OUT}$ is large, the first feedback voltage $V_{FB1}$ may be selected so as to provide improved efficiency. Conversely, in a situation in which the output current $I_{OUT}$ is small, and accordingly, the voltage drop $V_{DROP}$ has only a small effect, the second feedback voltage $V_{FB2}$ may be selected.

Next, description will be made regarding modifications relating to the embodiment 2.

Modification 2.1

Figure 19:
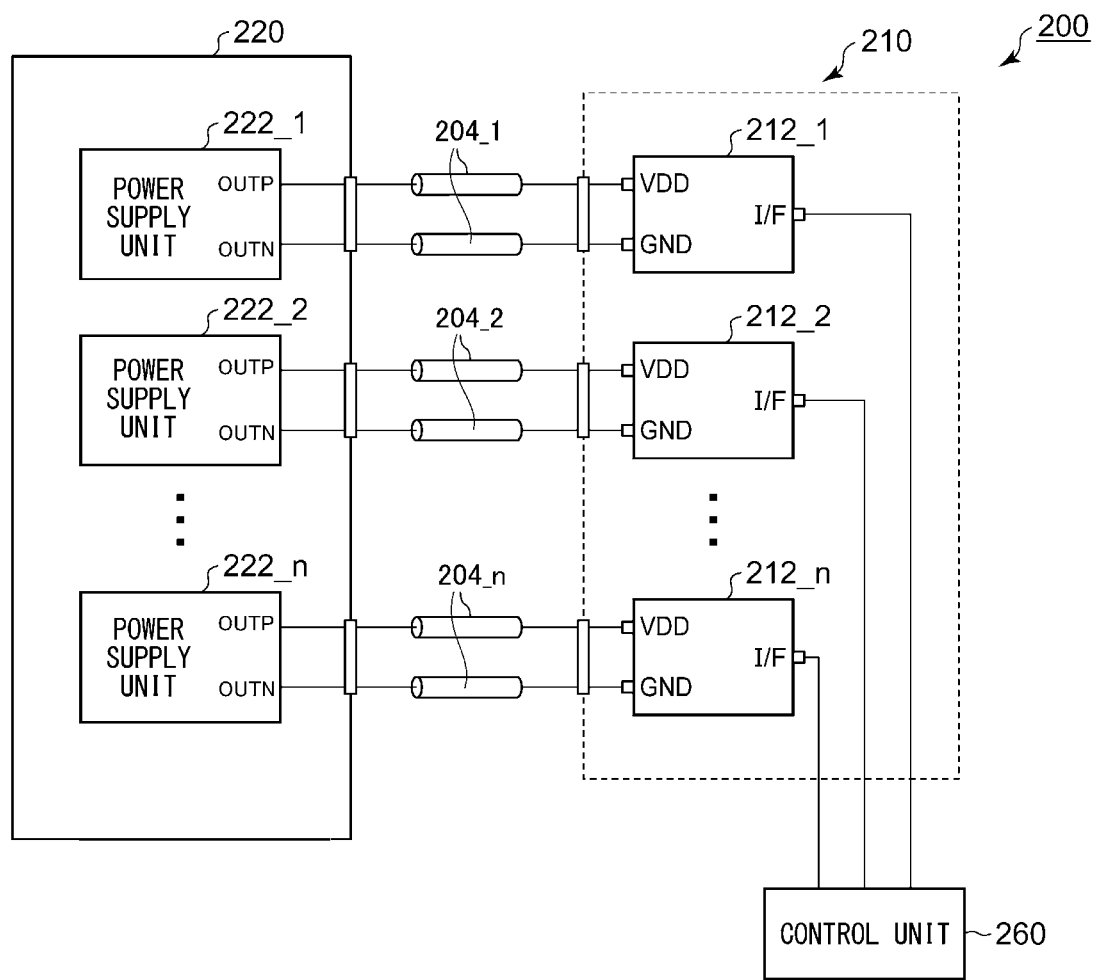
FIG. 19 is a diagram showing a headlamp according to a modification 2.1.

FIG. 19 is a diagram showing the headlamp 200 according to a modification 2.1. Description has been made above regarding the variable light distribution light source 210 including a single array-type light-emitting device 212. Also, the variable light distribution light source 210 may include multiple array-type light-emitting devices 212. In this case, the power supply circuits 220 is provided with multiple power supply units 222 corresponding to the multiple array-type light-emitting devices 212. The output terminal of each power supply unit 222 is coupled to the power supply terminal of the corresponding array-type light-emitting device 212 via an independent power supply cable. Also, a sense line may preferably be provided for each pair of a power supply unit 222 and an array-type light-emitting device 212.

In the modification 2.1, the variable light distribution light source 210 has a configuration provided by division thereof into multiple array-type light-emitting devices 212 each having an independent power supply terminal. Furthermore, a power supply unit 222 is provided for each array-type light-emitting device 212. Moreover, each array-type light-emitting device 212 is coupled to a corresponding power supply unit 222 via a power supply cable 204 in a one-to-one manner. This allows the current that flows through the variable light distribution light source 210 to be distributed to multiple DC/DC converters included in the multiple systems. This allows the effects of voltage drop that occurs in each DC/DC converter to be reduced, thereby providing improved load responsiveness. In addition, this allows the number of options for the components of the DC/DC converters, power supply cables, and connectors to be increased, thereby providing an improved degree of design freedom.

Modification 2.2

Figure 20:
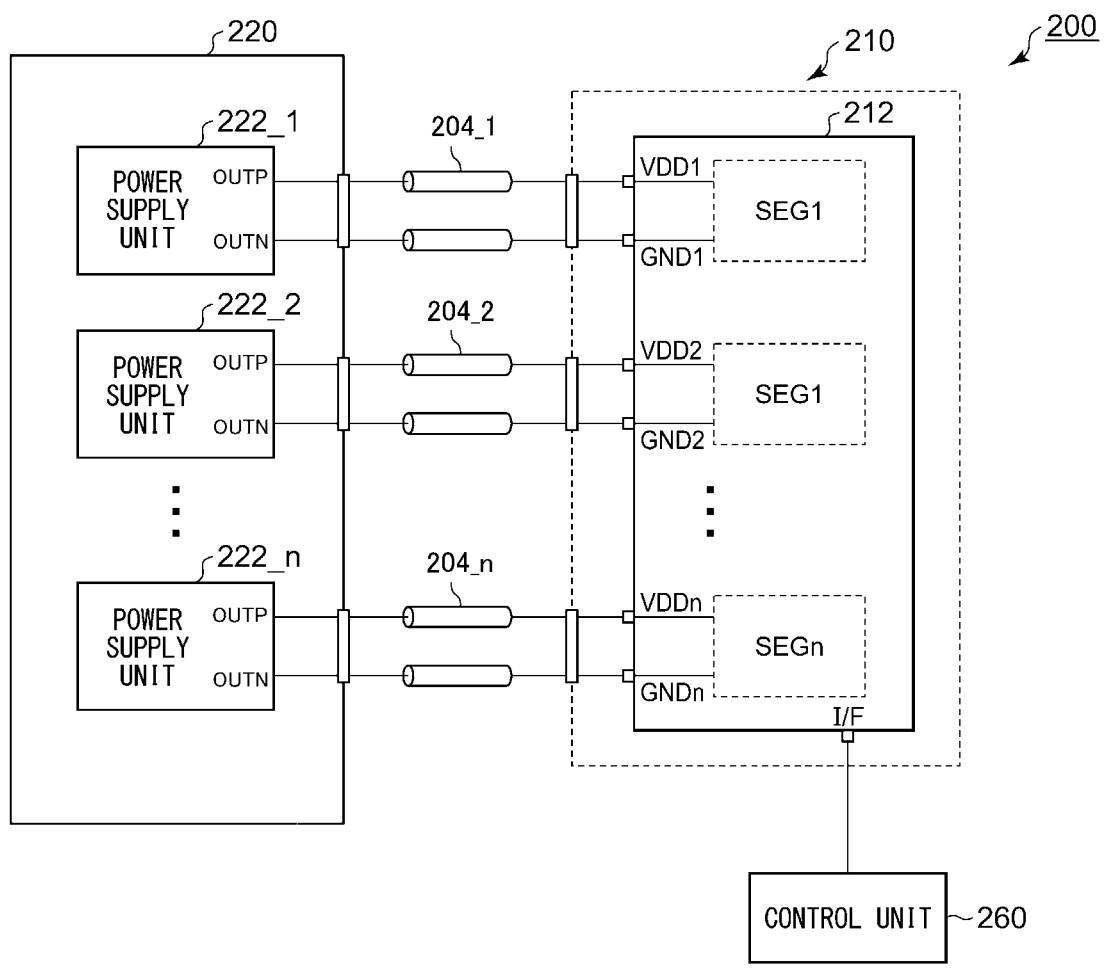
FIG. 20 is a headlamp according to a modification 2.2.

FIG. 20 is a diagram showing the headlamp 200 according to a modification 2.2. The array-type light-emitting device 212 may be configured such that the multiple internal light-emitting pixels are divided into multiple segments SEG1 through SEGn. Also, the multiple segments SEG1 through SEGn may be provided with corresponding multiple power supply terminals VDD. The power supply circuit 220 is provided with multiple power supply units 222_1 through 222_n corresponding to the multiple power supply terminals VDD. The output terminal of each power supply unit 222 is coupled to the corresponding power supply terminal VDD of the array-type light-emitting device 212 via an independent power supply cable 204. Also, a sense line may preferably be provided for each power supply unit 222 as necessary.

With the modification 2.2, this allows the current that flows through the variable light distribution light source 210 to be distributed to the DC/DC converters included in the multiple systems. Such an arrangement provides the same effects as in the modification 2.1.

Modification 2.3

The power supply unit 222 may be configured as a phase-shift converter. By employing such a phase-shift converter, this allows the ripples that occur in the output voltage $V_{OUTi}$ and the output current $I_{OUTi}$ to be reduced. Furthermore, such an arrangement provides improved efficiency. Furthermore, in a case in which PWM control is employed for each pixel circuit of the array-type light-emitting device 212, the output current $I_{OUTi}$ of the power supply unit 222 fluctuates at high speed according to the lighting-on ratio of the multiple pixel circuits. With this, by employing such a phase-shift converter, such an arrangement provides improved tracking performance (responsiveness) with respect to load fluctuations.

Modification 2.4

Description has been made regarding an arrangement in which the power supply circuit 220 and the control unit 260 are built into the headlamp 200. Also, either one or both of the power supply circuit 220 and the control unit 260 may be arranged outside the body of the headlamp 200. The variable light distribution light source 210 serves as a heat generator. Accordingly, an arrangement in which the control unit 260, which has a weak point with respect to heat, is arranged in the vehicle interior away from the variable light distribution light source 210 is advantageous from a thermal design viewpoint.

Embodiment 3

Description will be made in embodiments 3.1 and 3.2 regarding a technique relating to the problem 3 described above.

Embodiment 3.1

Figure 21:
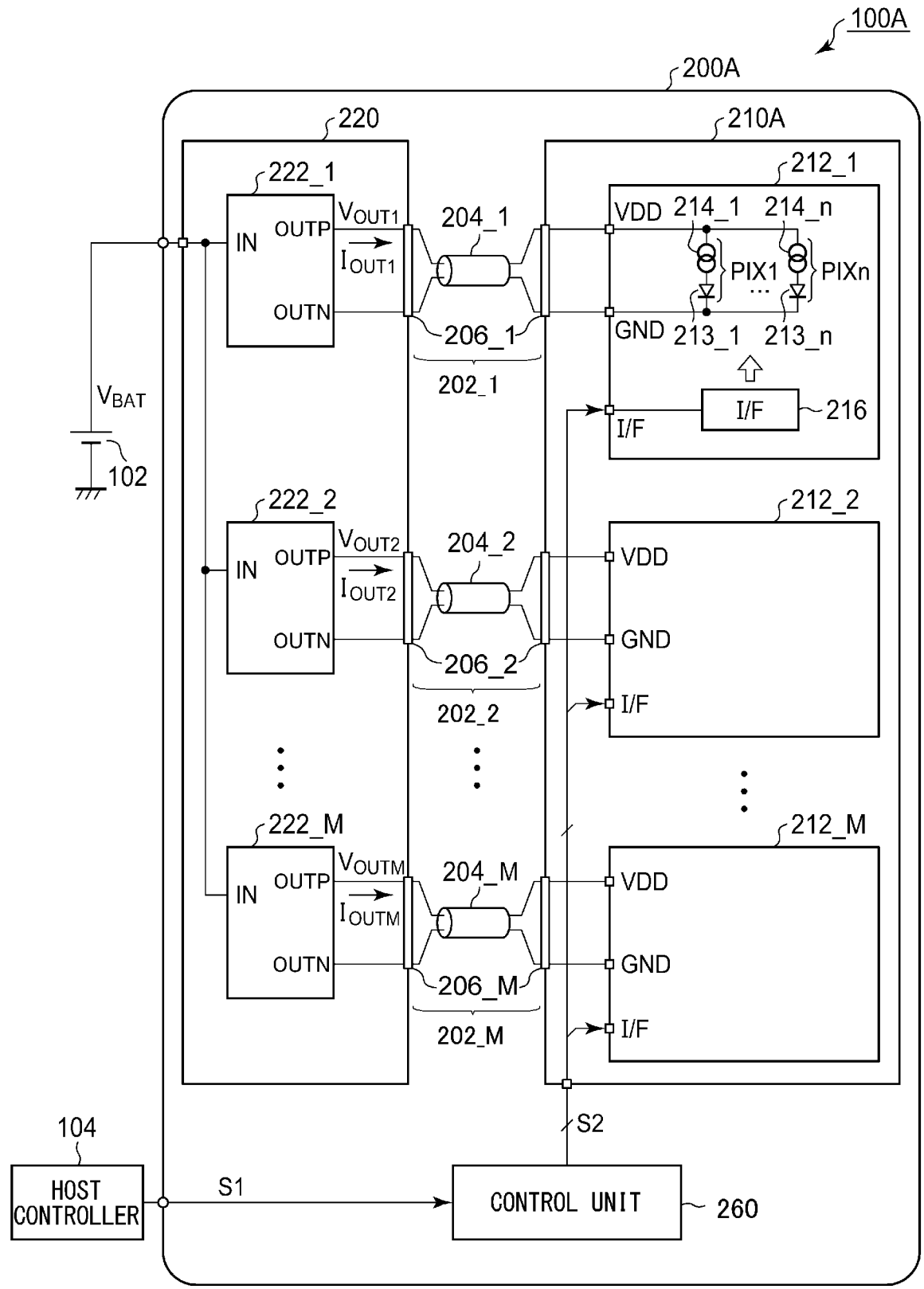
FIG. 21 is a block diagram showing a lamp system according to an embodiment 3.1.

FIG. 21 is a block diagram showing a lamp system 100A according to an embodiment 3.1. The lamp system 100A is configured as an ADB lamp system including a battery 102, a host controller 104, and a headlamp 200A.

The host controller 104 generates a light distribution instruction for the headlamp 200A. The light distribution instruction may include a lighting instruction and additional information. The lighting instruction may include a signal for specifying the on/off of the high beam or low beam. A basic light distribution to be formed by the headlamp 200A is determined according to the lighting instruction. On the other hand, the additional information may include data with respect to a region (shielded region) that should not be irradiated with the high beam and information with respect to the vehicle speed, steering angle, etc. The basic light distribution is modified according to the additional information, thereby determining the final light distribution. The host controller 104 may be configured as a vehicle-side electric control unit (ECU). Also, the host controller 104 may be configured as a lamp-side ECU built into the headlamp 200A.

The headlamp 200A is configured as an ADB lamp including a variable light distribution light source 210A, a power supply circuit 220, and a control unit 260.

The variable light distribution light source 210A is provided with multiple pixels arranged in an array, and is configured to be capable of independently controlling the on/off state of each pixel. In the headlamp 200A, the on/off states of the multiple pixels are controlled so as to provide a desired light distribution.

In the present embodiment, the variable light distribution light source 210A is used for both the high beam and the low beam. The output beam of the variable light distribution light source 210A covers both the high-beam irradiation region and the low-beam irradiation region. Description will be made assuming that the number of pixels (resolution) required for the variable light distribution light source 210A is A. Typically, A is a number on the order of several thousand, or may be 10,000 or more. In the present embodiment, instead of employing a single array-type light-emitting device having a number of pixels A, the variable light distribution light source 210A has a configuration provided by division thereof into multiple array-type light-emitting devices each having a number of pixels n that is smaller than A. That is to say, the variable light distribution light source 210A is provided with multiple M (M≥2) array-type light-emitting devices 212_1 through 212_M. That is to say, the relation n×M≥A holds true. For example, in a case in which A≈3,000, an arrangement may be made in which M=3, n≈1,000. More specifically, each array-type light-emitting device 212 may include (32×32) pixels.

Each array-type light-emitting device 212_i (i=1 to M) includes n pixel circuits PIX1 through PIXn and a power supply terminal VDD coupled to the multiple pixel circuits PIX1 through PIXn.

Each pixel circuit PIXj (1≤j≤n) includes a light-emitting element 213_j and a current source 214_j provided in series between the power supply terminal VDD and the ground terminal (ground line). The multiple light-emitting elements 213_1 through 213_n are each configured as a semiconductor light-emitting element such as an LED, LD (semiconductor laser), organic EL element, or the like, and are spatially arranged in an array (in a matrix).

The multiple current sources 214_1 through 214_n are each configured to be independently on/off controllable. When the j-th current source 214_j is turned on, the corresponding light-emitting element 213_j emits light, and the corresponding pixel circuit PIXj becomes a lighting-on state.

The interface circuit 216 controls the on/off states of the current sources 214_1 through 214_n according to the control signal S2 from the control unit 260. The interface circuit 216 is coupled to the control unit 260 via a high-speed serial interface, and receives data for specifying the on/off states of all the pixels.

The power supply circuit 220 supplies electric power to the variable light distribution light source 210A. As described above, the variable light distribution light source 210A is provided with M array-type light-emitting devices 212_1 through 212_M each having an independent power supply terminal. The power supply circuit 220 is provided with M power supply units 222_1 through 222_M that correspond to the M array-type light-emitting devices 212_1 through 212_M. With this, the i-th power supply unit 222_i is coupled to the corresponding array-type light-emitting device 212_i via an independent coupling means 202_i. Each coupling means 202 includes a power supply cable 204 and a connector (or coupler) 206.

The power supply units 222_1 through 222_M are configured in the same manner. Each power supply unit 222 is a converter configured to output a constant voltage. Each power supply unit 222 supplies the stabilized power supply voltage $V_{DD}$ to the power supply terminal VDD of the corresponding array-type light-emitting device 212. The power supply voltage $V_{DD}$ is determined based on $V_F+V_{SAT}$. Typically, the power supply voltage $V_{DD}$ is set to on the order of 4 to 5 V. Here, $V_F$ represents the forward voltage of the light-emitting element 213, and $V_{SAT}$ represents the minimum operating voltage of the current source 214. Accordingly, the power supply unit 222 may be configured as a step-down converter (Buck converter) that steps down a battery voltage $V_{BAT}$ on the order of 12 V (or 24 V).

The control unit 260 receives a light distribution instruction S1 from the host controller 104, generates a control signal S2 that corresponds to the light distribution instruction S1, and transmits the control signal S2 to the variable light distribution light source 210A. The control unit 260 is also referred to as a "drawing ECU". For example, the control unit 260 PWM-controls the multiple pixel circuits PIX1 through PIXn for the multiple array-type light-emitting devices 212_1 through 212_M so as to control the light distribution. A PWM frequency of several hundred Hz (e.g., 100 to 400 Hz) is employed. Accordingly, the PWM cycle is set to several milliseconds to several dozen milliseconds (ms).

Figure 22:
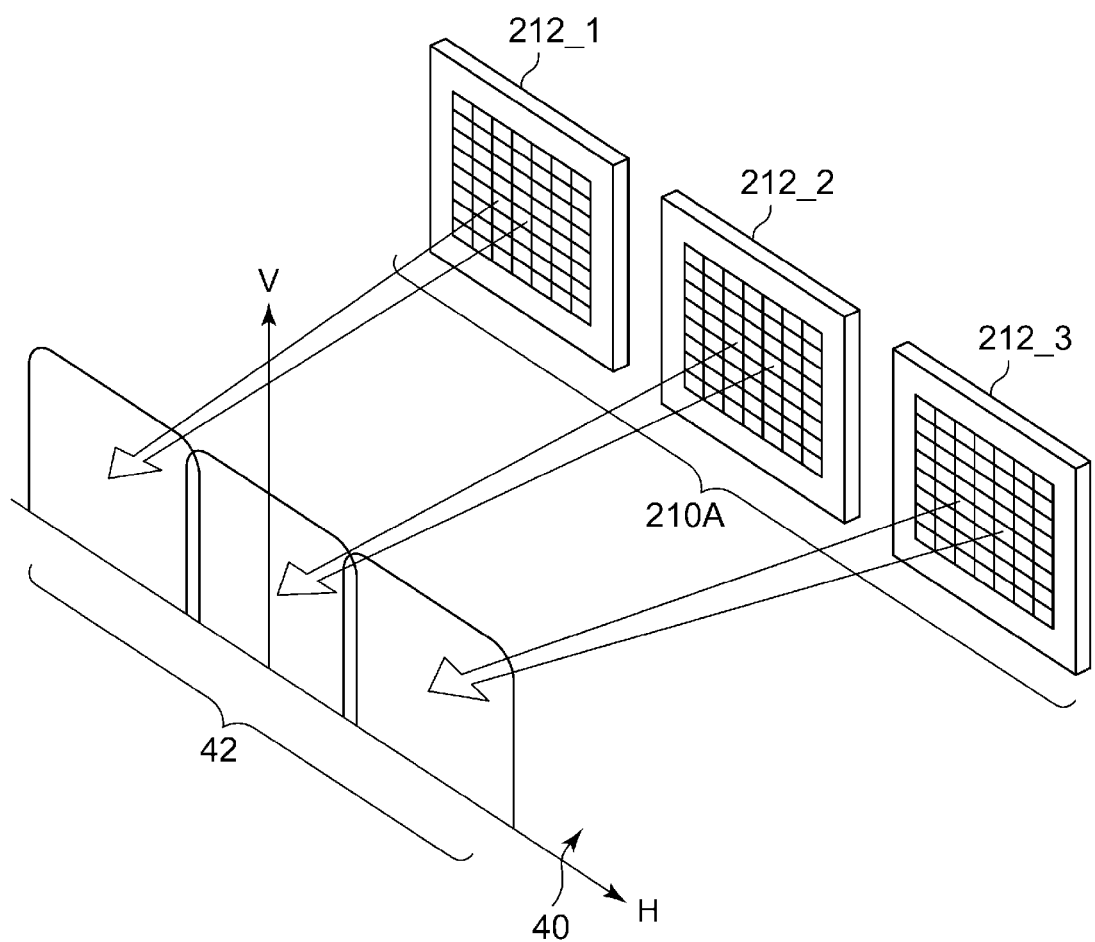
FIG. 22 is a diagram for explaining light distribution formed by the variable light distribution light source shown in FIG. 21.

FIG. 22 is a diagram for explaining the light distribution formed by the variable light distribution light source 210A shown in FIG. 21. Description will be made below regarding an example in which M=3. Also, the optical system of the headlamp 200 may be configured such that the output beams of the multiple array-type light-emitting devices 212_1 through 212_3 are each irradiated to a position shifted in the horizontal direction. The light distribution pattern is formed by a combination of the output beams of the multiple array-type light-emitting devices 212_1 through 212_3. It should be noted that the optical system may be configured as a reflective optical system, a transmissive optical system, or a combination thereof.

The above is the configuration of the lamp system 100A. Next, description will be made regarding the advantages thereof. With the lamp system 100A, instead of configuring the variable light distribution light source 210A as a single array-type light-emitting device having a total number of pixels A, the variable light distribution light source 210A has a configuration provided by division thereof into multiple array-type light-emitting devices 212_1 through 212_M each having a number of pixels n that is smaller than A and an independent power supply terminal. Furthermore, a power supply unit 222 is provided for each array-type light-emitting device 212. Moreover, the output terminal of each array-type light-emitting device 212 is coupled to the corresponding power supply unit 222 via the power supply cable 204 in a one-to-one manner. The power supply cable 204 may include a power supply line configured to couple a positive output OUTP of the power supply unit 222 and the power supply terminal of the array-type light-emitting device 212, and a ground line configured to couple a negative output OUTN of the power supply unit 222 and a ground terminal of the array-type light-emitting device 212. It should be noted that a common ground line may be provided for the M systems.

Figure 2:
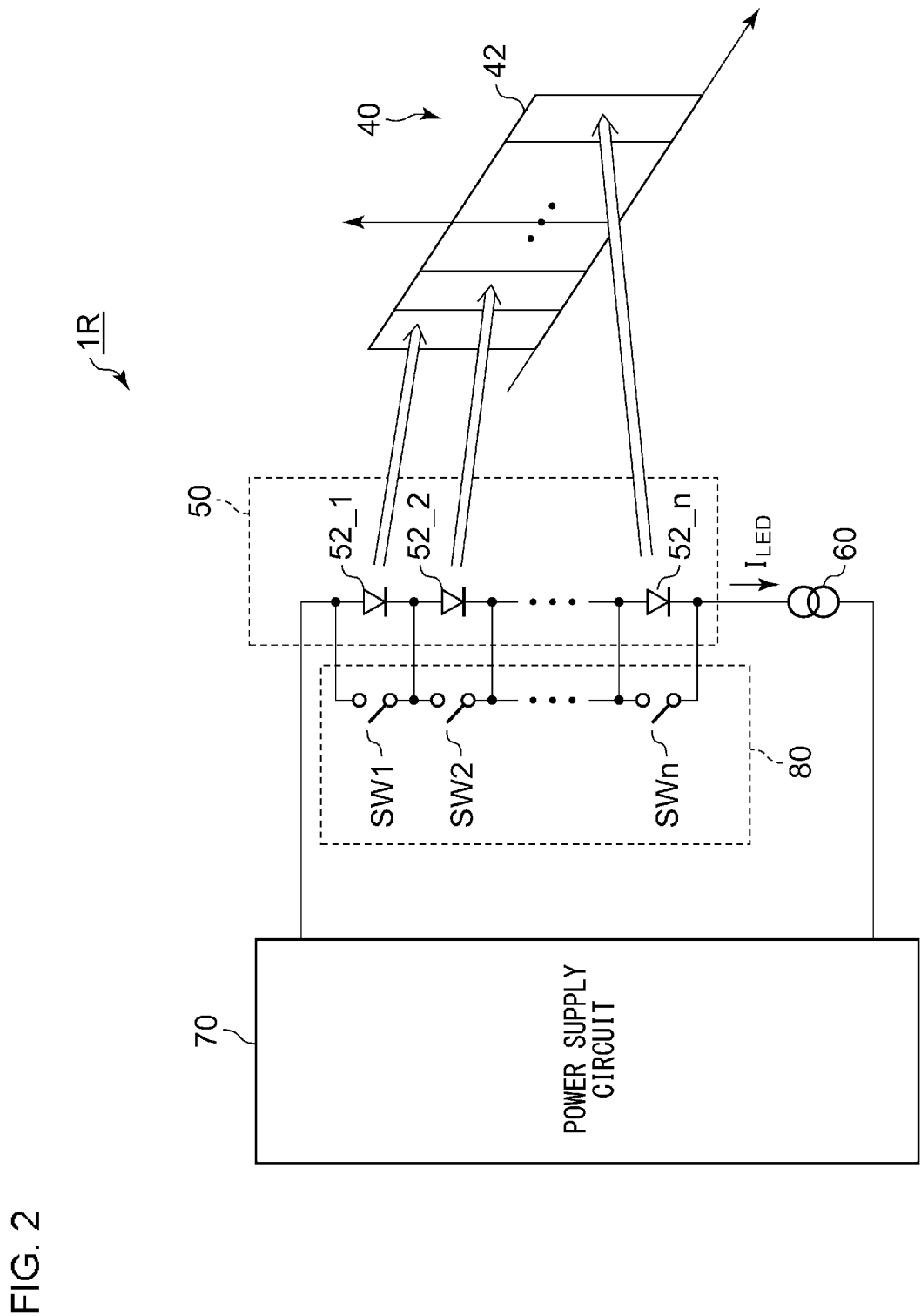
FIG. 2 is a block diagram showing a lamp employing a bypass method.
Figure 3:
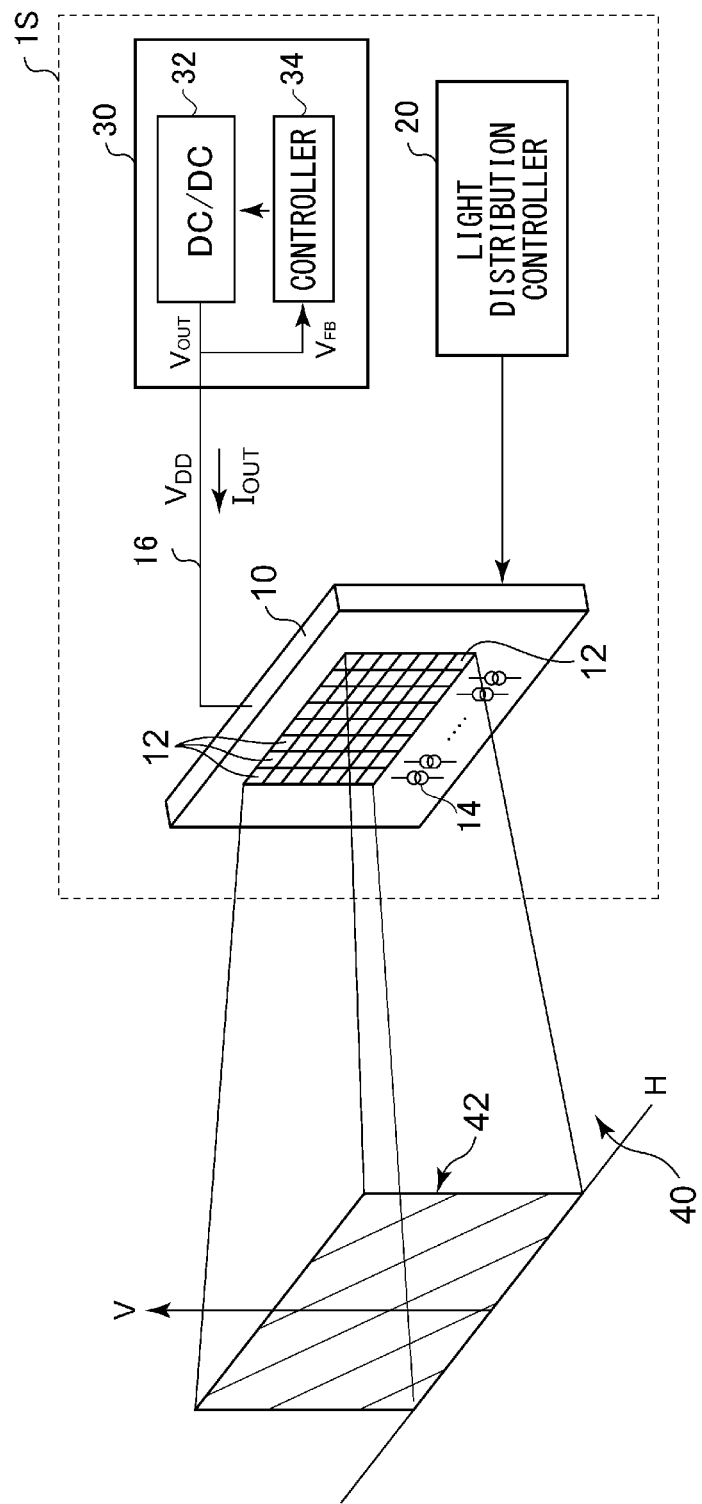
FIG. 3 is a block diagram showing an ADB lamp employing an LED array method.
Figure 4:
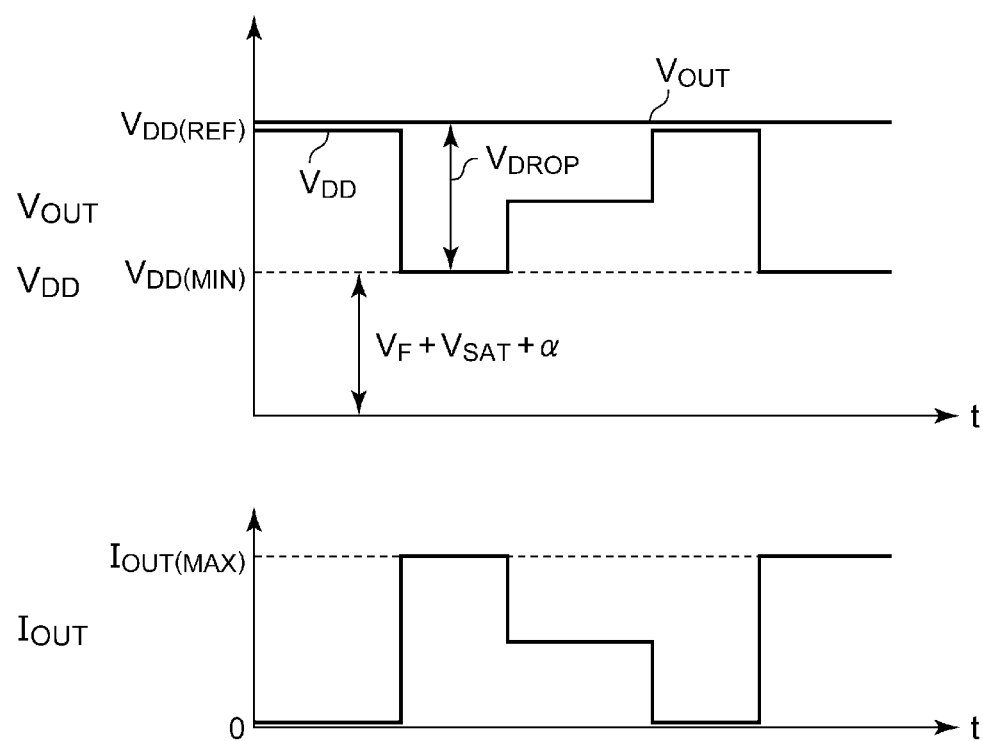
FIG. 4 is an operation waveform diagram of the ADB lamp shown in FIG. 3.

Description will be made with the driving current of a single light-emitting element 213 as $I_{LED}$. As shown in FIG. 2, in a case in which electric power is supplied to the variable light distribution light source 210A by a single power supply circuit (power supply unit), the maximum value of the output current of the single power supply circuit is represented by $A \times I_{LED}$.

In contrast, with the lamp system 100A shown in FIG. 21, the maximum value of the output current $I_{OUT}$ of the single power supply unit 222 is represented by $I_{LED} \times n$. Here, the relation n=A/M holds true. Accordingly, the maximum value of the output current of the power supply unit 222 becomes 1/M of that provided by the configuration shown in FIG. 2. As a result, each power supply unit 222 can be configured of components each having a small allowable current (rated current), thereby allowing the cost of the power supply circuit 220 to be reduced.

Typically, for the high beam, it is necessary to design the lens optical system (light distribution) so as to secure an irradiation angle of ±15 degrees to ±20 in the horizontal direction. In a case in which the irradiation region is widened only by designing the optical system without changing the size (light emission area) of the array-type light-emitting device 212, this leads to degraded light intensity. Furthermore, this leads to degradation of focusing performance, which leads to blurring of the illumination light, resulting in degradation of the resolution of the illumination light. Accordingly, this lessens the effect of improved resolution obtained by increasing the number of pixels. With the present embodiment, the light distribution is divided into M regions along the horizontal direction, and an array-type light-emitting device 212 is assigned to each region. With this, such an arrangement is able to secure the irradiation range (angle) in the horizontal direction and the light intensity specified by regulations. In addition, this is capable of suppressing degradation of the resolution of the irradiated light.

Figure 23:
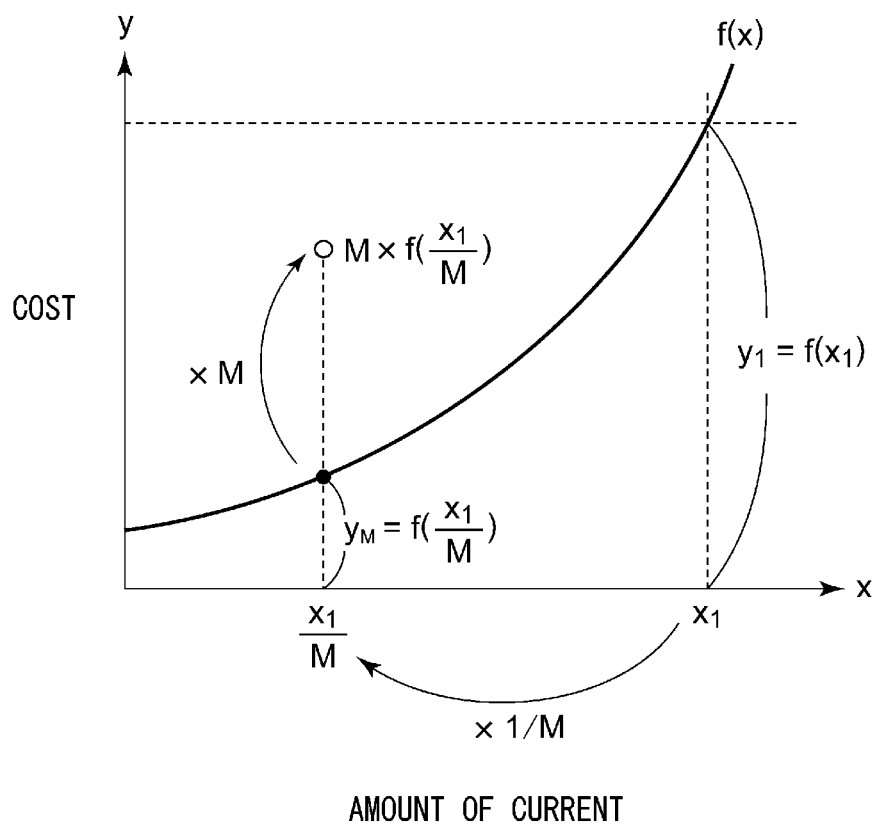
FIG. 23 is a diagram for explaining the cost of the lamp system shown in FIG. 21.

FIG. 23 is a diagram for explaining the cost of the lamp system 100A shown in FIG. 21. The horizontal axis x represents the maximum output current (rated current) of the power supply unit. The vertical axis y represents the cost. The cost y can be represented by a function y=f(x) with respect to the output current x. The function f(x) is approximated by a higher-order function than a linear function y=a·x.

With the overall maximum output current of the power supply circuit 220 as $x_1$, in a case in which the power supply circuit 220 is configured of a single power supply unit 222, the cost is represented by $y_1$=f($x_1$).

In a case in which the power supply circuit 220 has a configuration provided by division thereof into M power supply units 222, the cost of each power supply unit 222 is represented by $y_M$=f($x_1$/M). Accordingly, the cost of the M power supply units 222 is represented by M×$y_M$=M×f($x_1$/M).

Accordingly, in a case in which the relation f($x_1$)>M×f($x_1$/M) holds true, this allows the cost of the power supply circuit 220 to be reduced. In other words, the number of divisions M may preferably be determined such that this relation holds true.

In addition, with the present embodiment, small components can be selected as the components (power transistors, inductors, capacitors) of the power supply unit 222, thereby increasing the number of options. Even in a case in which such an arrangement has only a small effect on reduction of the cost, or even in a case in which such an arrangement leads to a slight increase in the cost, such an arrangement has a great advantage of an increased number of options for the circuit components.

Figure 24:
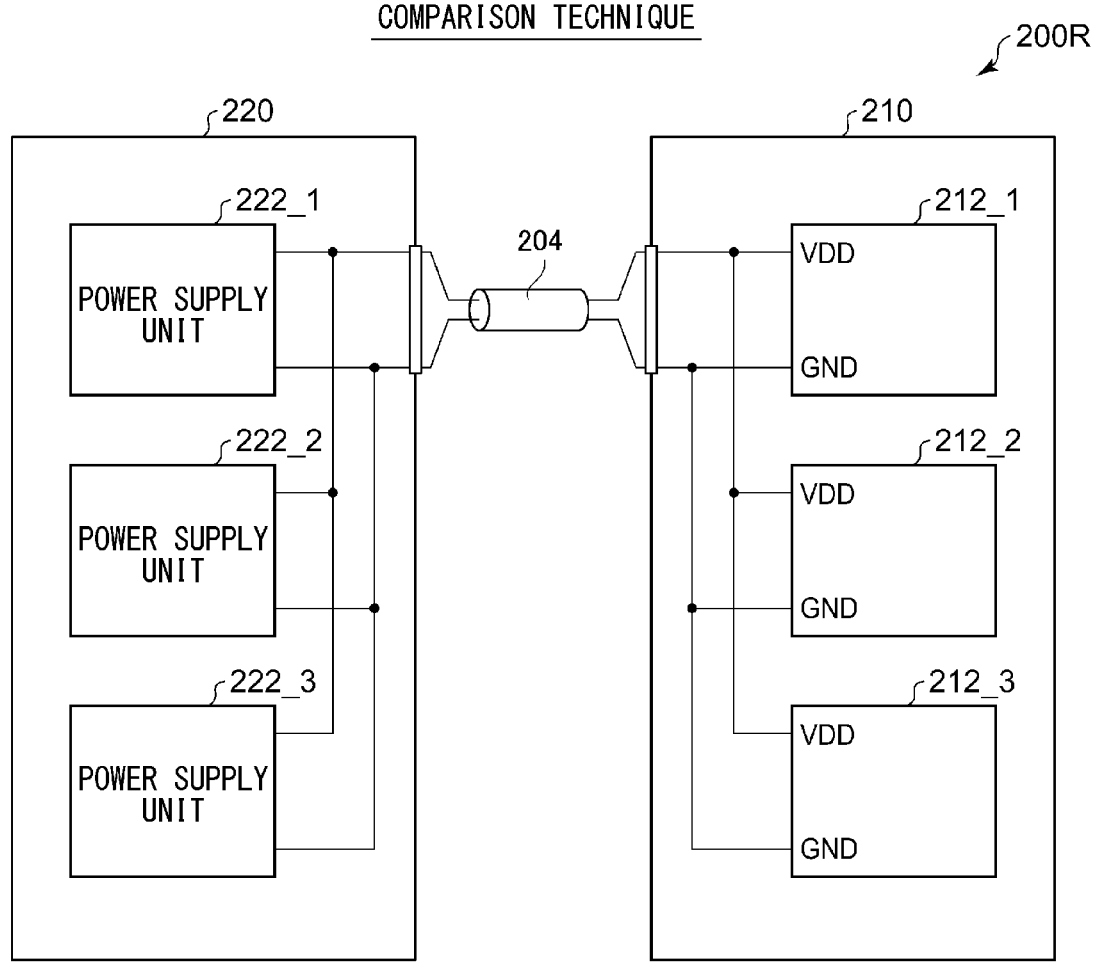
FIG. 24 is a block diagram showing a lamp according to a comparison technique.

As compared with a conventional technique, yet another advantage of the lamp system 100A can be clearly understood. FIG. 24 is a block diagram showing a lamp 200R according to a comparison technique. In this comparison technique, a power supply circuit 220R has a configuration provided by division thereof into three power supply units 222_1 through 222_3. The outputs of the three power supply units 222_1 through 222_3 are coupled in common on the substrate of the power supply circuit 220R. The power supply circuit 220R and a variable light distribution light source 210A are coupled via a single power supply cable 204 and a connector 206.

With the comparison technique, the cost of the power supply circuit 220 can be reduced in the same manner as in the embodiment 3.1. However, the maximum current that flows through the power supply cable 204 is A×$I_{LED}$. In a case in which A×$I_{LED}$=30 A, such an arrangement requires a cable that can withstand a current of 30 A. Such a cable requires a large thickness, and a high cost. In contrast, with the lamp system 100A according to the embodiment 3.1, the current that flows through a single power cable is also 1/M times the current. Accordingly, a cable that is relatively thin and easy to handle may be selected.

The cost of the cable can also be estimated in the same manner as the power supply circuit. That is to say, description will be made assuming that the relation y=g(x) holds true between the current x and the cost y of the cable. In this case, even in a case in which the number of cables is increased to M, when the relation g($x_1$)>M×g($x_1$/M) holds true, such an arrangement allows the overall cost of the cable to be reduced.

In addition, the headlamp 200A according to the embodiment 3.1 has the following advantage as compared with the comparison technique. With the comparison technique, the multiple array-type light-emitting devices 212_1 through 212_3 serve as a single load circuit as viewed from the power supply circuit 220. Accordingly, with the power supply circuit 220, the voltage supplied to the variable light distribution light source 210A is feedback-controlled by a single-system feedback loop.

In contrast, with the headlamp 200A shown in FIG. 21, the array-type light-emitting devices 212_1 through 212_M serve as independent loads as viewed from the power supply units 222_1 through 222_M. In the ADB lamp, the multiple array-type light-emitting devices 212 are associated with areas having different light distributions. Accordingly, the load ratio (ratio of the number of on pixels), i.e., the power supply current $I_{OUT}$, fluctuates independently with respect to the multiple array-type light-emitting devices 212. Accordingly, with such an arrangement in which an independent feedback loop is formed for each power supply unit 222, this supports high-speed load responsiveness (load regulation) as compared with the comparison technique.

Figure 25A:
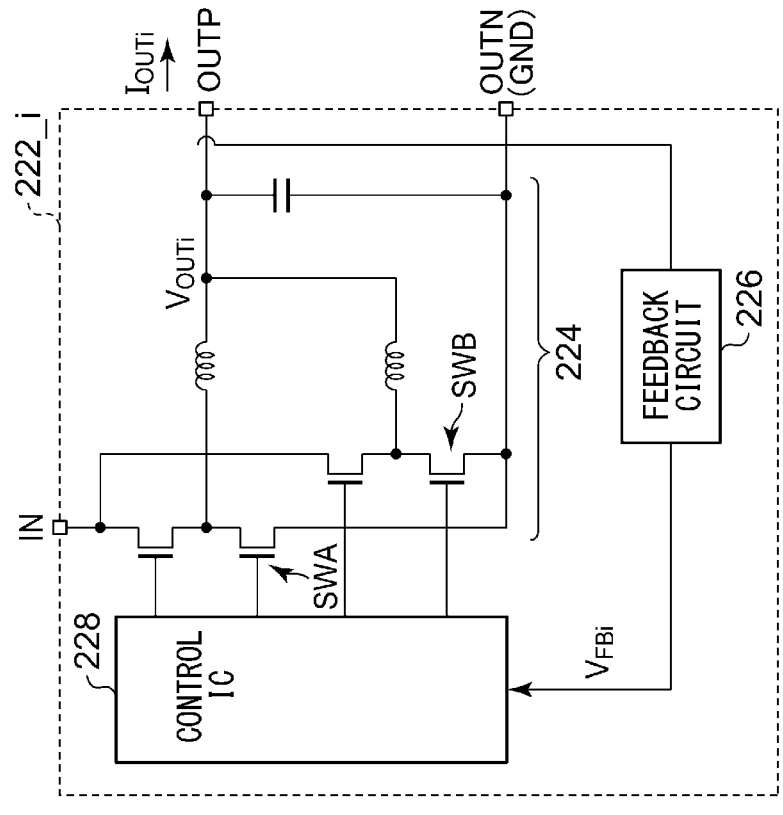
FIGS. 25A and 25B are circuit diagram each showing an example configuration of a single power supply unit.
Figure 25B:
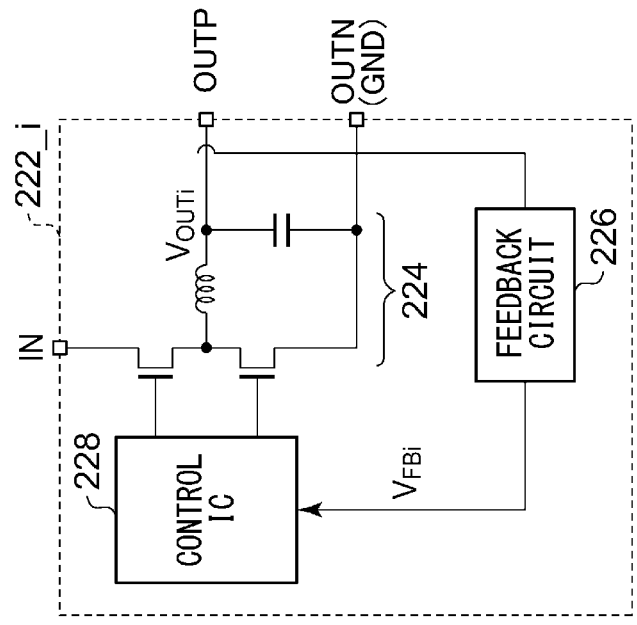

Next, description will be made regarding an example configuration of the power supply unit 222. FIGS. 25A and 25B are circuit diagrams each showing an example configuration of a single power supply unit 222_i. The power supply unit 222_i shown in FIG. 25A includes a single-phase step-down converter (output circuit) 224, a feedback circuit 226, and a control circuit 228. The feedback circuit 226 generates a feedback signal $V_{FBi}$ that corresponds to the output voltage $V_{OUTi}$ of the power supply unit 222_i. The control circuit 228 controls the output circuit 224 of the step-down converter such that the feedback signal $V_{FBi}$ approaches the target voltage $V_{REF}$.

The feedback voltage $V_{FBi}$ may be a voltage obtained by dividing the output voltage $V_{OUTi}$. Also, the feedback signal $V_{FBi}$ may be a signal obtained by correcting the voltage thus divided.

Alternatively, the feedback voltage $V_{FBi}$ may be a voltage obtained by dividing the voltage $V_{DD}$ at the power supply terminal of the array-type light-emitting device 212_i. Also, the feedback voltage $V_{FBi}$ may be a voltage obtained by correcting the voltage thus divided. By directly monitoring the voltage at the power supply terminal of the array-type light-emitting device 212_i, this allows control without the effects of voltage drop that occurs in the power supply cable 204_i.

The power supply unit 222_i may be configured as a phase-shift converter. The power supply unit 222_i shown in FIG. 25B includes a dual-phase step-down converter (output circuit) 224, a feedback circuit 226, and a control circuit 228.

The control circuit 228 controls the switching circuits SWA and SWB configured as two systems with a phase difference of 180 degrees such that the feedback signal $V_{FBi}$ approaches a target voltage.

By employing such a phase-shift converter, such an arrangement allows the output voltage $V_{OUTi}$ and the output current $I_{OUTi}$ to have reduced ripple as compared with an arrangement employing a single-phase converter. Furthermore, this provides improved efficiency. In addition, in a case in which each pixel circuit of the array-type light-emitting device 212 employs PWM control, the output current $I_{OUTi}$ of the power supply unit 222_i fluctuates at high speed according to the lighting-on ratio of the multiple pixel circuits. With such an arrangement employing such a phase-shift converter, such an arrangement provides improved tracking performance (responsiveness) with respect to load fluctuations.

It should be noted that the number of phases is not restricted to 2. Also, various formats such as three-phase, four-phase, six-phase, or other formats may be employed.

Next, description will be made regarding a modification relating to the embodiment 3.1. Description has been made above regarding an arrangement in which the array-type light-emitting devices 212_1 through 212_M each have the same number of pixels. However, the present invention is not restricted to such an arrangement. Also, there may be difference in the number of pixels for each of the array-type light emitting devices 212.

Embodiment 3.2

Figure 26:
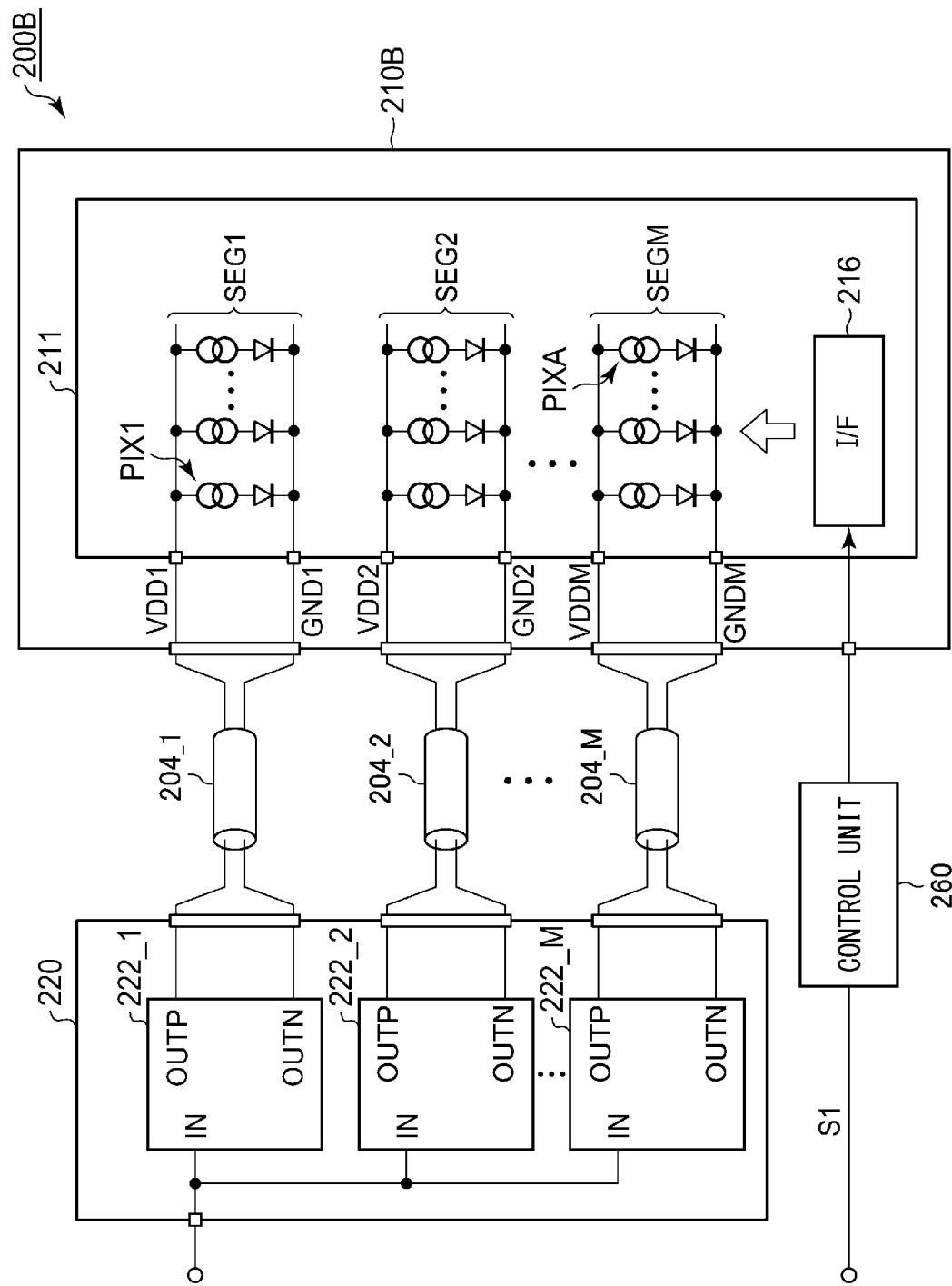
FIG. 26 is a block diagram showing a lamp system according to an embodiment 3.2.

FIG. 26 is a block diagram showing a lamp system 100B according to an embodiment 3.2. Description will be made regarding the point of difference in the configuration of the lamp system 100B from the lamp system 100A shown in FIG. 21. In the embodiment 3.1, the variable light distribution light source 210A includes the M array-type light-emitting devices each having pixels the number of which n is 1/M of the required number of pixels. In contrast, in the embodiment 3.2, the variable light distribution light source 210B is provided with a single array-type light-emitting device 211 with the number of pixels A.

The array-type light-emitting device 211 includes A (=M× n) pixel circuits PIX and an interface circuit 216. Each pixel circuit PIX has the same configuration as that shown in FIG. 21. Specifically, each pixel circuit PIX includes a light-emitting element and a current source coupled in series. The A pixel circuits PIX are configured of M separate segments SEG1 through SEGM. The segments SEG1 through SEGM are provided with independent power supply terminals VDD1 through VDDM, respectively. The array-type light-emitting device 211 may include independent ground terminals GND1 through GNDM for the multiple segments SEG1 through SEGM, respectively. Also, the array-type light-emitting device 211 may include a single common ground terminal.

Figure 27A:
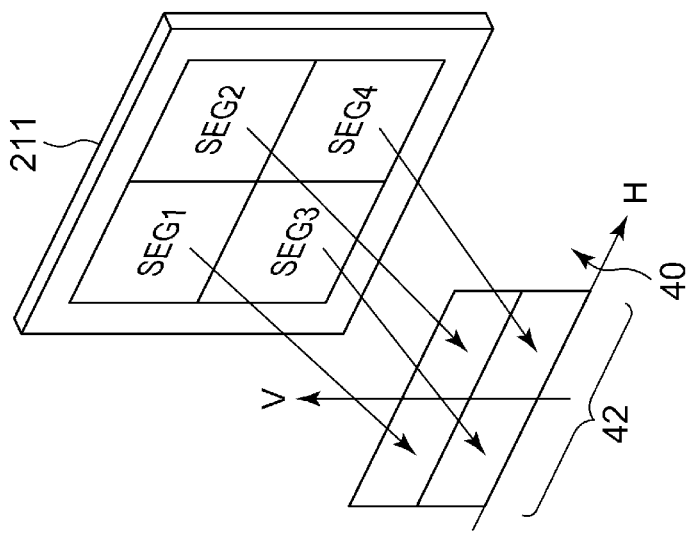
FIGS. 27A through 27C are diagrams for explaining the division of segments of the array-type light-emitting device.
Figure 27B:
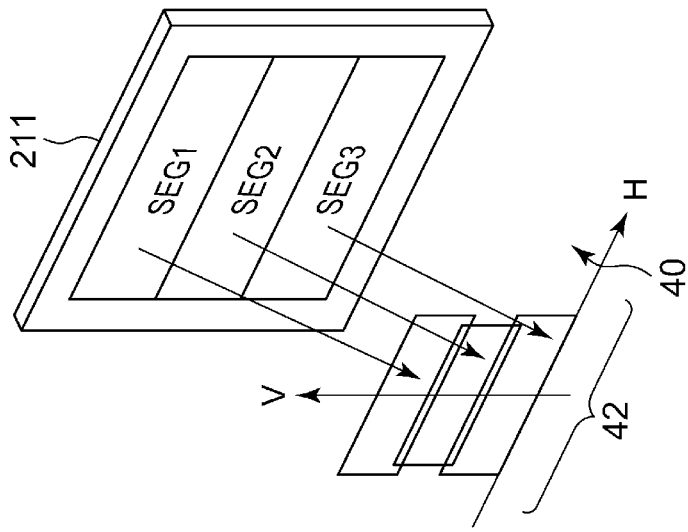
Figure 27C:
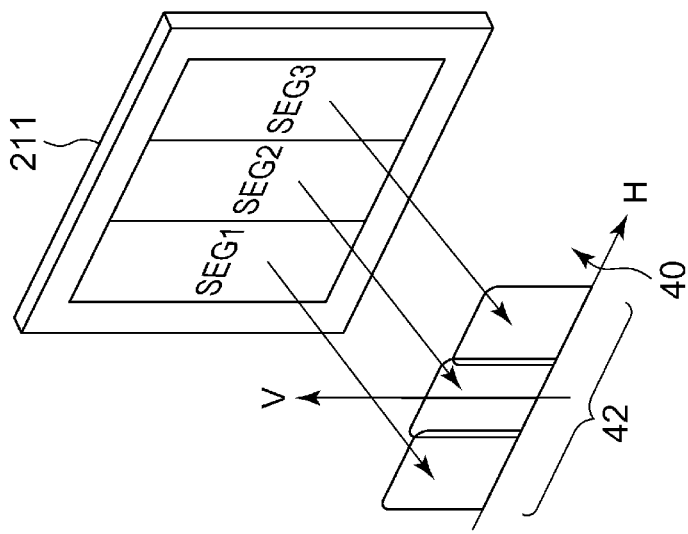

FIGS. 27A through 27C are diagrams for explaining the division of the segments of the array-type light-emitting device 211. FIG. 27A shows an arrangement in which the number of segments M is three. The output beams of the multiple segments SEG1 through SEG3 are irradiated to different positions along the horizontal direction. Such an arrangement in which the segments are divided along the horizontal direction has the same advantage as described above.

FIG. 27B shows an arrangement in which the number of segments M is three, and the output beams of the multiple segments SEG1 through SEG3 are irradiated to different regions along the vertical direction. In a case in which the multiple segments are divided in the vertical direction, such an arrangement provides the same effect on the vertical direction as that shown in FIG. 27A. In addition, by designing the lowest segment such that its light distribution corresponds to the low beam region, this provides an effect of the formation of the low-beam cutline light distribution. In conventional cutline formation, a shielding plate, which is a so-called shade, is provided between a light source and a lens so as to physically block light. In this case, there is 180-degree symmetry between the left-side cutline and the right-side cutline. Accordingly, two kinds of shades, i.e., a left-side shade and a right-side shade, are required. With such an arrangement in which the cutlines are formed by controlling the on/off states of the LED pixels, this allows the shade components to be omitted. Furthermore, by making the settings by means of the control controller, this allows the shapes of the left-side cutline and the right-side cutline to be switched in a simple manner. Moreover, by changing the shapes of the cutlines according to the cornering of the traveling vehicle, this allows an electronic swivel function to be supported.

FIG. 27C shows an arrangement with the number of segments of four in which the output beams of the multiple segments SEG1 through SEG4 are irradiated to different positions with respect to the horizontal direction and the vertical direction. With the embodiment 3.2, such an arrangement provides the same effects as in the embodiment 3.1.

Next, description will be made regarding modifications relating to the embodiments 3.1 and 3.2.

Modification 3.1

Description has been made in the embodiments 3.1 and 3.2 regarding an arrangement in which the power supply circuit 220 and the control unit 260 are built into the headlamp 200. Also, either one or both of the power supply circuit 220 and the control unit 260 may be arranged outside the body of the headlamp 200. The variable light distribution light source 210 serves as a heat generator. Accordingly, the control unit 260, which has a weak point with respect to heat, is preferably arranged in the vehicle interior away from the variable light distribution light source 210, which is advantageous from a thermal design viewpoint.

Modification 3.2

Also, a combination of the embodiments 3.1 and 3.2 may be made, which is also effective as an embodiment of the present invention. That is to say, the variable light distribution light source 210 may be provided with L array-type light-emitting devices 211. Each array-type light-emitting device 211 has an interior divided into a plurality of K segments each including a power supply terminal. In this case, the power supply circuit 220 may be configured as (L×K) power supply units 222.

Embodiment 4

Description will be made in embodiments 4.1 and 4.2 regarding a technique relating to the problem 4 described above.

Embodiment 4.1

Figure 28:
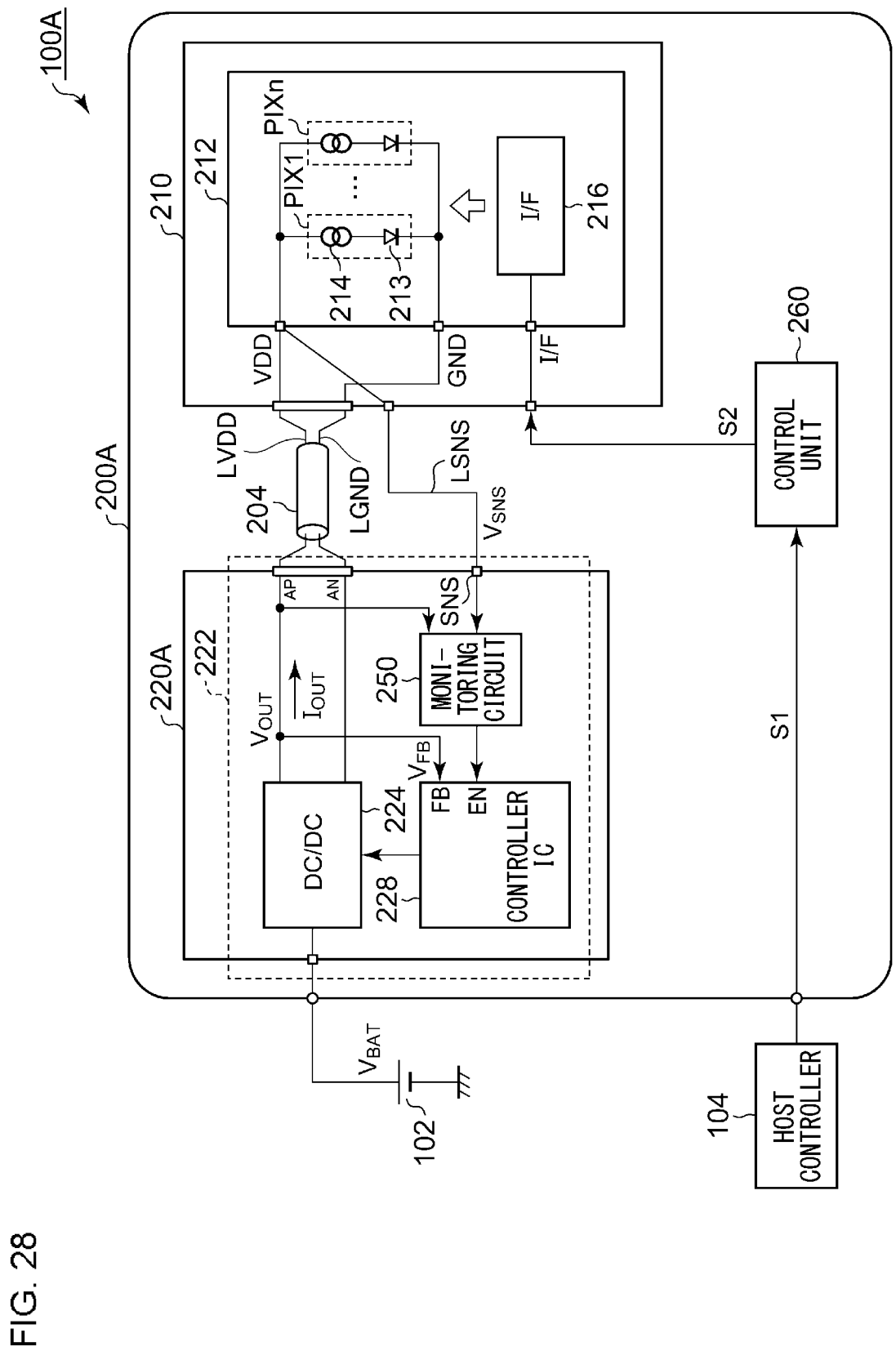
FIG. 28 is a block diagram showing a lamp system according to an embodiment 4.1.

FIG. 28 is a block diagram showing a lamp system 100A according to an embodiment 4.1. The lamp system 100A is configured as an ADB lamp system including a battery 102, a host controller 104, and a headlamp 200A.

The host controller 104 generates a light distribution instruction for the headlamp 200. The light distribution instruction may include a lighting instruction and additional information. The lighting instruction may include a signal for specifying the on/off of the high beam or low beam. A basic light distribution to be formed by the headlamp 200 is determined according to the lighting instruction. On the other hand, the additional information may include data with respect to a region (shielded region) that should not be irradiated with the high beam and information with respect to the vehicle speed, steering angle, etc. The basic light distribution is modified according to the additional information, thereby determining the final light distribution. The host controller 104 may be configured as a vehicle-side ECU. Also, the host controller 104 may be configured as a lamp-side ECU built into the headlamp 200.

The headlamp 200A is configured as an ADB lamp including a variable light distribution light source 210, a power supply circuit 220, and a control unit 260.

The variable light distribution light source 210 is provided with multiple pixels arranged in an array, and is configured to be capable of independently controlling the on/off state of each pixel. In the headlamp 200, the on/off states of the multiple pixels are controlled so as to provide a desired light distribution.

More specifically, the variable light distribution light source 210 includes an array-type light-emitting device 212. The array-type light-emitting device 212 includes n pixel circuits PIX1 through PIXn and a power supply terminal VDD coupled to the multiple pixel circuits PIX1 through PIXn.

Each pixel circuit PIXj (1≤j≤n) includes a light-emitting element 213_j and a current source 214_j provided in series between the power supply terminal VDD and a ground terminal (ground line) GND. The multiple light-emitting elements 213_1 through 213_n are each configured as a semiconductor light-emitting element such as an LED, LD (semiconductor laser), organic EL element, or the like, and are spatially arranged in an array (in a matrix).

The multiple current sources 214_1 through 214_n are each configured to have independently controllable on/off states. When the j-th current source 214_j is turned on, the corresponding light-emitting element 213_j emits light. That is to say, the corresponding pixel circuit PIXj is set to the lighting-on state.

An interface circuit 216 controls the on/off states of the current sources 214_1 through 214_n according to a control signal S2 from the control unit 260. The interface circuit 216 is coupled to the control unit 260 via a high-speed serial interface, and receives the control signal S2 for specifying the on/off states of all the pixels.

The power supply circuit 220 supplies electric power to the variable light distribution light source 210. The power supply circuit 220 includes a converter for outputting a constant voltage. The power supply circuit 220 supplies the stabilized power supply voltage $V_{DD}$ to the power supply terminal VDD of the array-type light-emitting device 212. The power supply voltage $V_{DD}$ is determined based on $V_F + V_{SAT}$. Typically, the power supply voltage $V_{DD}$ is set to on the order of 4 to 5 V. Here, $V_F$ represents the forward voltage of the light-emitting element 213, and $V_{SAT}$ represents the minimum operating voltage of the current source 214. Accordingly, the power supply unit 222 may be configured as a step-down converter (Buck converter) that steps down a battery voltage $V_{BAT}$ on the order of 12 V (or 24 V).

The control unit 260 receives a light distribution instruction S1 from the host controller 104, generates a control signal S2 that corresponds to the light distribution instruction S1, and transmits the control signal S2 to the variable light distribution light source 210. For example, the control unit 260 PWM-controls the multiple pixel circuits PIX1 through PIXn of the array-type light-emitting device 212 so as to control the light distribution. A PWM frequency of several hundred Hz (e.g., 100 to 400 Hz) is employed. Accordingly, the PWM cycle is set to several milliseconds to several dozen milliseconds (ms).

Next, description will be made regarding the configuration of the power supply circuit 220. The power supply circuit 220 is configured including a power supply unit 222.

The power supply unit 222 includes output terminals AP/AN, a sense terminal SNS, a DC/DC converter 224, and a converter controller 228.

The output terminals AP/AN are coupled to the power supply terminal VDD and the ground terminal GND via a power supply cable 204. The power supply cable 204 includes a power supply line LVDD and a ground line LGND. The positive output of the DC/DC converter 224 is coupled to the power supply terminal VDD of the array-type light-emitting device 212 via the output terminal AP and the power supply line LVDD. The negative output of the DC/DC converter 224 is coupled to the ground terminal GND of the array-type light-emitting device 212 via the output terminal AN and the ground line LGND.

The sense terminal SNS is configured as a single-signal line coupled to the power supply terminal VDD of the array-type light-emitting device 212 via the sense line LSNS separated from the power supply cable 204.

The converter controller 228 controls the DC/DC converter 224 based on the feedback voltage $V_{FB}$ that corresponds to the output voltage $V_{OUT}$ of the DC/DC converter 224. The feedback voltage $V_{FB}$ may be the output voltage $V_{OUT}$ itself. Also, the feedback voltage $V_{FB}$ may be a voltage obtained by dividing the output voltage $V_{OUT}$. Also, the feedback voltage $V_{FB}$ may be a voltage obtained by correcting the output voltage.

As the converter controller 228, a commercially available DC/DC converter control integrated circuit (IC) may be employed. The converter controller 228 generates a pulse signal where at least one from among the pulse width, frequency, and duty cycle is controllable, that is adjusted such that the feedback voltage $V_{FB}$ input to the feedback pin FB approaches the reference voltage $V_{REF}$. With this, the converter controller 228 feedback controls the DC/DC converter 224 according to the pulse signal.

Also, the converter controller 228 may include an enable pin EN. When an enable signal to be input to the enable pin EN is asserted (e.g., set to the high level), the converter controller 228 is set to the enable state. In this state, the converter controller 228 instructs the DC/DC converter 224 to generate the output voltage $V_{OUT}$. When the enable signal input to the enable pin EN is negated (e.g., set to the low level), the converter controller 228 is set to the disable state. In this state, the converter controller 228 instructs the DC/DC converter 224 to stop its operation.

A monitoring circuit 250 detects the electrical state of the power supply cable 204 based on at least the sense voltage $V_{SNS}$ at the sense terminal SNS. The monitoring circuit 250 has a sufficiently high input impedance. Accordingly, no current flows through the sense line LSNS. Accordingly, the sense voltage $V_{SNS}$ is equal to the voltage $V_{DD}$ at the power supply terminal VDD of the array-type light-emitting device 212.

In the present embodiment, the monitoring circuit 250 is configured to be capable of detecting an abnormality in the power supply cable 204 based on the output voltage $V_{OUT}$ of the DC/DC converter 224 and the sense voltage $V_{SNS}$. Examples of such an abnormality that can occur in the power supply cable 204 include: disconnection of the power supply cable 204; the power supply cable 204 becoming detached from the connector; a short-circuit fault to the ground and a short-circuit fault to the power supply terminal that occur in the power supply cable 204.

More specifically, the monitoring circuit 250 detects an abnormality in the power supply cable 204 based on a comparison result between a predetermined threshold value $V_{TH}$ and the difference $\Delta V$ between the output voltage $V_{OUT}$ and the sense voltage $V_{SNS}$. Specifically, when $\Delta V<V_{TH}$ holds true, judgment is made that the power supply cable 204 operates normally. Conversely, when $\Delta V>V_{TH}$ holds true, judgment is made that there is an abnormality in the power supply cable 204.

When the power supply cable 204 operates normally, the monitoring circuit 250 asserts the enable signal at the enable pin EN of the converter controller 228. When there is an abnormality in the power supply cable 204, the monitoring circuit 250 negates the enable signal at the enable pin EN of the converter controller 228.

Figure 29:
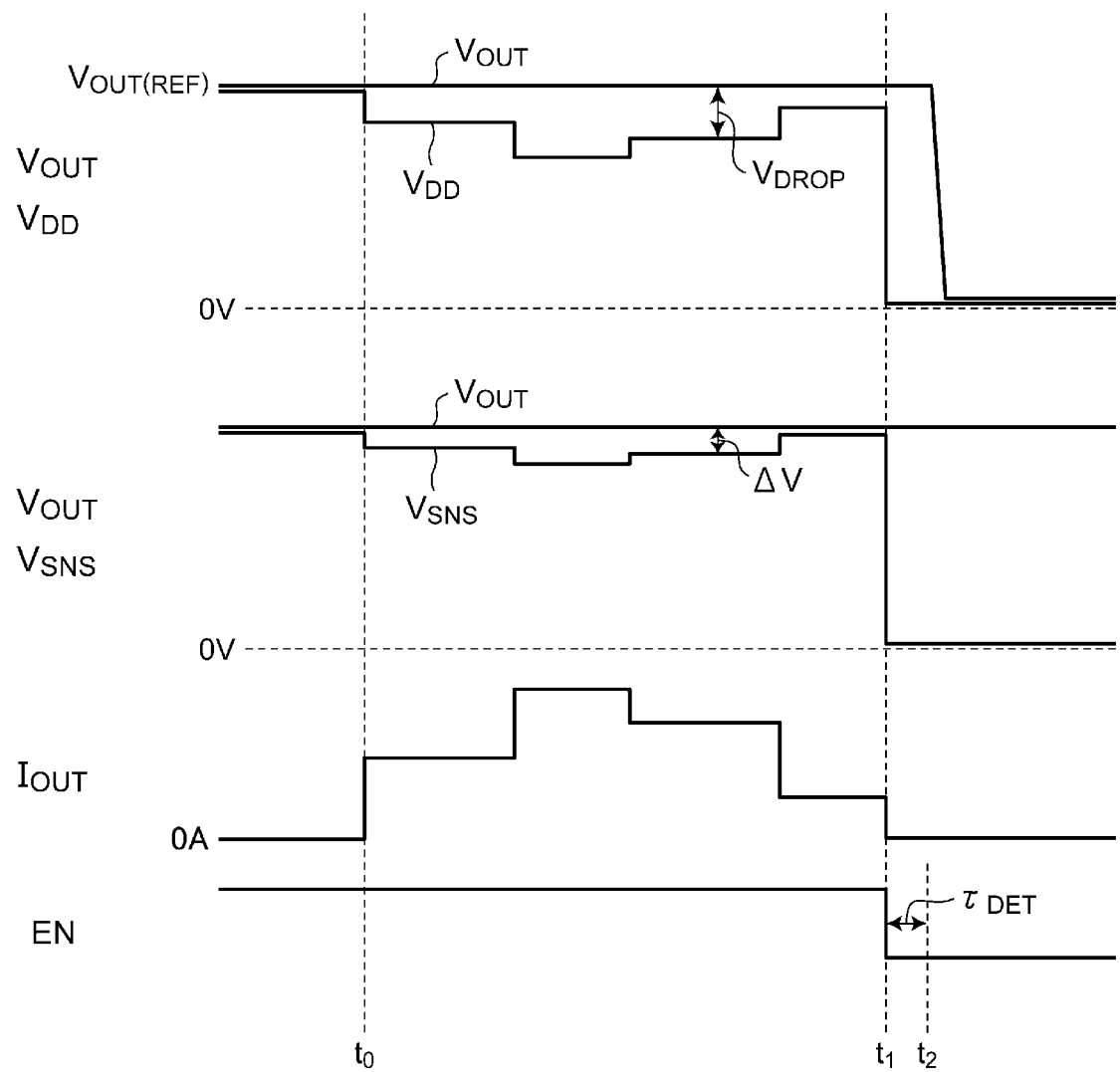
FIG. 29 is an operation waveform diagram of the lamp system shown in FIG. 28.

The above is the operation of the lamp system 100A. Next, description will be made regarding the operation thereof. FIG. 29 is an operation waveform diagram of the lamp system 100A shown in FIG. 28. The output voltage $V_{OUT}$ is stabilized to the target voltage $V_{OUT(REF)}$ thereof.

Before the time point $t_0$, the lamp system 100A is turned off. In this state, all the pixels of the array-type light-emitting device 212 are turned off. Accordingly, the output current $I_{OUT}$ is substantially zero. In this stage, the voltage drop that occurs in the power supply cable 204 is zero. Accordingly, the voltage $V_{DD}$ at the power supply terminal VDD of the array-type light-emitting device 212 is equal to the output voltage $V_{OUT}$.

When the lamp system 100A is turned on after the time point $t_0$, the current $I_{OUT}$ flows through the array-type light-emitting device 212. From the viewpoint of a long time scale, the average value of the output current $I_{OUT}$ fluctuates according to the light distribution formed by the headlamp 200. In contrast, from the viewpoint of a short time scale, the instantaneous value of the output current $I_{OUT}$ fluctuates with the PWM control cycle. FIG. 29 shows the fluctuation of the output current $I_{OUT}$ in long and short time scales.

The power supply voltage $V_{DD}$ of the array-type light-emitting device 212 is lower than the output voltage $V_{OUT}$ of the power supply circuit 220 by the voltage drop $V_{DROP}$ that occurs in the power supply line LVDD. The power supply voltage $V_{DD}$ fluctuates according to the output current $I_{OUT}$.

$$V_{DD} = V_{OUT} - V_{DROP} = V_{OUT} - R \times I_{OUT}.$$

Here, R represents the impedance of the power supply line LVDD. It should be noted that, for ease of understanding, description will be made ignoring the voltage drop that occurs in the ground line LGND.

Description will be made assuming that the power supply line LVDD is disconnected at the time point $t_1$. In this case, the power supply voltage $V_{DD}$ of the array-type light-emitting device 212 falls to 0 V.

The monitoring circuit 250 has a sufficiently high input impedance. Accordingly, no current flows through the sense line LSNS. Accordingly, the sense voltage $V_{SNS}$ is equal to the voltage $V_{DD}$ at the power supply terminal VDD of the array-type light-emitting device 212. Accordingly, the voltage difference $\Delta V = V_{OUT} - V_{SNS}$ to be monitored by the monitoring circuit 250 corresponds to the voltage drop $V_{DROP}$.

Before the time point $t_1$ when the power supply cable 204 operates normally, the voltage difference $\Delta V$ is proportional to the output current $I_{OUT}$. However, if the power supply line LVDD is disconnected or a connector has become detached, the sense voltage $V_{SNS}$ falls to 0 V. As a result, the voltage difference $\Delta V$ exceeds the threshold value $V_{TH}$. When the state of $\Delta V>V_{TH}$ has continued for a predetermined judgment period of time $\tau_{DET}$, the monitoring circuit 250 may judge at the time point $t_2$ that the power supply line LVDD is disconnected.

When the monitoring circuit 250 has detected a disconnection of the power supply line LVDD, the monitoring circuit 250 switches the enable signal EN to the low level. As a result, the power supply unit 222 stops its operation, and the output voltage $V_{OUT}$ falls to 0 V, thereby stopping the operation of the lamp system 100A.

The above is the operation of the lamp system 100A. With the lamp system 100A, this allows the power supply circuit 220 to monitor the voltage $V_{DD}$ at the power supply terminal VDD of the array-type light-emitting device 212. Such an arrangement is capable of detecting an electrical state due the power supply cable 204 being disconnected or detached from a connector, etc.

Next, description will be made regarding an example configuration of the monitoring circuit 250.

Figure 30:
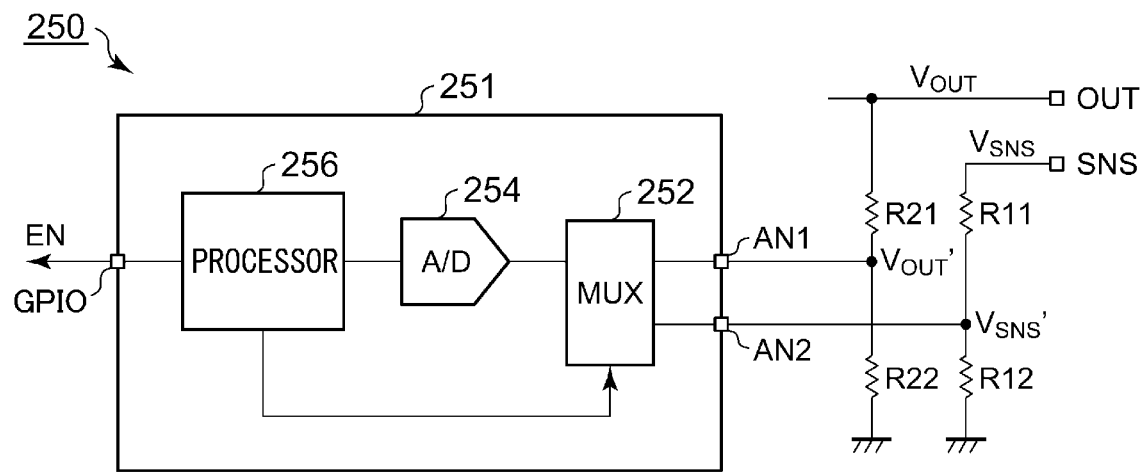
FIG. 30 is a circuit diagram showing an example configuration of a monitoring circuit.

FIG. 30 is a circuit diagram showing an example configuration of the monitoring circuit 250. In this example configuration, the monitoring circuit 250 includes resistors R11, R12, R21, and R22 and a microcontroller 251. The resistors R11 and R12 divide the sense voltage $V_{SNS}$. The resistors R21 and R22 divide the output voltage $V_{OUT}$. The voltages $V_{SNS}'$ and $V_{OUT}'$ are input to analog input pins AN1 and AN2 of the microcontroller 251.

The microcontroller 251 includes a multiplexer 252, an A/D converter 254, and a processor 256. The multiplexer 252 sequentially selects one from among the voltages at the multiple analog input pins AN1 and AN2. The A/D converter 254 convers the voltage thus selected by the multiplexer 252 into a digital signal. The processor 256 receives the input of digital values D1 and D2 quantized by sampling the voltages $V_{SNS}'$ and $V_{OUT}'$. The processor 256 executes a software program so as to generate the difference $\Delta D$ between the two digital values D1 and D2. The difference corresponds to the voltage difference $\Delta V$ described above. Subsequently, the microcontroller 251 compares the difference $\Delta D$ of the digital values with a predetermined threshold value TH. When the state of $\Delta D>TH$ continues for a predetermined period of time $\tau_{DET}$, the microcontroller 251 judges that the power supply line LVDD is disconnected. The processor 256 outputs the enable signal EN via a general-purpose output pin GPIO based on the judgement result. As described above, the function of the monitoring circuit 250 can be implemented in a monitoring microcontroller.

Figure 31:
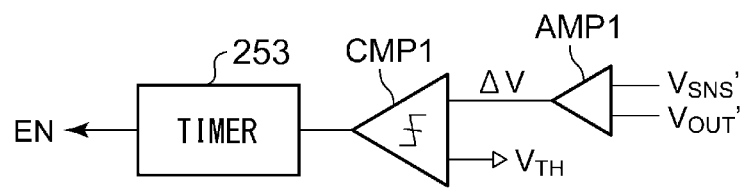
FIG. 31 is a circuit diagram showing another example configuration of a monitoring circuit.

FIG. 31 is a circuit diagram showing another example configuration of the monitoring circuit 250. In this example configuration, the monitoring circuit 250 is configured as an analog circuit. An amplifier AMP1 amplifies the difference between $V_{SNS}'$ and $V_{OUT}'$, and generates a signal that is proportional to the voltage difference $\Delta V$. A comparator CMP1 compares a signal that corresponds to the voltage difference with a threshold voltage $V_{TH}$. When judgement is made by a timer circuit 253 that the output of the comparator CMP1 indicates the relation $\Delta V>V_{TH}$ for a predetermined period of time $\tau_{DET}$, the enable signal EN is switched to the low level.

Embodiment 4.2

Figure 32:
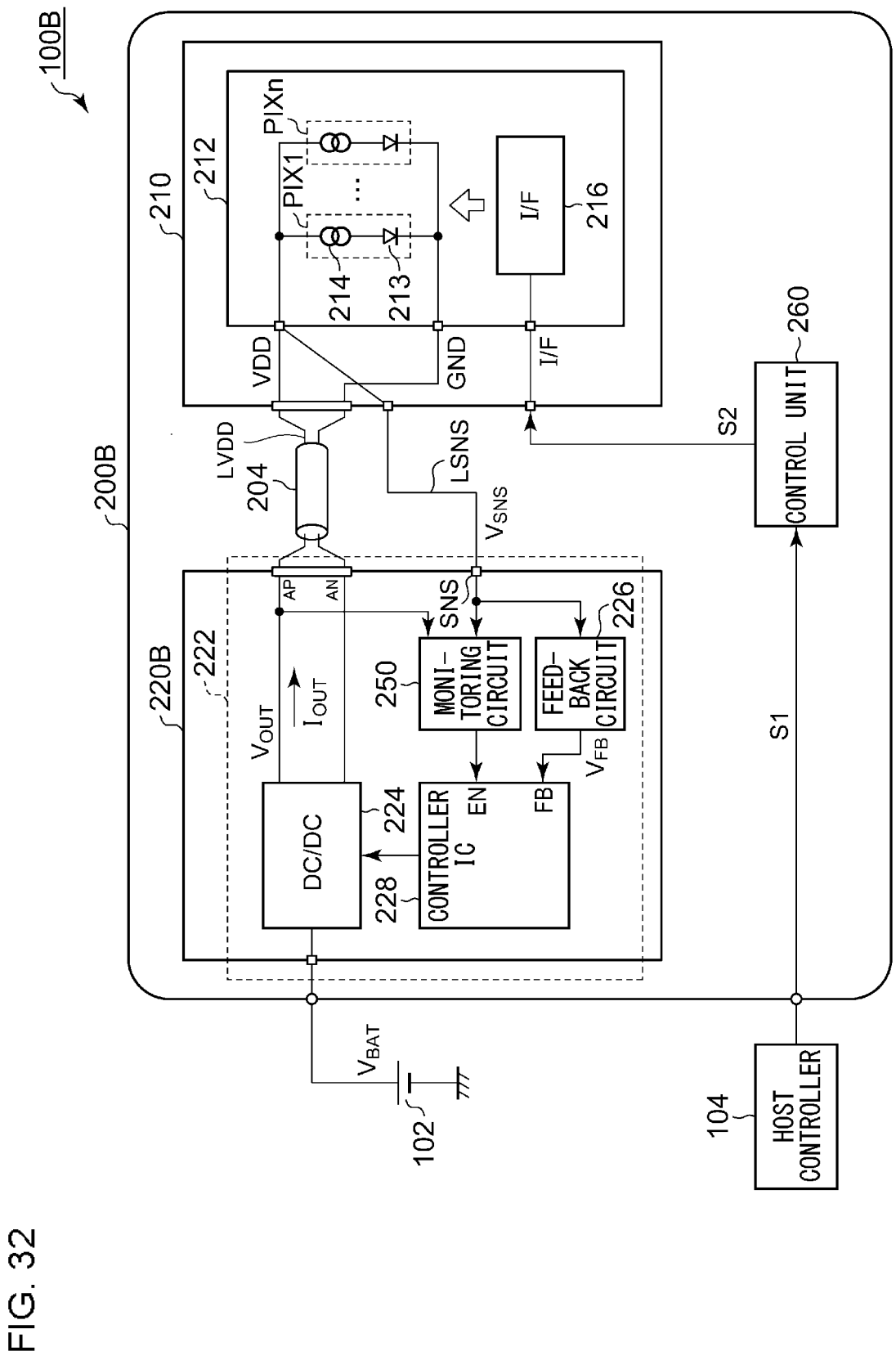
FIG. 32 is a block diagram showing a lamp system according to an embodiment 4.2.

FIG. 32 is a block diagram showing a lamp system 100B according to an embodiment 4.2. The power supply unit 222 further includes a feedback circuit 226 in addition to the power supply unit 222 shown in FIG. 28. The feedback circuit 226 generates a feedback voltage $V_{FB}$ that corresponds to the sense voltage $V_{SNS}$ at the sense terminal SNS, and inputs the feedback voltage $V_{FB}$ thus generated to a feedback pin of the converter controller 228. The other configuration is the same as that shown in FIG. 28.

Next, description will be made regarding the operation thereof. With the gain of the feedback circuit 226 as K, the following relation holds true between the feedback voltage $V_{FB}$ and the sense voltage $V_{SNS}$.

$$V_{FB} = K \times V_{SNS} = K \times V_{DD}$$

In the converter controller 228, in a case in which feedback control is performed such that the feedback voltage $V_{FB}$ input to the feedback pin approaches the reference voltage $V_{FB}$, the relation $V_{REF} = K \times V_{DD}$ holds true. Accordingly, the power supply voltage $V_{DD}$ is stabilized to a target voltage represented by $V_{DD(REF)} = V_{REF}/K$. It should be noted that $V_{DD(REF)}$ is determined based on $V_{DD(MIN)} = V_F + V_{SAT} + \alpha$. That is to say, the power supply voltage $V_{DD}$ is stabilized to the target voltage $V_{DD(REF)}$ that is not affected by the output current $I_{OUT}$, i.e., the voltage drop that occurs in the power supply line LVDD and connectors.

Figure 33:
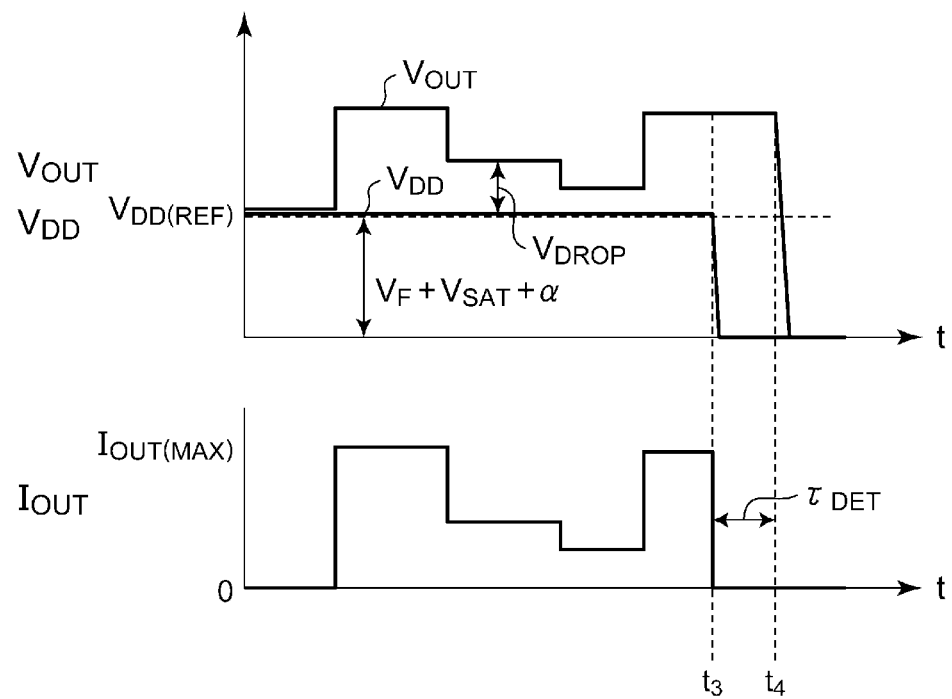
FIG. 33 is an operation waveform diagram of the lamp system shown in FIG. 32.

FIG. 33 is an operation waveform diagram of the lamp system 100B shown in FIG. 32. From the viewpoint of a long time scale, the average value of the output current $I_{OUT}$ fluctuates according to the light distribution formed by the headlamp 200. In contrast, from the viewpoint of a short time scale, the instantaneous value of the output current $I_{OUT}$ fluctuates with the PWM control cycle. FIG. 33 shows the fluctuation of the output current $I_{OUT}$ in long and short time scales.

As a result of the feedback control by the power supply circuit 220, the power supply voltage $V_{DD}$ is stabilized to the target voltage $V_{DD(REF)}$. On the other hand, the output voltage $V_{OUT}$ of the DC/DC converter 224 is represented by $V_{OUT} = V_{DD} + V_{DROP} = V_{DD} + R \times I_{OUT}$. That is to say, $V_{OUT}$ fluctuates according to the output current $I_{OUT}$.

The above is the operation of the lamp system 100B. With the lamp system 100B, the stabilized power supply voltage $V_{DD}$ can be supplied to the power supply terminal VDD of the array-type light-emitting device 212. The DC/DC converter 224 is not required to generate a higher voltage $V_{OUT}$ than necessary, thereby allowing power consumption to be reduced.

When the power supply line LVDD is disconnected at the time point $t_3$, the power supply voltage $V_{DD}$ falls to 0 V. In this state, the feedback control is disabled. Accordingly, the output voltage $V_{OUT}$ remains at the previous target voltage $V_{OUT(REF)}$ or changes to a voltage that is higher than the previous target voltage $V_{OUT(REF)}$. Accordingly, in the disconnected state, the relation $\Delta V (=V_{OUT} - V_{SNS}) > V_{TH}$ holds true, and accordingly, the monitoring circuit 250 is able to detect $\Delta V$. When the state of $\Delta V > V_{TH}$ continues for a predetermined period of time $\tau_{DET}$, the DC/DC converter 224 is disabled at the time point $t_4$. In this state, the output voltage $V_{OUT}$ becomes 0 V.

Description will be made regarding modifications relating to the embodiments 4.1 and 4.2.

Modification 4.1

Figure 34:
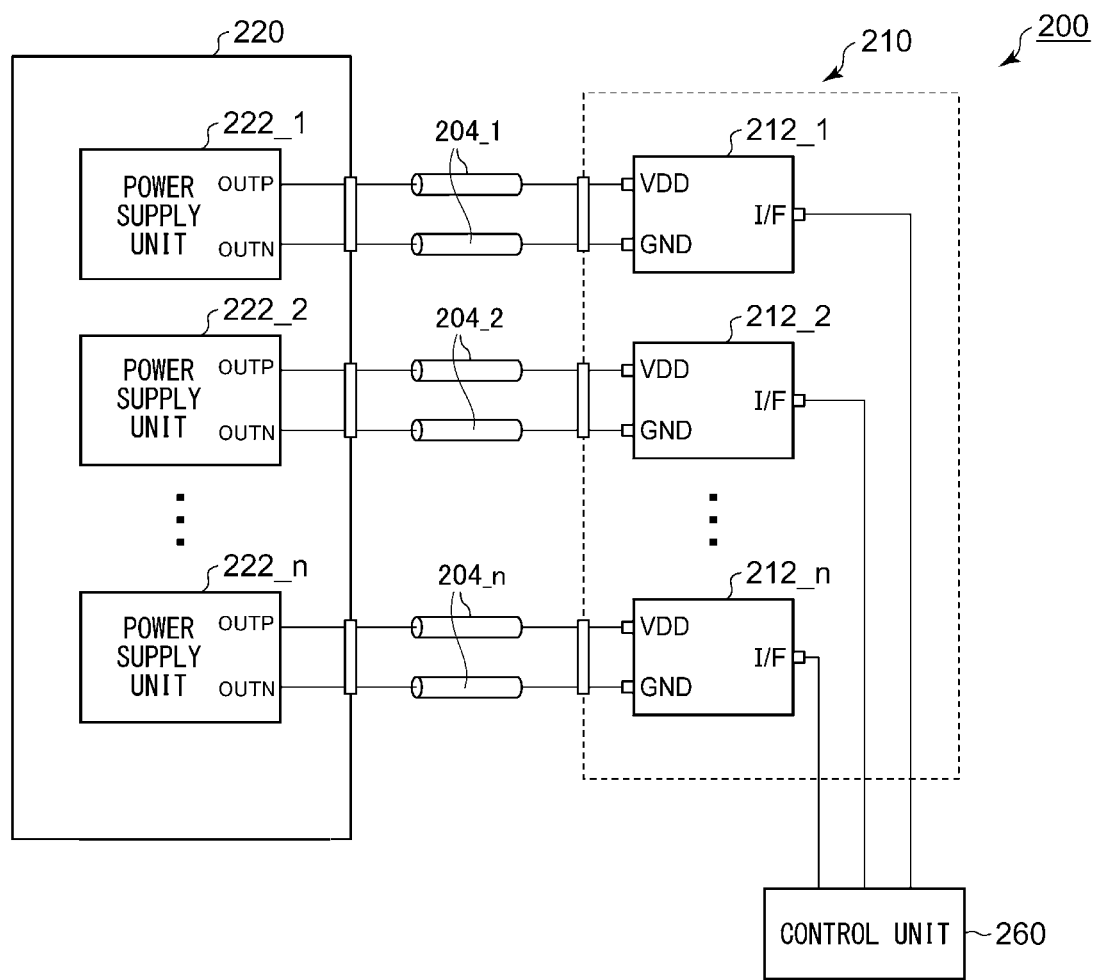
FIG. 34 is a diagram showing a headlamp according to a modification 4.1.

FIG. 34 is a diagram showing the headlamp 200 according to a modification 4.1. Description has been made above regarding the variable light distribution light source 210 including a single array-type light-emitting device 212. Also, the variable light distribution light source 210 may include multiple array-type light-emitting devices 212. In this case, the power supply circuit 220 is provided with multiple power supply units 222 corresponding to the multiple array-type light-emitting devices 212. The output terminal of each power supply unit 222 is coupled to the power supply terminal of the corresponding array-type light-emitting device 212 via an independent power supply cable. Also, a sense line may preferably be provided for each pair of a power supply unit 222 and an array-type light-emitting device 212.

In the modification 4.1, the variable light distribution light source 210 has a configuration provided by division thereof into multiple array-type light-emitting devices 212 each having an independent power supply terminal. Furthermore, a power supply unit 222 is provided for each array-type light-emitting device 212. Moreover, each array-type light-emitting device 212 is coupled to a corresponding power supply unit 222 via a power supply cable in a one-to-one manner. This allows the current that flows through the variable light distribution light source 210 to be distributed to multiple DC/DC converters included in the multiple systems. This allows the effects of voltage drop that occurs in each DC/DC converter to be reduced, thereby providing improved load responsiveness. In addition, this allows the number of options for the components of the DC/DC converters, power supply cables, and connectors to be increased, thereby providing an improved degree of design freedom.

Modification 4.2

Figure 35:
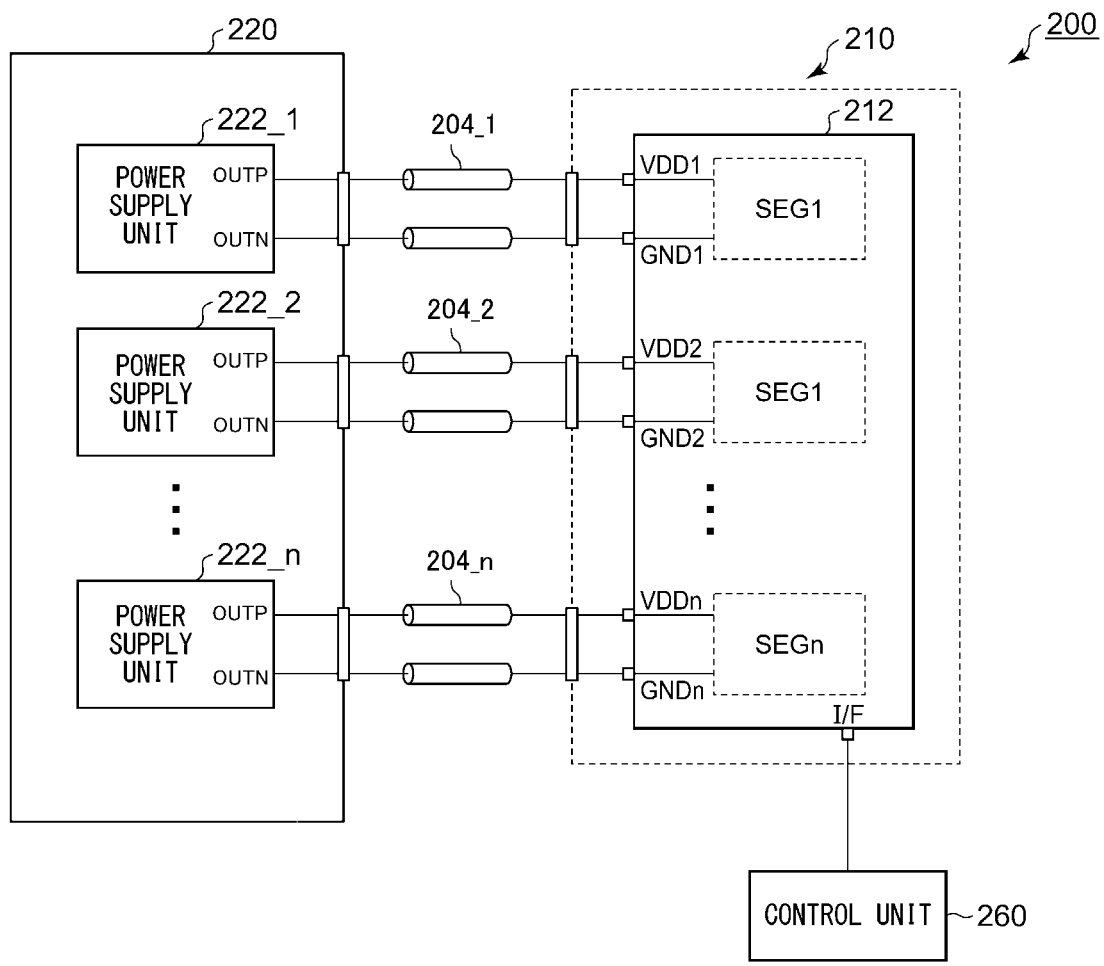
FIG. 35 is a diagram showing a headlamp according to a modification 4.2.

FIG. 35 is a diagram showing the headlamp 200 according to a modification 4.2. The array-type light-emitting device 212 may be configured such that the multiple internal light-emitting pixels are divided into multiple segments SEG1 through SEGn. Also, the multiple segments SEG1 through SEGn may be provided with corresponding multiple power supply terminals VDD. The power supply circuit 220 is provided with multiple power supply units 222_1 through 222_n corresponding to the multiple power supply terminals VDD. The output terminal of each power supply unit 222 is coupled to the corresponding power supply terminal VDD of the array-type light-emitting device 212 via an independent power supply cable 204. Also, a sense line may preferably be provided for each power supply unit 222 as necessary.

With the modification 4.2, this allows the current that flows through the variable light distribution light source 210 to be distributed to the DC/DC converters included in the multiple systems. Such an arrangement provides the same effects as in the modification 4.1.

Modification 4.3

The power supply unit 222 may be configured as a phase-shift converter. By employing such a phase-shift converter, this allows the ripples that occur in the output voltage $V_{OUTi}$ and the output current $I_{OUTi}$ to be reduced. Furthermore, such an arrangement provides improved efficiency. Furthermore, in a case in which PWM control is employed for each pixel circuit of the array-type light-emitting device 212, the output current $I_{OUTi}$ of the power supply unit 222 fluctuates at high speed according to the lighting-on ratio of the multiple pixel circuits. With this, by employing such a phase-shift converter, such an arrangement provides improved tracking performance (responsiveness) with respect to load fluctuations.

Modification 4.4

Description has been made regarding an arrangement in which the power supply circuit 220 and the control unit 260 are built into the headlamp 200. Also, either one or both of the power supply circuit 220 and the control unit 260 may be arranged outside the body of the headlamp 200. The variable light distribution light source 210 serves as a heat generator. Accordingly, an arrangement in which the control unit 260, which has a weak point with respect to heat, is arranged in the vehicle interior away from the variable light distribution light source 210 is advantageous from a thermal design viewpoint.

Modification 4.5

The monitoring circuit 250 may detect the disconnection of the power supply line LVDD based on only the sense voltage $V_{SNS}$. For example, when a state in which the sense voltage $V_{SNS}$ is lower than a predetermined value $V_{TH}$ determined in the vicinity of 0 V continues for a predetermined period of time, the monitoring circuit 250 may judge that there is an abnormality in the power supply line LVDD.

Modification 4.6

The monitoring circuit 250 may acquire an impedance R of the power supply line LVDD based on the difference ΔV between the output voltage $V_{OUT}$ and the sense voltage $V_{SNS}$. As described above, the voltage difference ΔV corresponds to the voltage drop $V_{DROP}$ that occurs in the power supply line LVDD. Accordingly, the voltage difference ΔV is proportional to R×$I_{OUT}$. With this, by dividing the voltage difference ΔV by the output current $I_{OUT}$, this allows the impedance R to be acquired.

For example, in a case in which the monitoring circuit 250 is provided as a microcontroller as shown in FIG. 30, a detection signal of the output current $I_{OUT}$ may preferably be input to the analog input pin AN3 of the monitoring circuit 250. With this, the A/D converter 254 generates a detection value D3 of the output current $I_{OUT}$. With such an arrangement, the impedance R can be obtained by calculation of (D1−D2)/D3.

Alternatively, in a case in which there is a timing or a period when a known output current $I_{OUT}$ (e.g., maximum current $I_{OUT(MAX)}$) flows, the impedance R may preferably be acquired based on the difference ΔD=D1−D2 acquired for this timing or period. In this case, there is no need to sense the output current $I_{OUT}$.

Description has been made regarding the present invention with reference to the embodiments using specific terms. However, the above-described embodiments show only the mechanisms and applications of the present invention. Rather, various modifications and various changes in the layout can be made without departing from the spirit and scope of the present invention defined in appended claims.

What is claimed is:

1. A lamp system comprising:
a variable light distribution light source comprising an array-type light-emitting device that comprises a power supply terminal and a plurality of pixel circuits electrically coupled in parallel and spatially arranged in a matrix; and
a power supply circuit comprising a power supply unit structured to supply electric power to the array-type light-emitting device,
wherein the power supply unit comprises:
a DC/DC converter having an output coupled to the power supply terminal of the array-type light-emitting device via a power supply line;
a voltage setting circuit structured to generate a controllable correction voltage;
a feedback circuit structured to generate a feedback voltage based on a control target voltage that corresponds to an output voltage of the DC/DC converter and the correction voltage; and
a converter controller having a feedback pin coupled to receive the feedback voltage and structured to control the DC/DC converter such that the feedback voltage approaches a predetermined target voltage.

2. The lamp system according to claim 1, wherein the power supply unit further comprises a sense terminal coupled to the power supply terminal of the array-type light-emitting device via a sense line separated from the power supply line,
and wherein the control target voltage is proportional to a sense voltage that occurs at the sense terminal.

3. The lamp system according to claim 1, wherein the control target voltage is proportional to a voltage that occurs at an output of the DC/DC converter.

4. The lamp system according to claim 1, wherein the feedback circuit comprises a subtraction circuit having an operational amplifier.

5. The lamp system according to claim 1, wherein the voltage setting circuit comprises:
a microcontroller structured to generate a digital signal; and
a D/A converter structured to convert the digital signal into the correction voltage.

6. The lamp system according to claim 1, wherein the variable light distribution light source comprises a plurality of array-type light-emitting devices,
and wherein the power supply circuit comprises a plurality of power supply units that correspond to the plurality of array-type light-emitting devices.

7. A lamp system comprising:
a variable light distribution light source comprising an array-type light-emitting device, wherein the array-type light-emitting device comprises a power supply terminal and a plurality of pixel circuits electrically coupled in parallel and spatially arranged in a matrix; and
a power supply circuit comprising a power supply unit structured to supply electric power to the array-type light-emitting device,
wherein the power supply unit comprises:
a DC/DC converter having an output coupled to the array-type light-emitting device via a power supply cable;
a sense terminal coupled to the power supply terminal of the array-type light-emitting device via a sense line separated from the power supply cable;
a feedback circuit structured to generate a first feedback voltage that corresponds to a sense voltage that occurs at the sense terminal; and
a converter controller structured to control the DC/DC converter based on the first feedback voltage.

8. The lamp system according to claim 7, wherein the feedback circuit comprises a voltage dividing circuit structured to divide the sense voltage or a voltage that corresponds to the sense voltage.

9. The lamp system according to claim 7, wherein the feedback circuit includes an amplifier structured to amplify the sense voltage or a voltage that corresponds to the sense voltage.

10. The lamp system according to claim 7, wherein the feedback circuit is structured to generate a second feedback voltage based on a voltage at the output terminal in addition to the first feedback voltage, and to supply one from among the first feedback voltage and the second feedback voltage to the converter controller.

11. The lamp system according to claim 10, wherein the feedback circuit comprises an abnormality detection circuit structured to detect an abnormality in the sense line,
   wherein, when the sense line operates normally, the feedback circuit supplies the first feedback voltage to the converter controller,
   and wherein, when an abnormality is detected in the sense line, the feedback circuit supplies the second feedback voltage to the converter controller.

12. The lamp system according to claim 11, wherein the abnormality detection circuit detects an open-circuit fault in the sense line.

13. The lamp system according to claim 11, wherein, when detection of the abnormality continues for a predetermined period of time, the power supply circuit stops the supply of electric power to the variable light distribution light source.

14. The lamp system according to claim 7, wherein the variable light distribution light source comprises a plurality of array-type light-emitting devices,
   and wherein the power supply circuit comprises a plurality of power supply units that correspond to the plurality of array-type light-emitting devices.

15. A lamp system comprising:
   a variable light distribution light source comprising an array-type light-emitting device, wherein the array-type light-emitting device comprises a power supply terminal and a plurality of pixel circuits electrically coupled in parallel and spatially arranged in a matrix; and
   a power supply circuit comprising a power supply unit structured to supply electric power to the array-type light-emitting device,
   wherein the power supply unit comprises:
      a DC/DC converter having an output coupled to the array-type light-emitting device via a power supply cable;
      a sense terminal coupled to the power supply terminal of the array-type light-emitting device via a sense line separated from the power supply cable;
      a converter controller structured to control the DC/DC converter; and
      a monitoring circuit structured to detect an electrical state of the power supply cable based on at least a sense voltage that occurs at the sense terminal.

16. The lamp system according to claim 15, wherein the monitoring circuit detects a disconnection of the power supply cable based on the output voltage and the sense voltage.

17. The lamp system according to claim 16, wherein the monitoring circuit converts a first voltage that corresponds to the output voltage into a first digital value,
   wherein the monitoring circuit converts a second voltage that corresponds to the sense voltage into a second digital value,
   and wherein, when a difference between the first digital value and the second digital value is larger than a predetermined value, the monitoring circuit judges that the power supply cable is disconnected.

18. The lamp system according to claim 17, wherein the power supply circuit comprises a built-in A/D converter, and a microcontroller structured to convert the first voltage and the second voltage into a first digital value and a second digital value,
   and wherein the monitoring circuit is implemented in the microcontroller.

19. The lamp system according to claim 15, wherein the monitoring circuit detects an impedance of the power supply cable based on the output voltage, the sense voltage, and an output current of the DC/DC converter.

20. The lamp system according to claim 15, wherein the converter controller controls the DC/DC converter such that the output voltage approaches a target voltage.

21. The lamp system according to claim 15, wherein the converter controller controls the DC/DC converter such that the sense voltage approaches a target voltage.

22. The lamp system according to claim 15, wherein the variable light distribution light source comprises a plurality of array-type light-emitting devices,
   and wherein the power supply circuit comprises a plurality of power supply units that correspond to the plurality of array-type light-emitting devices.

* * * * *